(12) United States Patent
Sakaki

(10) Patent No.: US 7,797,297 B2
(45) Date of Patent: Sep. 14, 2010

(54) INFORMATION LEAK ANALYSIS SYSTEM

(75) Inventor: Hiroshi Sakaki, Tokyo (JP)

(73) Assignee: NEC Corporation, Tokyo (JP)

( * ) Notice: Subject to any disclaimer, the term of this patent is extended or adjusted under 35 U.S.C. 154(b) by 346 days.

(21) Appl. No.: 11/883,067

(22) PCT Filed: Jan. 26, 2006

(86) PCT No.: PCT/JP2006/301195
§ 371 (c)(1),
(2), (4) Date: Jul. 26, 2007

(87) PCT Pub. No.: WO2006/080380
PCT Pub. Date: Aug. 3, 2006

(65) Prior Publication Data
US 2008/0256021 A1  Oct. 16, 2008

(30) Foreign Application Priority Data
Jan. 28, 2005  (JP) .............................. 2005-021815

(51) Int. Cl.
*G06F 7/00* (2006.01)
*G06F 17/30* (2006.01)
(52) U.S. Cl. ...................... 707/705; 707/783; 707/812
(58) Field of Classification Search ............... 707/1–10, 707/100–104.1, 200–206, 600–831; 713/182
See application file for complete search history.

(56) References Cited

U.S. PATENT DOCUMENTS

| 7,146,639 | B2 | 12/2006 | Bartal et al. | |
| 7,176,791 | B2* | 2/2007 | Sakaki et al. | 340/502 |
| 2005/0144475 | A1* | 6/2005 | Sakaki et al. | 713/200 |
| 2006/0288409 | A1 | 12/2006 | Bartal et al. | |

FOREIGN PATENT DOCUMENTS

| JP | 2000-253066 A | 9/2000 |
| JP | 2003-036208 A | 2/2003 |
| JP | 2003-173301 A | 6/2003 |

(Continued)

OTHER PUBLICATIONS

Feichtinger et al., Authorization of data access in distributed storage systems, Nov. 13-14, 2005, IEEE, 172-178.*

(Continued)

*Primary Examiner*—Jean B Fleurantin
(74) *Attorney, Agent, or Firm*—Foley & Lardner LLP

(57) ABSTRACT

An information leakage analysis system is provided. The access route model input device 110 receives an access route model, which represents whether or not to what type of file a user is accessible and represents the corresponding access route. The setting information input device 130 receives the setting information for the verification-intended system 1010. The access route decider 1060 cross-checks an analysis-intended access route, acting as an information leakage decision criterion, and an input access route model. As a result of verification, the setting information identification means 2020 identifies the setting information corresponding to a model matched with to the analysis-intended access route. The information leakage countermeasure proposer 3040 extracts an information leakage countermeasure corresponding to the setting information from the information leakage countermeasure storage 3010 to displays it.

18 Claims, 51 Drawing Sheets

FOREIGN PATENT DOCUMENTS

| | | |
|---|---|---|
| JP | 2004-139292 A | 5/2004 |
| JP | 2004-185455 A | 7/2004 |

OTHER PUBLICATIONS

Bacon et al., Access control for a modular, extensible storage service, Jun. 27-28, 1994, IEEE, 108-114.*

"eTrust Secure Content Manager 4I.1", [online], Sep. 2004, Computer Associates Co. Ltd., [retrieval on Nov. 25, 2004], Internet, URL:http://www.caj.co.jp/etrust/scm/pdf/pd.pdf, all pages.

* cited by examiner

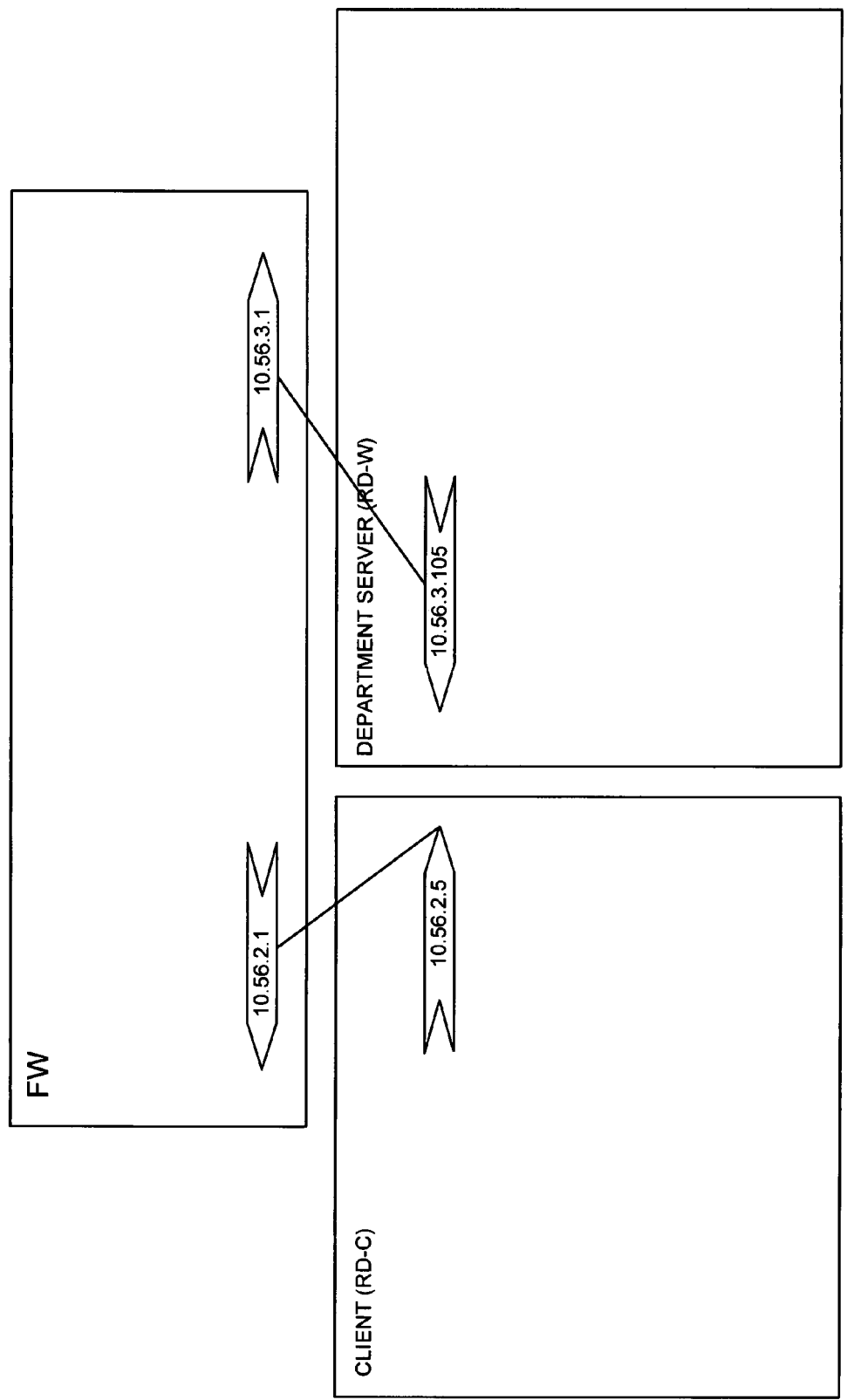

FIG. 26

Network-structure .xml
<networks>

```
<nic-set>
 <host name="FW">
   <nic macaddress="00-00-00-00-00-00">
     <ip address="10.56.2.1" id="1"/>
   </nic>
   <nic macaddress="00-00-00-00-00-02">
     <ip address="10.56.3.1" id="3"/>
   </nic>
 </host>
 <host name="RD-C">
   <nic macaddress="00-00-00-00-00-01">
     <ip address="10.56.2.5" id="2"/>
   </nic>
 </host>
 <host name="RD-W">
   <nic macaddress="00-00-00-00-00-04">
     <ip address="10.56.3.105" id="4"/>
   </nic>
 </host>
</nic-set>
```

INFORMATION REPRESENTING NETWORK INTERFACE

```
<edge-set>
 <edge>
   <point>1</point>
   <point>2</point>
 </edge>
 <edge>
   <point>3</point>
   <point>4</point>
 </edge>
</edge-set>
```

INFORMATION REPRESENTING CONNECTION STATUS OF NETWORK INTERFACE

</networks>

FIG. 27 rdc-user-a
rdc-butyou apache:x:48:48:Apache:/var/www:/sbin/nologin

FIG. 35

| | | | | |
|---|---|---|---|---|
| drwxr-xr-x | 21 root | root | | |
| drwxr-xr-x | 10 root | root | | |
| drwxr-xr-x | 3 root | root | | |
| drwxr-xr-x | 2 root | root | | |
| -rw-r--r-- | 1 root | root | | |
| drwxr-xr-x | 2 root | root | | |
| -rw-r--r-- | 1 root | root | | |

ACCESS RIGHT INFORMATION

| | | | | |
|---|---|---|---|---|
| 4096 | MAY | 12 | 2004 | /var/ |
| 4096 | SEPTEMBER | 30 | 19:19 | /var/www/ |
| 4096 | OCTOBER | 13 | 15:51 | /var/www/htdocs/index.html |
| 4096 | DECEMBER | 10 | 15:06 | /var/www/leader/ |
| 10 | DECEMBER | 10 | 14:56 | /var/www/leader/index.html |
| 4096 | DECEMBER | 10 | 15:06 | /var/www/rd/ |
| 10 | DECEMBER | 10 | 14:56 | /var/www/rd/index.html |

FILE INFORMATION

FIG. 37

| 1 Listen 80 | NETWORK INFORMATION |

| 2 User apache<br>3 Group apache | USER INFORMATION |

| 10 DocumentRoot "/var/www/htdocs" | FILE INFORMATION |

| 20 <Directory /><br>21   Options FollowSymLinks<br>22   AllowOverride None<br>23 </Directory><br><br>30 <Directory "/var/www/htdocs"><br>31   Options Indexes FollowSymLinks<br>32   AllowOverride None<br>33   Order allow,deny<br>34   Allow from all<br>35 </Directory> | ACCESS RIGHT INFORMATION |

| 40 alias /leader /var/www/leader | FILE INFORMATION |

| 51 <Directory "/var/www/leader"><br>52   Options Indexes FollowSymLinks<br>53   AllowOverride None<br>54   Order allow,deny<br>55   Allow from all<br>56 </Directory> | ACCESS RIGHT INFORMATION |

FIG. 39

-A FORWARD -m state --state NEW -m tcp -p tcp -s10.56.2.5 -d 10.56.1.105 --dport 443 -j ACCEPT
-A FORWARD -m state --state NEW -m tcp -p tcp -s10.56.2.5 -d 10.56.1.105 --dport 80 -j ACCEPT

FIG. 41

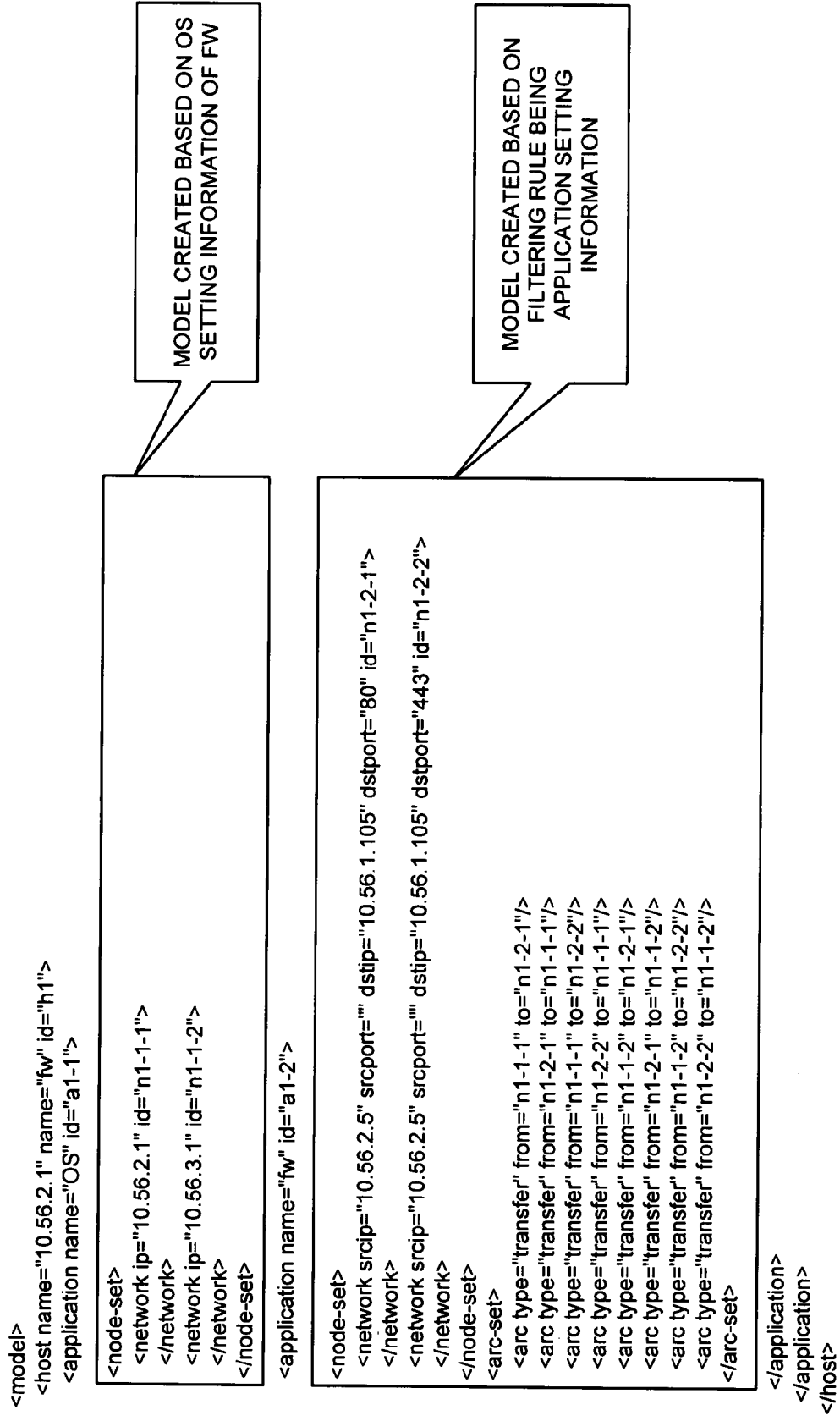

```
<model>
<host name="10.56.2.1" name="fw" id="h1">
  <application name="OS" id="a1-1">
    <node-set>
      <network ip="10.56.2.1" id="n1-1-1">
      </network>
      <network ip="10.56.3.1" id="n1-1-2">
      </network>
    </node-set>
  </application>  ← MODEL CREATED BASED ON OS SETTING INFORMATION OF FW <application name="fw" id="a1-2">
    <node-set>
      <network srcip="10.56.2.5" srcport="" dstip="10.56.1.105" dstport="80" id="n1-2-1">
      </network>
      <network srcip="10.56.2.5" srcport="" dstip="10.56.1.105" dstport="443" id="n1-2-2">
      </network>
    </node-set>
    <arc-set>
      <arc type="transfer" from="n1-1-1" to="n1-2-1"/>
      <arc type="transfer" from="n1-2-1" to="n1-1-1"/>
      <arc type="transfer" from="n1-1-1" to="n1-2-2"/>
      <arc type="transfer" from="n1-2-2" to="n1-1-1"/>
      <arc type="transfer" from="n1-1-2" to="n1-2-1"/>
      <arc type="transfer" from="n1-2-1" to="n1-1-2"/>
      <arc type="transfer" from="n1-1-2" to="n1-2-2"/>
      <arc type="transfer" from="n1-2-2" to="n1-1-2"/>
    </arc-set>
  </application>  ← MODEL CREATED BASED ON FILTERING RULE BEING APPLICATION SETTING INFORMATION
</host>
</model>
```

FIG. 43

| FILE NAME | DISTRIBUTION PROHIBITION FILE USER NAME | ROUTE |
|---|---|---|
| file://10.56.3.105/var/www/leader/index.html | user://10.56.2.5/ rdc-user-a | 80 |

FIG. 45

```
<file name="/index.html" id="h3-2-3">
</file>
<file name="/leader/index.html" id="h3-2-4">
    <config type="command" application="apache" version="1.3.31">
        <position ip="10.56.3.105">
            <text>-rw-r--r--</text>
        </position></config>
```

SETTING INFORMATION ON OS FILE ACCESS RIGHT

```
</file>
</node-set>
<arc-set>
<arc from="h3-2-2" to="h3-2-3">
<config-set>
```

OMISSION
(CONTINUED TO DESCRIPTION IN FIG. 46)

FIG. 46

```
</arc>
<arc from="h3-2-4" to="h3-2-3">
<config-set>
<config type="file" application="apache" version="1.3.31">
<position ip="10.56.3.105" path="/usr/local/apache_1.3/conf/httpd.conf">
<text s_row="2" e_row="2">User apache</text>
<text s_row="20" e_row="23">
< Directory />
    Options FollowSymLinks
    AllowOverride None
< /Directory>
</text>
<text s_row="51" e_row="56">
< Directory "/var/www/leader">
    Options Indexes FollowSymLinks
    AllowOverride None
    Order allow,deny
    Allow from all
< /Directory>
</text>
</position>
</config>
</config-set>
</arc>
```

SETTING INFORMATION ON APACHE ACCESS RIGHT

FIG. 47

| EXECUTION | CURRENT SETTING | ALTERATION CANDIDATE | CORRECTION |
|---|---|---|---|
| EXECUTION | 10.56.2.5,,10.56.1.105,80,acept | 10.56.2.5,,10.56.1.105,80,drop | CORRECTION |
| EXECUTION | -rw-r--r-- 1 root root 10 DECEMBER 10 14:56 /var/www/leader/index.html | chmod 700 /var/www/leader/index.html | CORRECTION |
| EXECUTION | <Directory "/var/www/leader"><br>Options Indexes<br>FollowSymLinks<br>AllowOverride None<br>Order allow,deny<br>Allow from all<br></Directory> | <Directory "/var/www/leader"><br>Options Indexes FollowSymLinks<br>AllowOverride None<br>Order allow,deny<br>Allow from all<br></Directory> | CORRECTION |
| EXECUTION | <Directory "/var/www/leader"><br>Options Indexes<br>FollowSymLinks<br>AllowOverride None<br>Order allow,deny<br>Allow from all<br></Directory> | | CORRECTION ← SELECTION |

FIG. 48

| CURRENT SETTING | ALTERATION CANDIDATE |
|---|---|
| <Directory "/var/www/leader"><br>　Options Indexes FollowSymLinks<br>　AllowOverride None<br>　Order allow,deny<br>　Allow from all<br></Directory> | <Directory "/var/www/leader"><br>　Options Indexes FollowSymLinks<br>　AllowOverride None<br>　Order allow,deny<br>　Allow from all<br>　AuthType Basic<br>　AuthName "THIS PAGE IS LEADER ONLY···<br>　AuthUserFile /etc/httpd/conf/.htleader····<br>　require valid-user<br></Directory> |

DECISION

CANCEL

FIG. 49

| EXECUTION | CURRENT SETTING | ALTERATION CANDIDATE | CORRECTION |
|---|---|---|---|
| EXECUTION | 10.56.2.5,,10.56.1.105,80,allow | Ipchains -D 10.56.2.5,,10.56.1.105,80,allow | CORRECTION |
| EXECUTION | -rw-r--r-- 1 root root 10 DECEMBER 10 14:56 /var/www/leader/index.html | chmod 700 /var/www/leader/index.html | CORRECTION |
| EXECUTION | <Directory "/var/www/leader"><br>   Options Indexes<br>   FollowSymLinks<br>   AllowOverride None<br>   Order allow,deny<br>   Allow from all<br></Directory> | <Directory "/var/www/leader"><br>   Options Indexes FollowSymLinks<br>   AllowOverride None<br>   Order allow,deny<br>   Allow from all<br></Directory> | CORRECTION |
| EXECUTION / SELECTION | <Directory "/var/www/leader"><br>   Options Indexes<br>   FollowSymLinks<br>   AllowOverride None<br>   Order allow,deny<br>   Allow from all<br></Directory> | <Directory "/var/www/leader"><br>   Options Indexes FollowSymLinks<br>   AllowOverride None<br>   Order allow,deny<br>   Allow from all<br>   AuthType Basic<br>   AuthName "THIS PAGE···<br>   AuthUserFile /etc/httpd/conf/···<br>   require valid-user<br></Directory> | CORRECTION |

FIG. 50

| | |
|---|---|
| 1 Listen 80 | NETWORK INFORMATION |
| 2 User apache<br>3 Group apache | USER INFORMATION |
| 10 DocumentRoot "/var/www/htdocs" | FILE INFORMATION |
| 20 <Directory /><br>21   Options FollowSymLinks<br>22   AllowOverride None<br>23 </Directory><br><br>30 <Directory "/var/www/htdocs"><br>31   Options Indexes FollowSymLinks<br>32   AllowOverride None<br>33   Order allow,deny<br>34   Allow from all<br>35 </Directory> | ACCESS RIGHT<br>INFORMATION |
| 40 alias /leader /var/www/leader | FILE INFORMATION |
| 51 <Directory "/var/www/leader"><br>52   Options Indexes FollowSymLinks<br>53   AllowOverride None<br>54   Order allow,deny<br>55   Allow from all<br>56   AuthType Basic<br>57   AuthName "THIS PAGE IS LEADER ONLY"<br>58   AuthUserFile /etc/httpd/conf/.htleaderpasswd<br>59   require valid-user<br>56 </Directory> | ACCESS RIGHT<br>INFORMATION |

FIG. 51

| EXECUTION | CURRENT SETTING | ALTERATION CANDIDATE | CORRECTION |
|---|---|---|---|
| EXECUTION | file://var/www/leader | rm /var/www/leader | CORRECTION |
| EXECUTION | -rw-r--r-- 1 root root 10 DECEMBER 10 14:56 /var/www/leader/index.html | chmod 700 /var/www/leader/index.html | CORRECTION |
| EXECUTION | User apache | User | CORRECTION |
| EXECUTION | <Directory "/var/www/leader"><br>Options Indexes<br>FollowSymLinks<br>AllowOverride None<br>Order allow,deny<br>Allow from all<br></Directory> | <Directory "/var/www/leader"><br>Options Indexes FollowSymLinks<br>AllowOverride None<br>Order allow,deny<br>Deny from all<br></Directory> | CORRECTION |
| EXECUTION | 10.56.2.5,,10.56.1.105,80,acept | 10.56.2.5,,10.56.1.105,80,drop | CORRECTION |

FIG. 52

| EXECUTION | SETTING FILE NAME | CURRENT SETTING | ALTERATION CANDIDATE | CORRECTION |
|---|---|---|---|---|
| EXECUTION | /etc/sysconfig/iptables | 10.56.2.5,,10.56.1.105,80,acept | 10.56.2.5,,10.56.1.105,80,drop | CORRECTION |
| EXECUTION | OS FILE ACCESS RIGHT | -rw-r--r-- 1 root root 10 DECEMBER 10 14:56 /var/www/leader/index.html | chmod 700 /var/www/leader/index.html | CORRECTION |
| EXECUTION | /etc/httpd/conf/httpd.conf | <Directory "/var/www/leader"><br>Options Indexes   FollowSymLinks<br>AllowOverride None<br>Order allow,deny<br>Allow from all<br></Directory> | <Directory "/var/www/leader"><br>Options Indexes<br>FollowSymLinks<br>AllowOverride None<br>Order allow,deny<br>Deny from all<br></Directory> | CORRECTION |
| EXECUTION | etc/httpd/conf/httpd.conf | <Directory "/var/www/leader"><br>Options Indexes FollowSymLinks<br>AllowOverride None<br>Order allow,deny<br>Allow from all<br></Directory> | | |

SELECTION

INFORMATION LEAK ANALYSIS SYSTEM

This application is the National Phase of PCT/JP2006/301195, filed Jan. 26, 2006, which claims priority to Japanese Application No. 2005-021815, filed Jan. 28, 2005, the disclosures of which are hereby incorporated by reference in their entirety.

TECHNICAL FIELD

The present invention relates to an information leakage analysis system for analyzing the possibility of a leakage of information such as files. Moreover, the present invention relates to an information leakage analyzing method and an information leakage analysis program.

BACKGROUND OF THE RELATED ART

Various systems for finding a file, which has the possibility of a leakage of information, and obviating the information leakage have been proposed (for example, refer to patent document 1 and non-patent document 1). FIG. 53 is an explanatory diagram illustrating a patent document 1. As shown in FIG. 53, the system, which includes a file location detector, file attribute setting means, a file location comparator, and a program executioner, operates as follows. The file attribute setting means sets the location allowed as a file existence location. Next, the file location detector detects the location where the file exists. The file location comparator compares the file existence location set by the file attribute setting means with the file existence location detected by the file location detector. If a file exists outside the location set by the file attribute setting means, the file is decided as an information leaked file. The program executioner deletes or encrypts the file. Thus, such an operation allows a file having the possibility of information leakage to be found, thus preventing the information from being leaked.

In the operation disclosed in the non-patent document 1, a character string included in an information leakage prevented file is registered as a keyword. Next, a distributed file is analyzed to extract a character string included in the file. It is decided whether or not the extracted character string is included in the registered character string group. When the character string extracted from the file is in a registered state, it is decided that the file has the possibility of information leakage. Thus, interruption of the distribution of the file is instructed. Such an operation can decide the possibility of information leakage from the file to prevent a leakage of information.

[Patent Document 1]
Japanese Patent laid-open publication No. 2003-36208 (refer to pages 5-10 and FIG. 1)

[Non-Patent Document 1]
"eTrust Secure Content Manager r1.1", [online], September, 2004, Computer Associates Co. Ltd., [retrieval on Nov. 25, 2004], Internet <URL:http://www.caj.co.jp/etrust/scm/pdf/pd.pdf>

DISCLOSURE OF THE INVENTION

Problems to be Solved by the Invention

The conventional system cannot decide the possibility of information leakage according to the setting status of a file storage system (for example, the setting of an access right to a file or the setting status of an application installed in the system). The reason is that, in the prior art, the possibility of information leakage is decided with reference to the content of a file or the location of a file.

Moreover, in the prior art, the location where a leaked file is stored or the setting causing the file leakage cannot be specified. The prior art prevents an information leakage by analyzing the content of a file on the way of the communication route and cutting the communications when it is decided that the file belongs to a leakage prevented file. For that reason, even if the file leakage is prevented through the cutting of communications, the location where the file has been stored cannot be specified.

In the case of the distribution of a file, it is preferable to decide the distribution destination of the file.

The present invention aims at capable of deciding the possibility of information leakage according the setting situation of a file storage system. Moreover, the present invention aims to preventing in advance a file from being leaked. Moreover, the present invention aims at capable of specifying the storage area where a file having the possibility of information leakage belongs to, or the setting causing a leakage of the file.

Means to Solve the Problems

According to the present invention, an information leakage analysis system comprises an access route information storage for storing a file stored in a file storage system, a user accessible to the file or other file which can copy the content in the file, and access route information representing an access route to a file stored in the system from said user or the other file; a setting information storage for storing setting information, the setting information including information regarding a network configuration in the system, a file name and a storage location of a file stored in said system, and a user using an operating system or application installed in said system; a route decider for collating information leakage route information representing a possible information leakage route with the access route information and deciding whether or not a route represented by the information leakage route information is represented in the access route information; setting information identification means for identifying setting information associated with the route when it is decided that a route represented by the information leakage route information is represented in the access route information and then reading the setting information from the setting information storage; and a result output device for outputting the setting information.

In such a configuration, the route decider verifies information leakage route information representing a possible information leakage route with access route information and decides whether or not the route represented by the information leakage route information is represented in the access route information. When deciding that the route represented by the information leakage route information is represented in the access route information, the setting information identification means identifies the setting information associated with the route. Then, the result output device outputs the setting information. Therefore, outputting the setting information allows the possibility of information leakage to be decided. Moreover, since the setting information corresponding to the route having the possibility of information leakage is output, the setting causing an information leakage can be identified.

According to the present invention, an information leakage analysis system comprises a setting information collector for collecting setting information, the setting information including a network configuration in a file storage system, the file name of a file stored in the system and a storage place, and information regarding users using an operating system or application installed in the system; an access route information creator for creating based on the setting information a file stored in the system, a user accessible to the file or other file that can copy the content of the file, and access route information representing an access route to a file stored in the system from the user or the other file; a route decider for verifying information leakage route information representing a possible information leakage route with the access route information and deciding whether or not a route represented by the information leakage route information is represented in the access route information; and a result output device for outputting the route information when a route represented by the information leakage route information is represented in the access route information.

In such a configuration, the route decider verifies information leakage route information representing a possible information leakage route with access route information and decides whether or not the route represented by information leakage route information is represented in the access route information. When it is decided that the route represented by information leakage route information is represented in the access route information, the result output device outputs the route information. As a result, outputting the route allows the possibility of information leakage to be decided and allows the location where the possible leakage file has been stored to be specified. Moreover, since the access route information creator creates access route information based on the setting information, the possibility of information leakage can be decided according to the setting status of a file storage system.

The access route information creator comprises a setting information storage for storing setting information used when an access route information creator creates access route information, together with information representing a corresponding relationship with the access route information; and setting information identification means for identifying setting information associated with the route when it is decided that a route represented by information leakage route information is represented in the access route information, and reading the setting information out from the setting information storage. The result output device outputs setting information identified by the setting information identification means.

In such a configuration, since the setting information corresponding to a route having the possibility of information leakage is output, the setup causing an information leakage can be specified.

The system defined further comprises an information leakage countermeasure storage for storing setting proposals for cutting a possible information leakage route associated with a descriptive content of setting information and an information leakage countermeasure proposer for reading a setting proposal associated with the content of setting information identified by the setting information identification means, out of the information leakage countermeasure storage.

In such a configuration, since a setting proposal for cutting a route having the possibility of information leakage can be provided to an operator, the file leakage can be obviated.

The information leakage countermeasure proposer includes a countermeasure executioner for changing the setting of a file storage system, according to a setting proposal read out from the information leakage countermeasure storage.

In such a configuration, since the countermeasure executioner changes the system setting according to the setting proposal which cuts a route having the possibility of information leakage, the file leakage can be obviated.

The information leakage countermeasure proposer includes setting change input device for displaying a setting proposal read out from the information leakage countermeasure storage, displaying a user interface stimulating an editing operation of the setting proposal, and updating the setting proposal according to the editing operation when the setting proposal has been edited with the user interface.

In such a configuration, an operator can edit the setting proposal.

The information leakage countermeasure proposer includes an information leakage countermeasure priority order decider for ranking setting proposals read from the information leakage countermeasure storage in the order of having little effect on the system when the setting of the system is changed according to each setting proposal. The information leakage countermeasure proposer displays the setting proposals according to the order decided by the information leakage countermeasure priority order decider.

In such a configuration, setting proposals can be shown to an operator, in the order having little effect on the system.

The system defined further comprises an information leakage route information input device for inputting information leakage route information.

In such a configuration, an operator can specify information leakage route information.

The system defined further comprises an attribute use information leakage route information input device for receiving attribute use information leakage route information representing a distribution source and a distribution destination in a possible information leakage route by a file or user attribute; an attribute information storage for storing a corresponding relationship between a file or user attribute and file or user information having the attribute; and a converter for converting attribute use information leakage route information into information leakage route information by referring to the corresponding relationship and by replacing the attribute included in the attribute use information leakage route information with file or user information.

The attribute information of a user or file is one controllable by an operator. In such a configuration, the operator can specify more simply the route having the possibility of leakage information.

The system further comprises collecting setting information from a file storage system, analyzing an attribute of the content described in the setting information, and storing a corresponding relationship between the content described in the setting information and the attribute identified by analysis, in the attribute information storage.

According to the present invention, an information leakage analysis system comprises an access route information storage for storing a file stored in a file storage system, a user accessible to the file or other file that can copy the content of the file, and access route information representing an access route to a file stored in the system from the user or the other file; a route information creator for creating route information, the route information specifying as a distribution source an arbitrary file included in access route information and specifying as a distribution destination an arbitrary user or file included in access route information; a route decider for deciding whether or not a route from the distribution source to the distribution destination, specified by the route information created by the route information creator, is represented in the access route information; and a display for displaying a file of a distribution source specified by route information decisively represented in the access route information and a file or user of the distribution destination, and a route between the distribution source and the distribution destination.

In such a configuration, the route information creator specifies as a distribution source a file included in access route information and creates route information specifying as a distribution destination a user or file included in the access route information. The route decider decides whether or not a route from a distribution source to a distribution destination, specified by route information created by the route information creator, is represented in the access route information. The display displays a file of a distribution source for specifying route information decisively represented in the access route information, a file or user of a distribution destination, and a route between the distribution source and the distribution destination. Therefore, the distribution source, the distribution destination, and a route between them, included in the access route information, can be manifested to an operator. The operator can decide whether or not there is the possibility of information leakage by referring to the distribution source, the distribution destination, and a route between them, included in the access route information.

The system defined further comprises a setting information storage for storing setting information, the setting information including a network configuration in a file storage system, a file name and a storage location of a file stored in the system, and information on a user using an operating system or application installed in the system; and setting information identification means for identifying setting information associated with the route when it is decided that a route from a distribution source to a distribution destination, specified by route information created by the route information creator, is represented in access route information, and for reading the setting information from the setting information storage; and a result output device for outputting the setting information.

In such a configuration, when it is decided that the route from the distribution source to the distribution destination, specified with the route information created by the route information creator, is represented in access route information, the setting information identification means identifies the setting information associated with the route. The result output device outputs the setting information. Therefore, when an operator decides whether or not there is the possibility of information leakage by referring to each distribution source, each distribution destination and a route between them, included in access route information, the setting information is output. Thus, the operator can specify the setting causing information leakage.

The system defined further comprises an information leakage countermeasure storage for storing setting proposals for cutting an possible information leakage route, associated with the descriptive content of setting information; and an information leakage countermeasure proposer for reading a setting proposal associated with the content of setting information identified by the setting information identification means out from the information leakage countermeasure storage.

Such a configuration allows the setting proposal for cutting the route having the possibility of information leakage to being indicated to an operator. As a result, file leakage can be prevented previously.

The information leakage countermeasure proposer includes countermeasure executioner for changing the setting of a file storage system according to a setting proposal read from information leakage countermeasure storage.

In such a configuration, the countermeasure executioner changes the setting of the system according to the setting proposal, which cuts the route having the possibility of information leakage, so that a file leakage can be prevented previously.

The information leakage countermeasure proposer includes a setting change input device for displaying a setting proposal read from the information leakage countermeasure storage, displaying a user interface stimulating an editing operation of the setting proposal, and updating the setting proposal according to the editing operation when the user interface edits the setting proposal. Such a configuration allows the operator to edit the setting proposal.

The system further comprises an information leakage countermeasure priority order decider for ranking setting proposals read from the information leakage countermeasure storage by the information leakage countermeasure proposer in the order of having little effect on the system when the system setting is changed according to each setting proposal. The information leakage countermeasure proposer displays the setting proposals in the order decided by the information leakage countermeasure priority order decider.

In such a configuration, setting proposals can be manifested to the operator in the order having little effect on the system.

According to the present invention, an information leakage analysis method comprises the steps of storing access route information in an access route information storage, the access route information representing a file stored in a file storage system, a user accessible to the file or other file which can copy the content of the file, and an access route to a file stored in the system from the user or the other file; storing setting information in a setting information storage, the setting information including a network configuration in the system, a file name and a storage location of a file stored in the system, and information on a user using an operating system or application installed in the system; verifying information leakage route information representing a possible information leakage route with the access route information, by means of a route decider, and deciding whether or not a route represented by the information leakage route information is represented in the access route information; identifying setting information associated with the route, by means of setting information identification means, when it is decided that a route represented by the information leakage route information is represented in the access route information; reading the setting information from the setting information storage; and outputting the setting information by means of a result output device.

In such a configuration, the route decider verifies information leakage route information representing the route having the possibility of information leakage and access route information and decides whether or not the route represented by the information leakage route information is represented in the access route information. When the route represented by the information leakage route information is represented in the access route information, the setting information identification means identifies the setting information associated with the route and the result output device outputs the setting information. Therefore, the possibility of information leakage can be decided through the outputting of the setting information. Moreover, since the setting information corresponding to the route having the possibility of information leakage is output, the setup causing an information leakage can be specified.

According to the present invention, an information leakage analysis method comprises the steps of collecting setting information from the system by means of a setting information collector, the setting information including a network configuration in a file storage system, a file name and a storage location of a file stored in the system, and information regarding a user using an operating system or application installed in the system; creating access route information based on the setting information by means of an access route information creator, the access route information representing a file stored in the system, a user accessible to the file or other file which can copy the content of the file, and an access route to file stored in the system from the user or the other file; verifying information leakage route information representing a possible information leakage route with the access route information, by means of route decider, and deciding whether or not a route represented by the information leakage route information is represented in the access route information; and outputting the route information by means of a result output device, when it is decided that the route representing the information leakage route information is represented in the access route information.

In such a method, the route decider verifies information leakage route information representing the route having the possibility of information leakage with access route information and decides whether or not the route represented with the information leakage route information is represented in the access route information. When it is decided that the route represented with the information leakage route information is represented in the access route information, the result output device outputs the corresponding route information. Hence, outputting the route allows the possibility of information leakage to be decided and allows the location where a file having the possibility of leakage is stored to be decided. Moreover, the access route information creator creates access route information based on the setting information, thus capable of deciding the possibility of leakage information according to the setting status of the file storage system.

Moreover, according to the present invention, an information leakage analysis method comprises of the steps of storing access route information by means of an access route information storage, the access route information representing a file stored in a file storage system, a user accessible to the file or other file which can copy the content of the file, and an access route from the user or the other file to a file stored in the system; creating route information by means of a route information creator, the route information specifying as a distribution source a file included in the access route information and specifying as a distribution destination a user or file included in the access route information; deciding whether or not a route from a distribution source to a distribution destination, specified with route information created by the route information creator, is represented in the access route information by means of a route decider; and displaying, by means of a display, a file of a distribution source decisively specified by the route information represented in the access route information, a file or user of a distribution destination, and a route between the distribution source and the distribution destination.

In such a method, the route information creator specifies as a distribution source a file included in access route information and creates route information specifying as a distribution destination a user or file included in the access route information. The route decider decides whether or not the route from a distribution source to a distribution destination, specified by the route information created by the route information creator, is represented in the access route information. The display manifests a file of a distribution source specified by route information decisively represented in the access route information, a file or user of a distribution destination, and a route between the distribution source and the distribution destination. Therefore, a distribution source, a distribution destination, and a route between them, included in the access route information, can be indicated to an operator. By referring to each distribution source, each distribution destination, and a route between them, included in access route information, the operator can decide whether or not the possibility of information leakage.

Moreover, according to the present invention, an information leakage analysis program installed in a computer, the computer comprises an access route information storage for storing access route information, the access route information representing a file stored in a file storage system, a user accessible to the file or other file which can copy the content of the file, and access route from the user or the other file to the file stored in the system; and a setting information storage for storing setting information, the setting information including a network configuration in the system, a file name and a storage location of a file stored in the system, and information regarding a user using an operating system or application installed in the system. The program instructing said computer to execute a route decision process for verifying information leakage route information representing a possible information leakage route with the access route information and deciding whether or not said route represented by the information leakage route information is represented in the access route information; a setting information identification process for specifying setting information associated with the route when it is decided that the route represented by the information leakage route information is represented in the access route information and reading the setting information out from the setting information storage; and a result output process for outputting the setting information.

Such a program can decide the possibility of information leakage based on the output of the setting information. Moreover, since the setting information corresponding to the route having the possibility of information leakage is output, the setting causing an information leakage can be specified.

According to the present invention, an information leakage analysis program instructs a computer to execute a setting information collection process for collecting setting information from said system, the setting information including a network configuration in a file storage system, a file name and a storage location of a file stored in the system, and information regarding a user using an operating system or application installed in the system; an access route information creation process for creating access route information based on the setting information, the access route information representing a file stored in the system, a user accessible to the file or other file which can copy the content of the file, and an access route to a file stored from the user or the other file to the file stored in the system; a route decision process for verifying information leakage route information representing a possible information leakage route with the access route information and deciding whether or not the route represented by the information leakage route information is represented in the access route information; and a result output process for outputting information on the route when it is decided that the route represented by the information leakage route information is represented in the access route information.

Such a program instructs a computer to execute a route decision process and a result output process. That is, the route decision process includes the step of verifying information leakage route information representing a route having the possibility of information leakage with access route information and deciding whether or not the route represented with information leakage route information is represented in the access route information. The result output process includes the step of outputting the route information when it is decided that the route represented with the information leakage route information is represented in the access route information.

Therefore, outputting the route allows the possibility of information leakage to be decided and allows the location where a possible information leakage file is stored to be specified. Moreover, since the program instructs the computer to execute the access route information creation process for creating access route information based on the setting information, the possibility of information leakage can be decided according to the setting status of the file storing system.

Moreover, according to the present invention, in an information leakage analysis program installed in a computer, the computer comprising an access route information storage for storing a file stored in a file storage system, a user accessible to the file or other file which can copy the content of the file, and access route information representing an access route to a file stored from the user or the other file to the system, the program instructs the computer to execute a route information creation process for creating route information, the route information specifying as a distribution source a file included in access route information and specifying as a distribution destination a user of file included in access route information; a route decider for deciding whether or not a route from a distribution source to a distribution destination, specified by route information created in the route information creation process, is represented in the access route information; and a display process for displaying a distribution source file specifying route information decisively represented in the access route information, a distribution destination file or user, and a route between the distribution source and the distribution destination. Therefore, a distribution source, a distribution destination, and a route between them, included in the access route information, can be indicated to an operator. By referring to each distribution source, each distribution destination, and a route between them, included in the access route information, the operator can decide whether or not there is the possibility of information leakage.

BRIEF DESCRIPTION OF THE DRAWINGS

FIG. 25 is an explanatory diagram showing an access route model created based on network configuration information.

FIG. 26 is an explanatory diagram showing an example of network configuration information.

FIG. 27 is an explanatory diagram showing an example of user information.

FIG. 35 is an explanatory diagram illustrating file information and access right information.

FIG. 37 is an explanatory diagram showing an example of apache setting information.

FIG. 39 is an explanatory diagram showing an example of firewall access right information.

FIG. 41 is an explanatory diagram showing an example of an access route model stored in an access route model storage.

FIG. 43 is an explanatory diagram showing an example of an analysis-intended access route.

FIG. 45 is an explanatory diagram showing an example of information, which includes setting information added to an access route model.

FIG. 46 is an explanatory diagram showing an example of information, which includes setting information added to an access route model.

FIG. 47 is an explanatory diagram showing an example of a user interface for displaying an information leakage countermeasure.

FIG. 48 is an explanatory diagram showing an example of an edit screen.

FIG. 49 is an explanatory diagram showing an example of a user interface for displaying an information leakage countermeasure.

FIG. 50 is an explanatory diagram showing an example of a rewritten apache setting file.

FIG. 51 is an explanatory diagram showing an example of a screen displaying alteration candidates according to priority orders.

FIG. 52 is an explanatory diagram showing an example of UI showing setting file names describing setting information.

EXPLANATION OF SYMBOLS

- 110 Access route model input device
- 130 Setting information input device
- 1010 Verification-intended system
- 1040 Access route model storage
- 1050 Analysis-intended access route input device
- 1060 Access route decider
- 2010 Setting information storage
- 2020 Setting information identification means
- 3010 Information leakage countermeasure storage
- 3030 Setting change input device
- 3040 Information leakage countermeasure proposer
- 3050 Countermeasure executioner

BEST MODE FOR CARRYING OUT THE INVENTION

A best mode embodying the present invention will be explained below by referring to the attached drawings.

Embodiment 1

Figure 1:
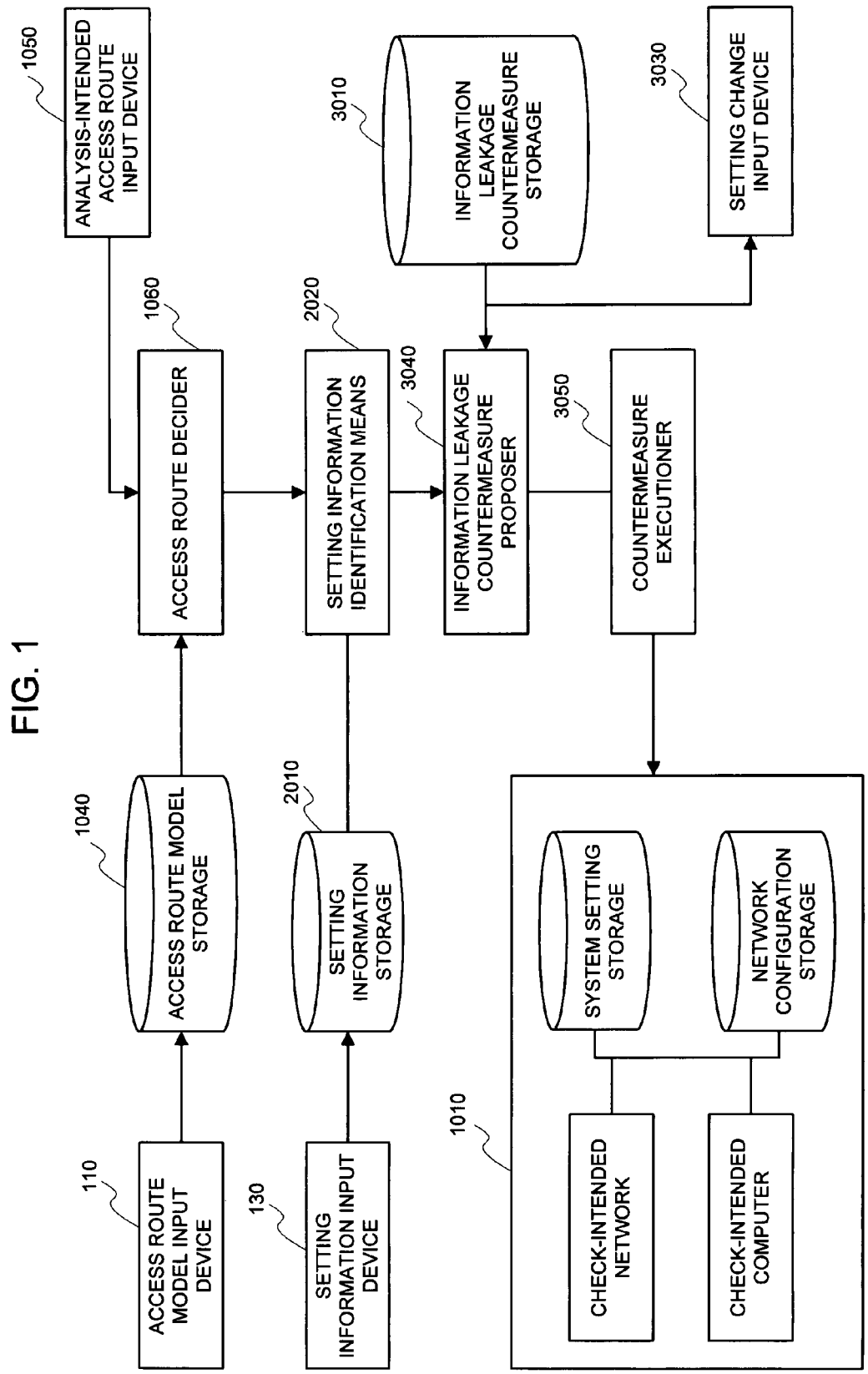
FIG. 1 is a block diagram illustrating a first embodiment of the present invention.

FIG. 1 is a block diagram illustrating a first embodiment of the present invention. In the present embodiment, an information leakage analysis system includes an access route model input device 110, an access route model storage 1040, an analysis-intended access route input device 1050, an access route decider 1060, a setting information input device 130, a setting information storage 2010, a setting information identification means 2020, an information leakage countermeasure storage 3010, an information leakage countermeasure proposer 3040, a setting change input device 3030, a countermeasure executioner 3050, and a verification-intended system 1010.

Terms used in explanation of the present invention will be defined here.

An access route model represents an access route through which a user is accessible to a type of file. An access route model may also represent an access route through which a file is accessible to a type of file. A file-to-file access is an operation in which one file copies the content of another file. An access route model is created based on setting information.

The setting information includes the system setting of a verification-intended system and a network configuration.

System setting means information representing the setting that defines the behavior of an OS (operating system) or an application. System setting includes user configuration, file configuration, and access right information. The system setting may include at least one of filtering configuration, alias definition information, filtering information, user aggregation information and authorization capture information. The user configuration represents user management information, which includes user ID, defined by each application, OS, or user management server, and which includes user ID and location information thereof. In other words, user configuration means information regarding users using OS or applications, installed in a verification-intended system. User configuration may be often described as user information. File configuration, which means information representing a file name and the storage location thereof, may include information regarding directories. File access right information, which means information representing an access right of a user to a file, denotes read/write rights. Filtering configuration denotes information representing a network filtering setup by IP address or port number.

Alias definition information means information representing an alias definition of a file. When an application software or OS represents the same files with different names, it is said that each file is subjected to alias definition. For example, when the same file is indicated as a file named as "/var/www/htdoc/index.html" in OS and is indicated as a file named as "http://example.com/index.html" on a web server, the two files are under an alias definition. Information representing that a different OS or application software indicates the same file with a different name is alias definition information. For example, the alias setting through the setting of a web server or a symbolic link of OS is represented as alias definition information.

Filtering information means information defining whether or not to which access route the setting of a network filtering defined in a filtering configuration is effective. When there is an effective filtering configuration on an access operation by a specific user, a group of the corresponding user configuration and the filtering configuration becomes defined information. In addition to the group of the user configuration and the filtering configuration, network configurations and a group of a network configuration and a file configuration may be handled as filtering information. User set information means information representing that users are handled as a group. Authorization capture information means information representing that a user acquire the authorization of other user by setting user verification or execution user of an application and acts as the other user.

Network configuration is information representing a connection status of a network interface, more specifically, representing a connection relationship between computers in a network.

Access route is represented using a graph configuration configured of, for example, nodes and arcs. There are, as nodes, a user node modeling a user configuration, a file node node-configuring a file configuration, and a network node node-configuring a filtering configuration. There are, as arcs, an alias definition arc modeling alias definition information, a data transfer relation arc modeling access right information, a network arc modeling filtering information, an affiliation arc modeling user set information, and an authorization capture arc modeling an authorization capture relation. Permission or non-permission of access to a file by a file access right and permission or non-permission of access by a network filtering can be decided with the access route model. The access route can be represented with a row (a line of nodes) including at least one of a user node, a network node, and a file node. The access route may be represented with a row (a line of nodes or arcs) including arcs in addition to nodes.

Next, various components in the information leakage analysis system will be explained here. The access route model input device 110 receives an access route model to be inspected. The access route model storage 1040 stores an access route model input by the access route model input device 110 and outputs the access route model in response to a request from the access route decider 1060.

The analysis-intended access route input device 1050 receives an analysis-intended access route as information leakage criteria. An analysis-intended access route acting as information leakage criteria corresponds to a route, which specifies a distribution source file subjected to the decision of information leakage and a file or user of the corresponding distribution destination. A route on the way through which a file passes may be specified or part of an access route model may be specified without change. An analysis-intended access route represents that there is the possibility of information leakage through the route when a route from a file matching with an analysis-intended access route to a user or file exists among access route models. That is, the analysis-intended access route represents a route having the possibility of information leakage and not existing normally (or a route from a file to a user or file). In an analysis-intended access route, a file is specified as a file distribution source and a file or user is specified as a distribution destination. For example, a file, to which a user ID for accessing an information leakage decision intended file or a decision-intended file (or a file to be copied) is written, is specified as a file distribution destination. A file may be specified with a directory name, a host name, or a segment name, or the like, included in the file. When a route on the way of an analysis-intended access route is specified, the route may be specified with, for example, a network address, a port number, an instrument name including them, or a segment name.

The access route decider 1060 extracts an access route model from the access route model storage 1040, matches it with an analysis-intended access route input by the analysis-intended access route input device 1050, and decides whether or not the analysis-intended access route is on the access route model. When deciding the analysis-intended access route exists in the access route model, the access route decider 1060 decides a file at a distribution source of the analysis-intended access route as a possible information leakage file. The access route decider 1060 decides as an information leakage route the model matched with an analysis-intended access route, of access route models.

The setting information input device 130 receives setting information corresponding to each factor in an access route model and information representing a storage location of the setting information in the verification-intended system 1010. Moreover, the setting information storage 2010 stores (records) setting information and information representing the storage location for the setting information. The storage location for each setting information in the verification-intended system 1010 is represented as a host name, a file name, the number of lines indicating descriptive positions in a file, a variable name, or the like. The setting information input device 130 receives and stores corresponding information representing a corresponding relationship between each factor and each setting information in an access route model into the setting information storage 2010. The corresponding information is created by, for example, an operator.

As to the access route model input device 110, the analysis-intended access route input device 1050, and the setting information input device 130, information may be input through, for example, an operator's procedure.

The setting information storage 2010 stores information (such as setting information or corresponding information) input by the setting information input device 130 and outputs them upon request of the setting information identification means 2020.

The setting information identification means 2020 identifies and reads the setting information causing creation of the access route (original setting information determining an access route), based on an access route matched to an analysis-intended access route, decided by the access route decider 1060, and based on the corresponding information stored in the setting information storage 2010.

Based on an access route matched with an analysis-intended access route, decided by the access route decider 1060, and based on setting information specified by the setting information identification means 2020, the information leakage countermeasure proposer 3040 extracts and indicates a typical setting example, which cuts the matched access route, from the information leakage countermeasure storage 3010. Moreover, in place of taking out the countermeasure proposal from the information leakage countermeasure storage 3010, the information leakage countermeasure proposer 3040 may receive a countermeasure proposal with the setting change input device 3030 or may change part or all of a countermeasure proposal extracted from the information leakage countermeasure storage 3010.

The information leakage countermeasure storage 3010 stores (records) changed contents and methods for performing an information leakage countermeasure and change validating methods, for each setting information. The information leakage countermeasure storage 3010 stores, as a changed content, a current-setting text pattern and an alteration candidate text pattern. Current setting and alteration candidate patterns are described, for example, in regular expression. In a concrete example, in an information leakage countermeasure proposal to a file access right for OS, (.+?+){8}(.*) is described as a current setting and chmod700$9 is described as an alteration candidate. Moreover, in the countermeasure proposal regarding the packet filtering rule, (.*) accept is described, for example, as a current setting and iptables?A$1drop is described as an alteration candidate. The information leakage countermeasure proposals, described above, are shown as examples but the present invention should not be limited to only the examples. As to the method (the method for changing setting), there is command execution or text rewriting. The command execution means executing a setting command (for example, a setting tool associated with an application or an execution command for an application created for a change of setting). If the changing method is of a type of command execution, commands are described in information on information leakage countermeasure proposals. Text rewriting means that, in an application set in a text file, the setting is altered by changing the text. The setting validating method means the method for validating the setting. The setting validating method includes the aspect of validating the setting through execution of a setting validating command and the aspect of validating the setting through rebooting an application. Those aspects are described in the information on information leakage countermeasure proposals. The information leakage countermeasure storage 3010 stores various information leakage countermeasure proposals in correspondence with various sets of setting information and with descriptive contents thereof.

The information leakage countermeasure proposer 3040 proposes (or manifests) setting information specified by the setting information identification means 2020 and setting information regarding an alteration candidate taken out of the information leakage countermeasure storage 3010. When the information leakage countermeasure storage 3010 is not incorporated or does not store the corresponding setting change proposal, the setting information, being an alteration candidate, may not occupy a blank space or the same content as that in the current setting may be displayed.

According to an operation of an operator, the setting change input device 3030 changes information leakage countermeasure proposal proposed by the information leakage countermeasure proposer 3040, inputs a new information leakage countermeasure proposal, and selects an information leakage countermeasure proposal.

The countermeasure executer 3050 reflects the information leakage countermeasure proposal, that is, the setting, which is selected by the setting change input device 3030, onto a verification-intended system.

Figure 2:
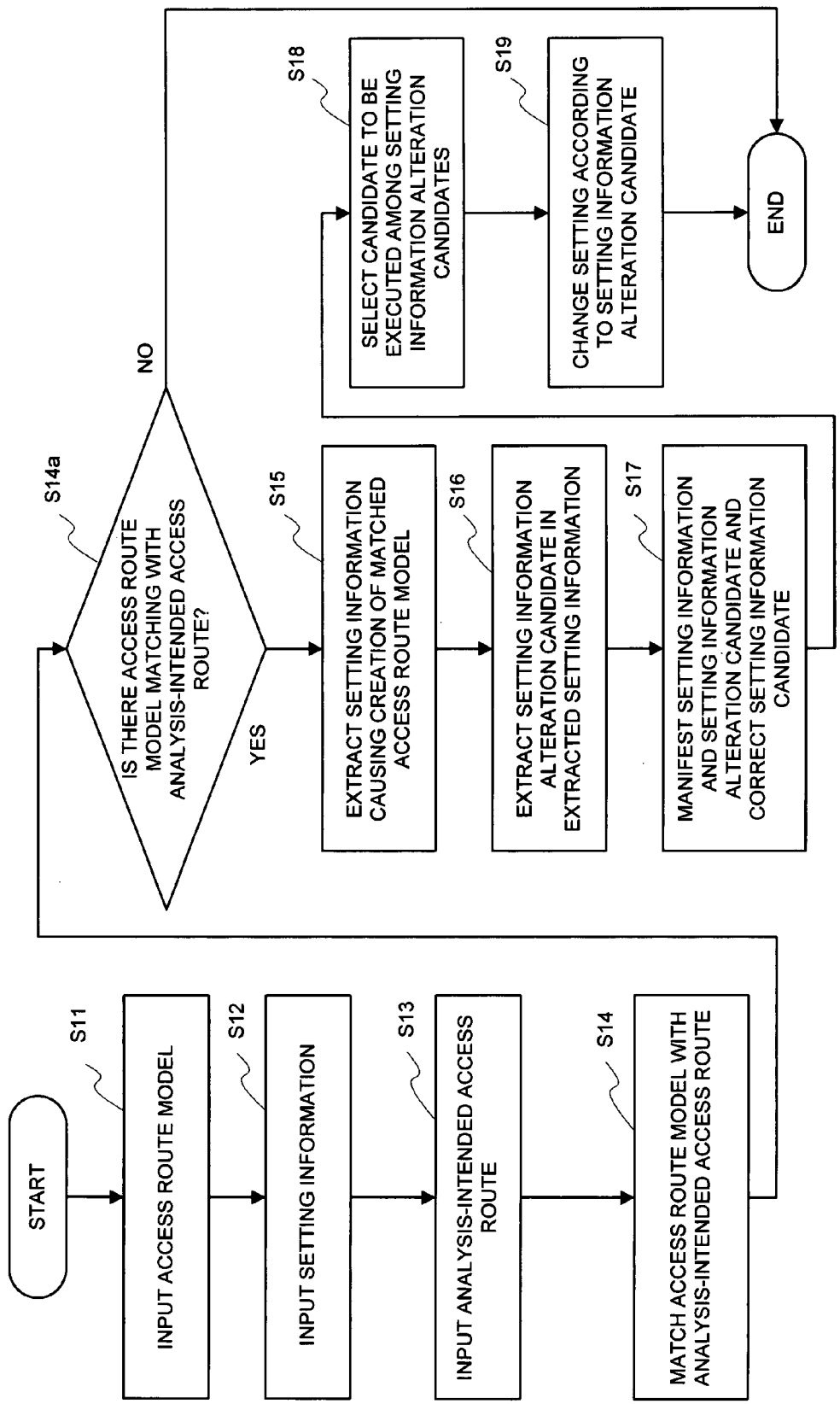
FIG. 2 is a flowchart showing an operation of an information leakage analysis system according to the first embodiment.

Next, the operation of the present system will be explained below. FIG. 2 is a flowchart illustrating an operation of an information leakage analysis system according to the first embodiment. First, the access route model input device 110 receives an access route model and stores it into the access route model storage 1040 (step S11). Next, the setting information input device 130 receives setting information corresponding to the input access route model, information representing the storage location of the setting information in the verification-intended system 1010, and corresponding information representing a correspondence relationship between the access route model and the setting information and then stores them into the setting information storage 2010 (step S12). Next, the analysis-intended access route input device 1050 receives an analysis-intended access route (step S13).

In succession, the access route decider 1060 extracts an access route model from the access route model storage 1040 and collates the access route model with the analysis-intended access route (step S14). As a result of the verification process in the step S14, the access route decider 1060 (or the setting information identification means 2020) decides whether or not an access route matching with an analysis-intended access route has existed (step S14*a*). If there is an access route matching with an analysis-intended access route (YES in step S14*a*), the setting information identification means 2020 refers to the corresponding information stored in the setting information storage 2010. Then, the setting information identification means 2020 extracts the setting information causing the creation of the matched access route (or the original setting information determining the access route) (step S15).

Next, the information leakage countermeasure proposer 3040 extracts an information leakage countermeasure stored in the information leakage countermeasure storage 3010 based on the setting information taken out in the step S15 (step S16). The information leakage countermeasure storage 3010, which stores respective information leakage countermeasures in correspondence with respective setting information and the contents described therein, can extract an information leakage countermeasure corresponding to setting information in the step S16. In succession, the information leakage countermeasure proposer 3040 displays access route setting information and information leakage countermeasure setting information (an alteration candidate) corresponding thereto and corrects the alteration candidate according to an operator's operation (step S17). Next, the information leakage countermeasure proposer 3040 stimulates the operator to select an alteration candidate to be reflected to the verification-intended system 1010, of displayed alteration candidates, and decides it according to the operator's operation (step S18). The countermeasure executer 3050 changes the setting of verification-intended system 1010 according to the setting content indicated by the alteration candidate (step S19). As a result, the access route corresponding to the analysis-intended access route is removed, so that a leakage of information can be prevented.

Next, the effect of the first embodiment will be explained here. In the present embodiment, the system receives a model representing a verification-intended system, setting information associated with models, and an analysis-intended access route, being handled as an information leakage criterion. The configuration may be made that finds and corrects an information leakage route based on the input information. Hence, a file access route can be grasped on the model to specify a possible information leakage file and an access route therefor. Moreover, since the configuration indicates an alteration candidate corresponding to the setting information associated with the model and changes the setting, the setting can be easily changed to prevent a leakage of a possible information leakage file. As a result, an information leakage can be prevented.

The information leakage countermeasure proposer 3040 corresponds to a result output device that outputs setting information specified by the setting information identification means.

Embodiment 2

Figure 3:
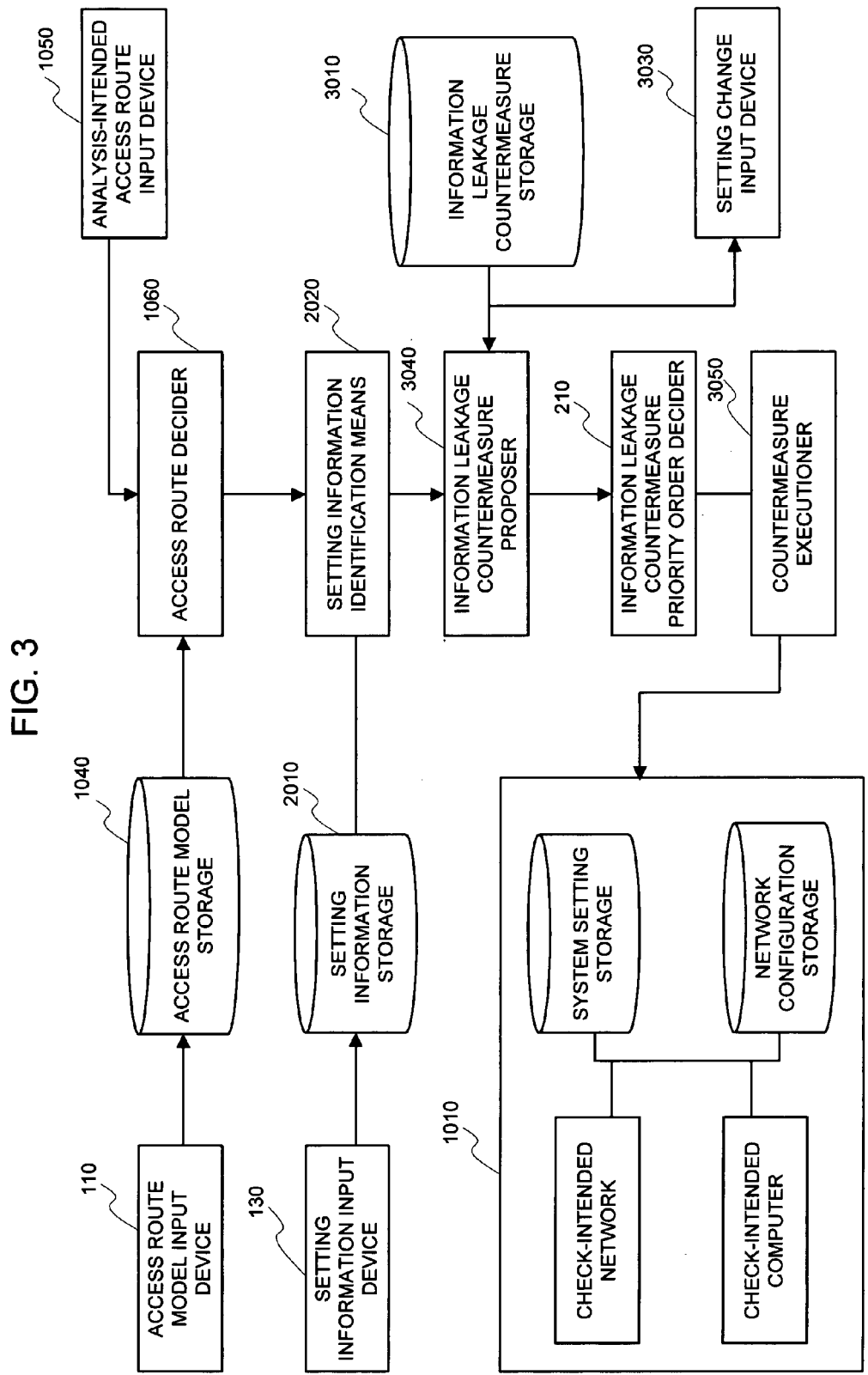
FIG. 3 is a block diagram illustrating a second embodiment of the present invention.

FIG. 3 is a block diagram illustrating a second embodiment. In the present embodiment, an information leakage analysis system includes an information leakage countermeasure priority order decider 210, together with the configuration in the first embodiment. Like numerals are attached to the same constituent elements as those in the first embodiment and hence duplicate explanation will be omitted here.

The information leakage countermeasure priority order decider 210 ranks plural setting change proposals (alteration candidates of setting information) proposed by the information leakage countermeasure proposer 3040 in the order suitable for changing. The ranking is made in an increasing order of the effect on the verification-intended system 1010 due to the setting change for information leakage prevention. As a method of arranging candidate proposals in an increasing order of an effect due to a setting change, there is a method of using positions on a route. For example, alteration candidate proposals are arranged in the order from the position nearer to the distribution source of an information leakage route. That is, alteration candidate proposals are arranged in the order of an alteration candidate regarding a distribution file storage location, an alteration candidate regarding an information leakage route access right, and the like. By doing so, candidate proposals can be arranged in the order ranging from a setting change influencing only distribution files to a setting change largely influencing files other than the distribution files. Moreover, an effect due to a change of setting information may be calculated using models. For example, the information leakage countermeasure priority order decider 210 instructs the access route decider 1060 to decide all routes sharing the nodes or arcs of which the setting is changed. The information leakage countermeasure priority order decider 210 may rank alteration candidates in an increasing order of the number of access routes sharing nodes or arcs of which the setting is changed.

Figure 4:
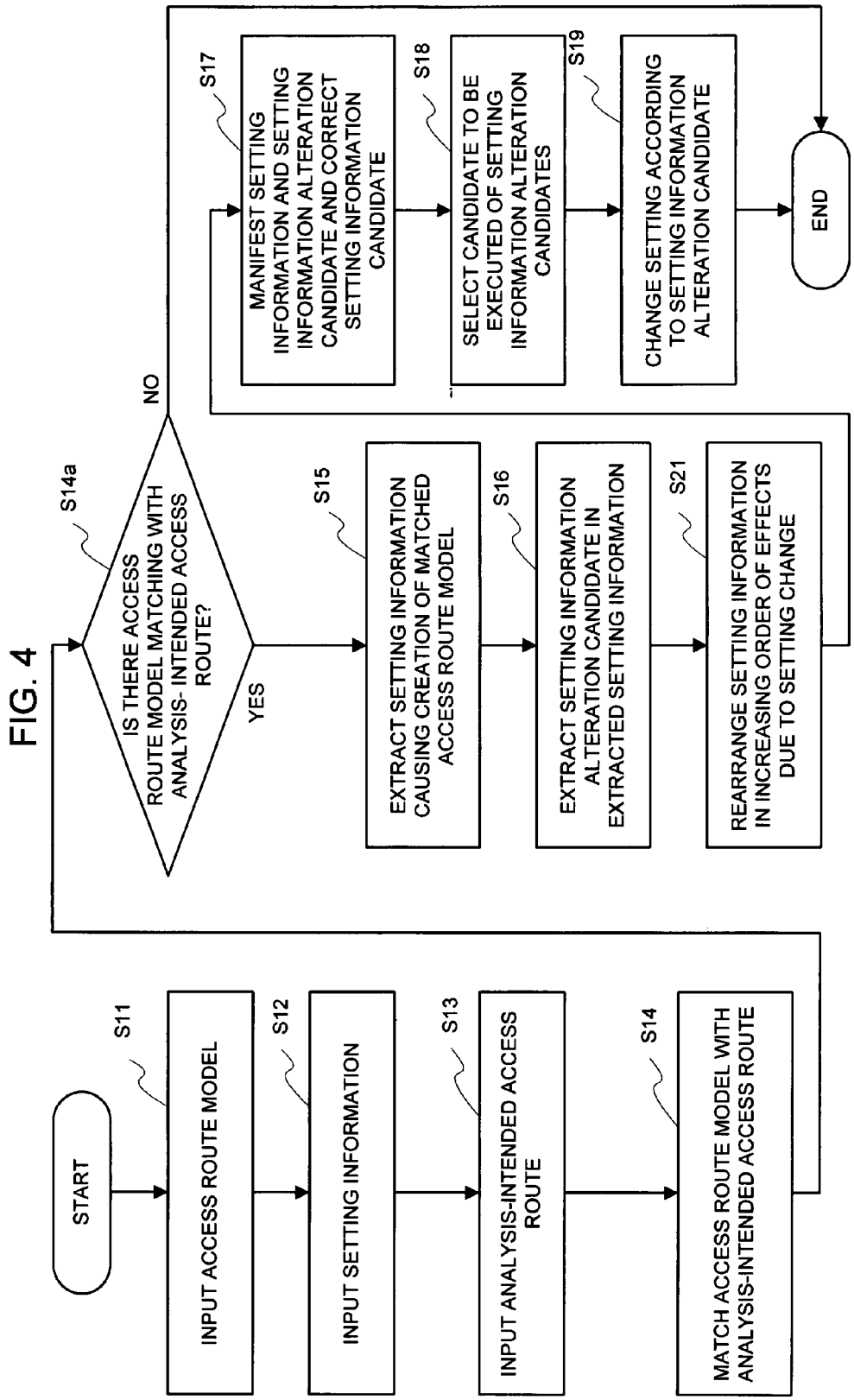
FIG. 4 is a flowchart showing an operation of an information leakage analysis system according to the second embodiment.

FIG. 4 is a flowchart illustrating an operation of the information leakage analysis system in the second embodiment. The operations in the steps S11 to S16 shown in FIG. 4 are similar to those in the steps S11 to S16 in the first embodiment. After the step S16, the information leakage countermeasure priority order decider 210 rearranges setting information alteration candidates extracted in the step S16 in an increasing order of the effect on the verification-intended system 1010 due to a setting change. The order is set as a display order of information leakage countermeasure proposals including setting information alternation candidates by the information leakage countermeasure proposer 3040 (step S21). The operations after the step S17 are performed after the step S21. The operations after the step S17 are similar to those after the step S17 in the first embodiment.

The second embodiment can provide the same effect as that in the first embodiment. The configuration displays such that information leakage countermeasure proposals including setting information alternation candidates are rearranged in an increasing order of the effect on the verification-intended system 1010 due to a setting change. Hence, the operator (verifier) can easily select a countermeasure having the effect on the verification-intended system as little as possible.

Embodiment 3

Figure 5:
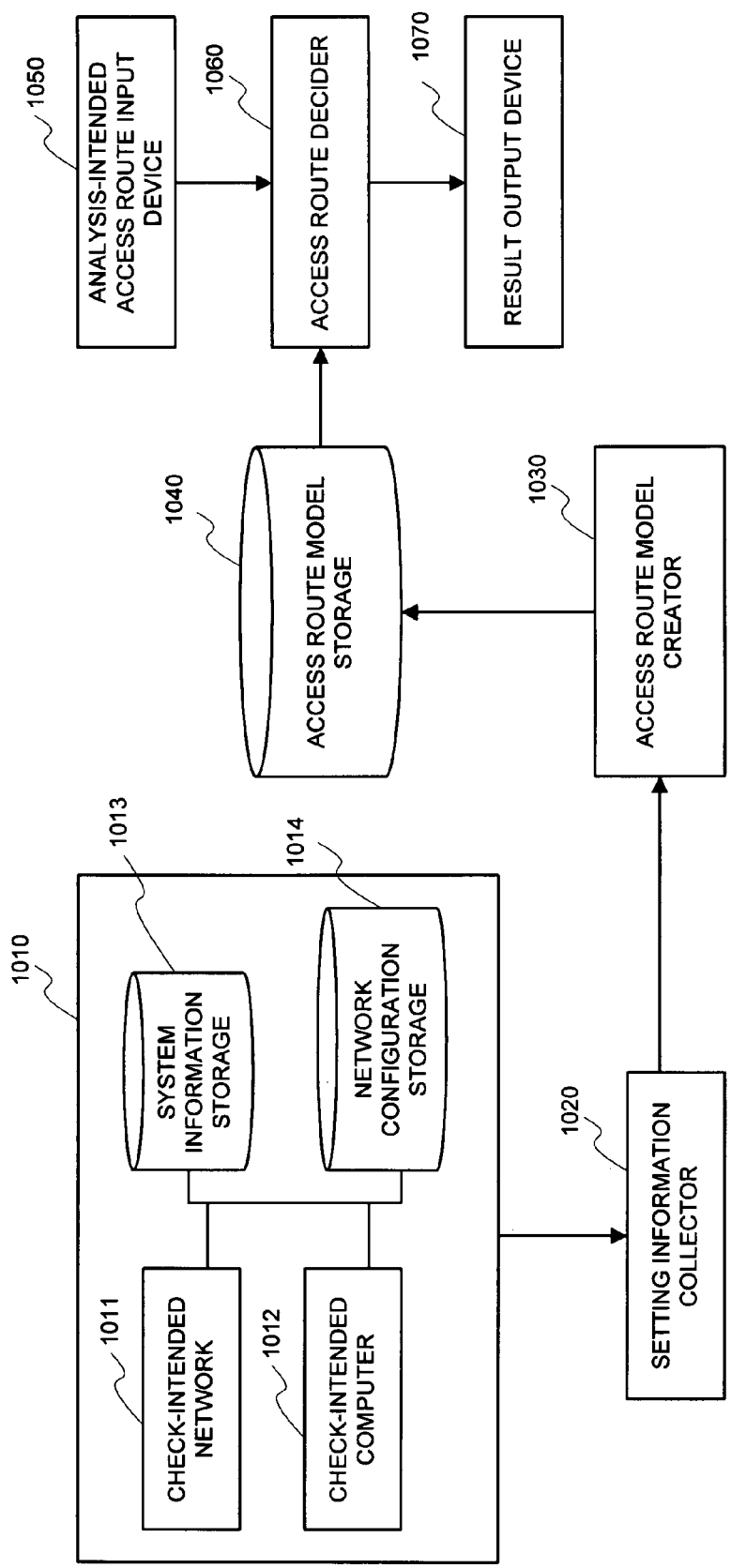
FIG. 5 is a block diagram illustrating a third embodiment of the present invention.

FIG. 5 is a block diagram illustrating a third embodiment of the present invention. Like numerals are attached to the same constituent elements as those in the first and second embodiments and hence duplicate explanation will be omitted here.

In the present embodiment, the information leakage analysis system comprises a verification-intended system 1010 including a computer or network to be inspected, a setting information collector 1020, an access route model creator 1030, an access route model storage 1040, an analysis-intended access route input device 1050, an access route decider 1060, and a result output device 1070.

The verification-intended system 1010 includes a check-intended network 1011, a check-intended computer 1012, a system information storage 1013 for storing the setting of the check-intended computer, and a network configuration storage 1014 for storing the setting of the network configuration. That configuration is similar to that in the first embodiment and the second embodiment.

The setting information collector 1020 collects the setting information from the verification-intended system 1010. The access route model creator 1030 creates an access route model based on the setting information collected by the setting information collector 1020. The access route model storage 1040 stores an access route model created by the access route model creator 1030 and outputs it in response to a request from the access route decider 1060.

The analysis-intended access route input device 1050 receives an analysis-intended access route as an information leakage criterion. The access route decider 1060 extracts an access route model from the access route model storage 1040 and decides whether or not the analysis-intended access route model input by the analysis-intended access route input device 1050 is an access route model.

The result output device 1070 manifests a route in the access route model, decided as one matching with the analysis-intended access route, and a file on the route, by means of the access route decider 1060.

Figure 6:
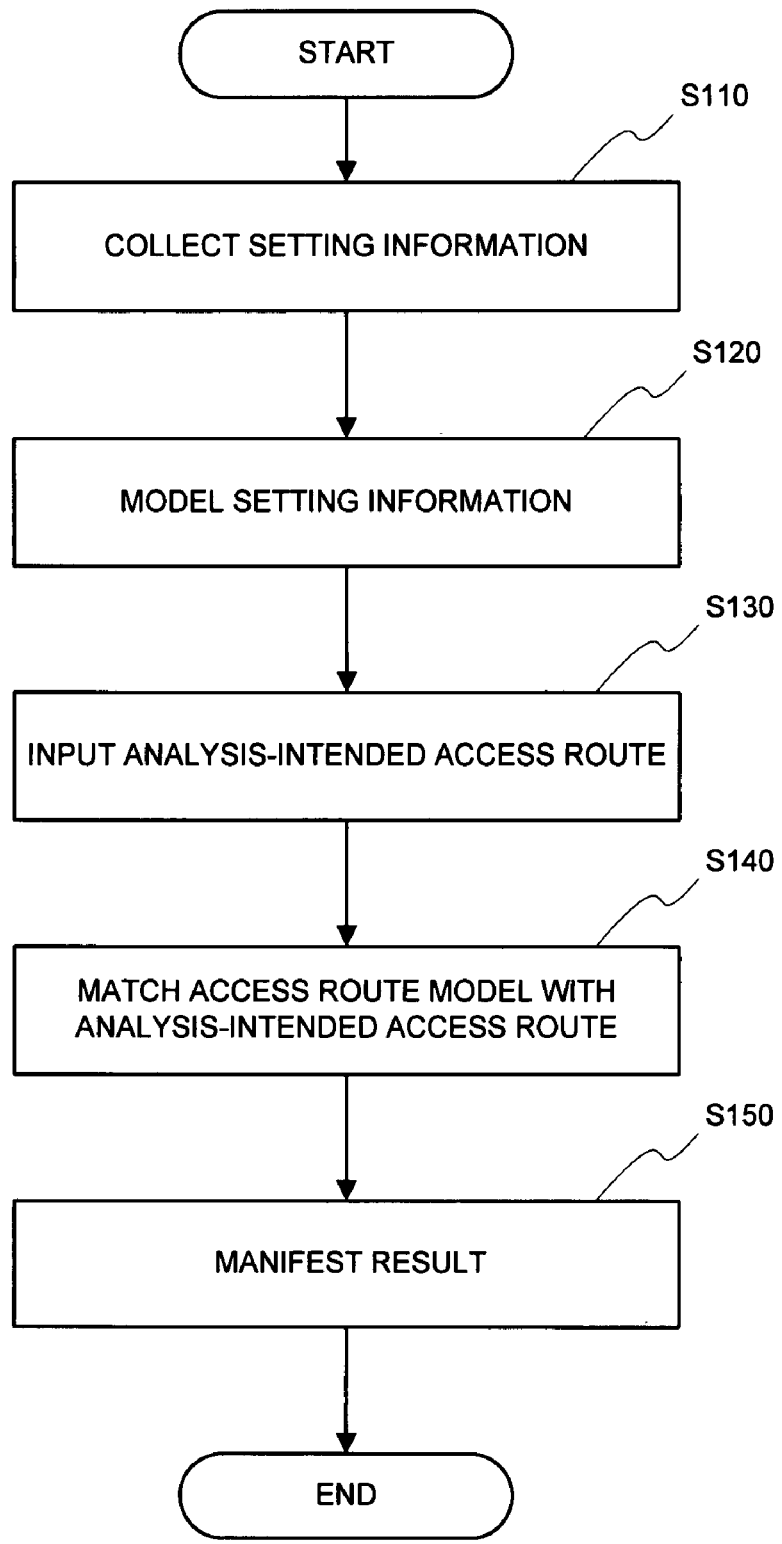
FIG. 6 is a flowchart showing an operation of an information leakage analysis system according to the third embodiment.

FIG. 6 is a flowchart illustrating an operation of the information leakage analysis system in the third embodiment. First, the setting information collector 1020 collects the setting information of the verification-intended system 1010 (step S110). The access route model creator 1030 models the verification-intended system 1010 based on the collected setting information and creates an access route model (step S120). The created access route model is stored into the access route model storage 1040. Next, the analysis-intended access route input device 1050 receives an analysis-intended access route (step S130). The access route decider 1060 extracts an access route model from the access route model storage 1040 and matches the access route model with the analysis-intended access route (step S140). The result output device 1070 manifests the matching result (a route in an access route model decided as one matching with an analysis-intended access route and file information on the route) (step S150). Specifically, the result output device 1070 manifests information on a file and an access route to the file.

Figure 7:
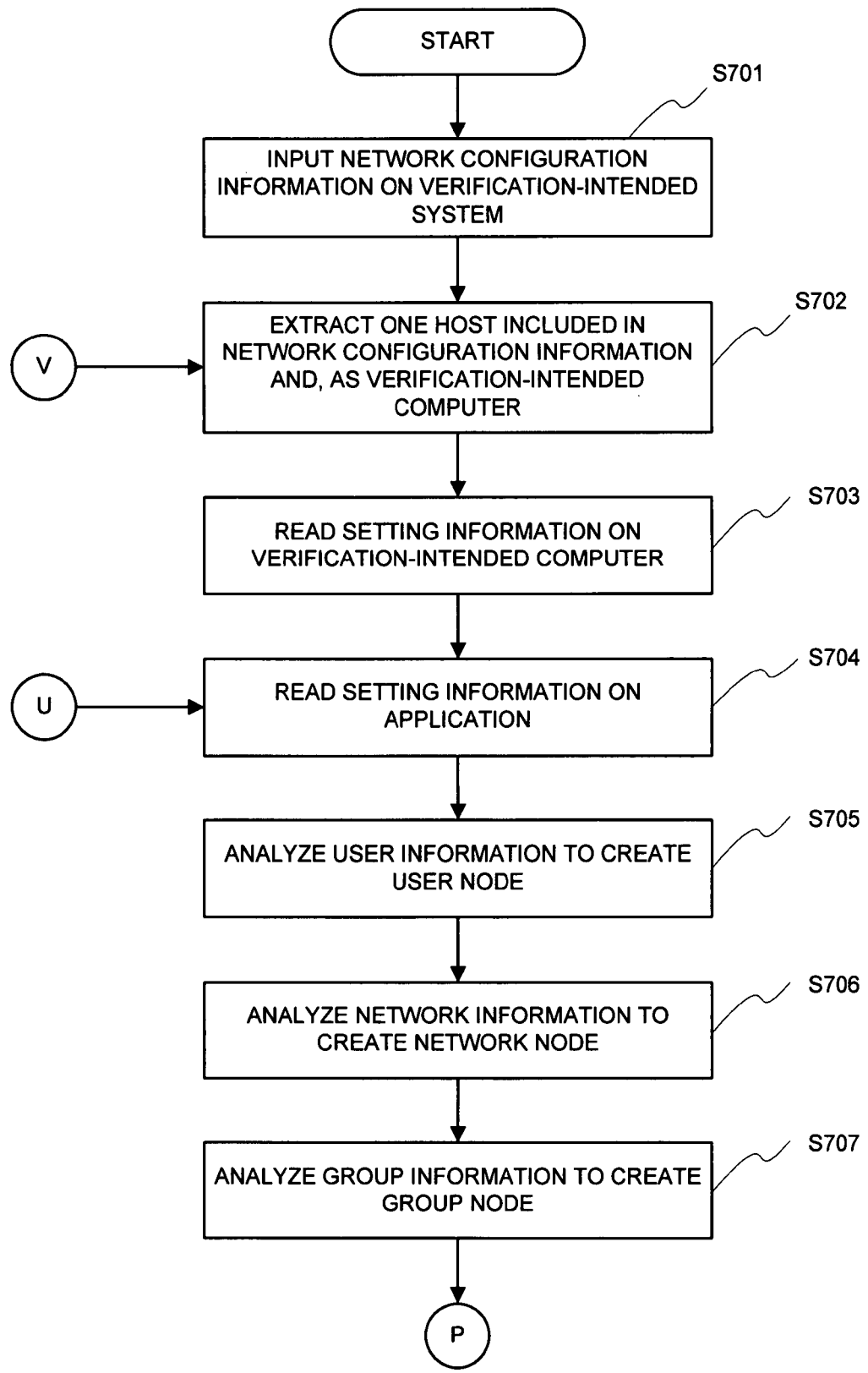
FIG. 7 is a flowchart showing a progress in an access route model creation process.
Figure 8:
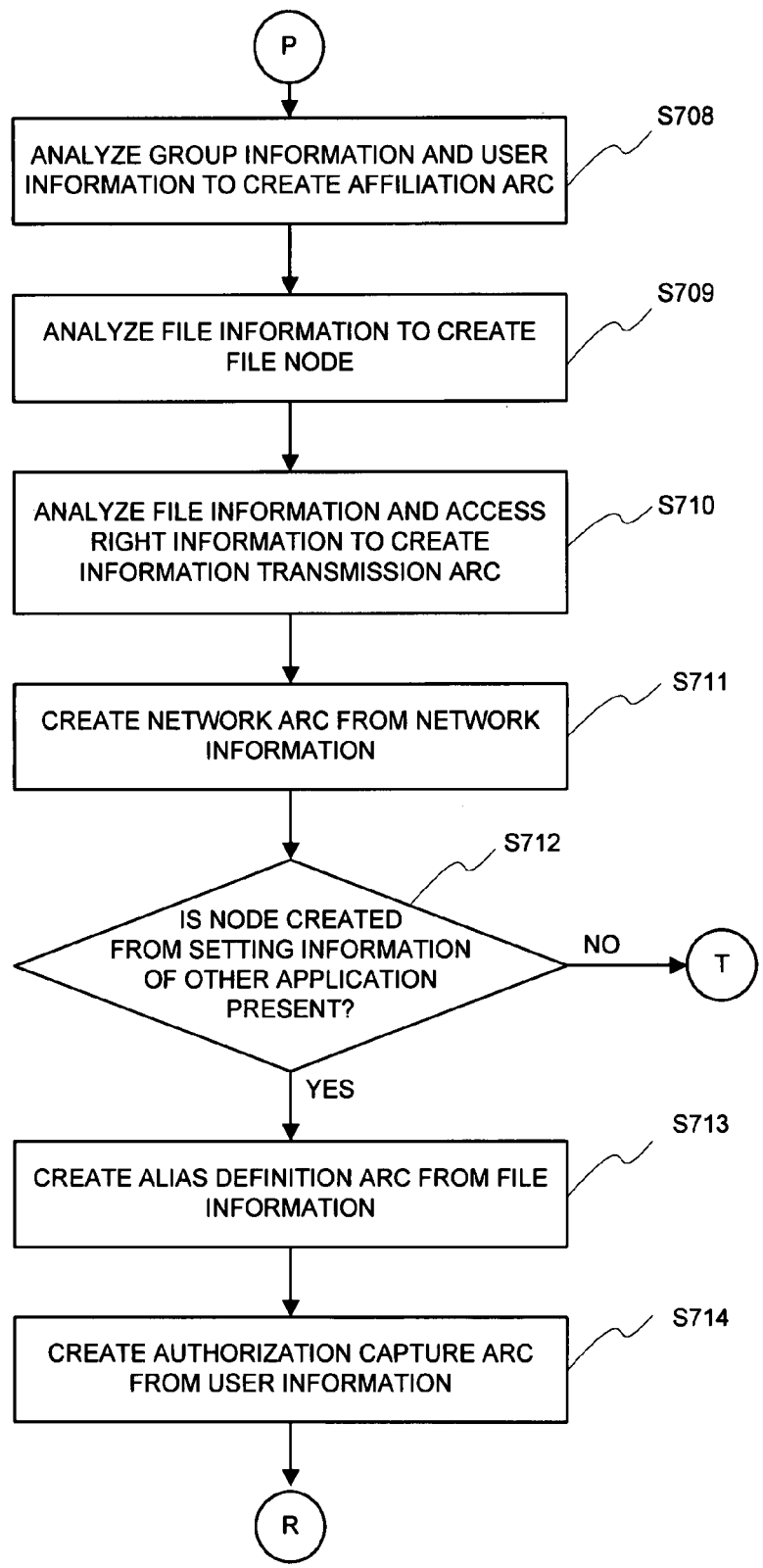
FIG. 8 is a flowchart showing a progress in an access route model creation process.
Figure 9:
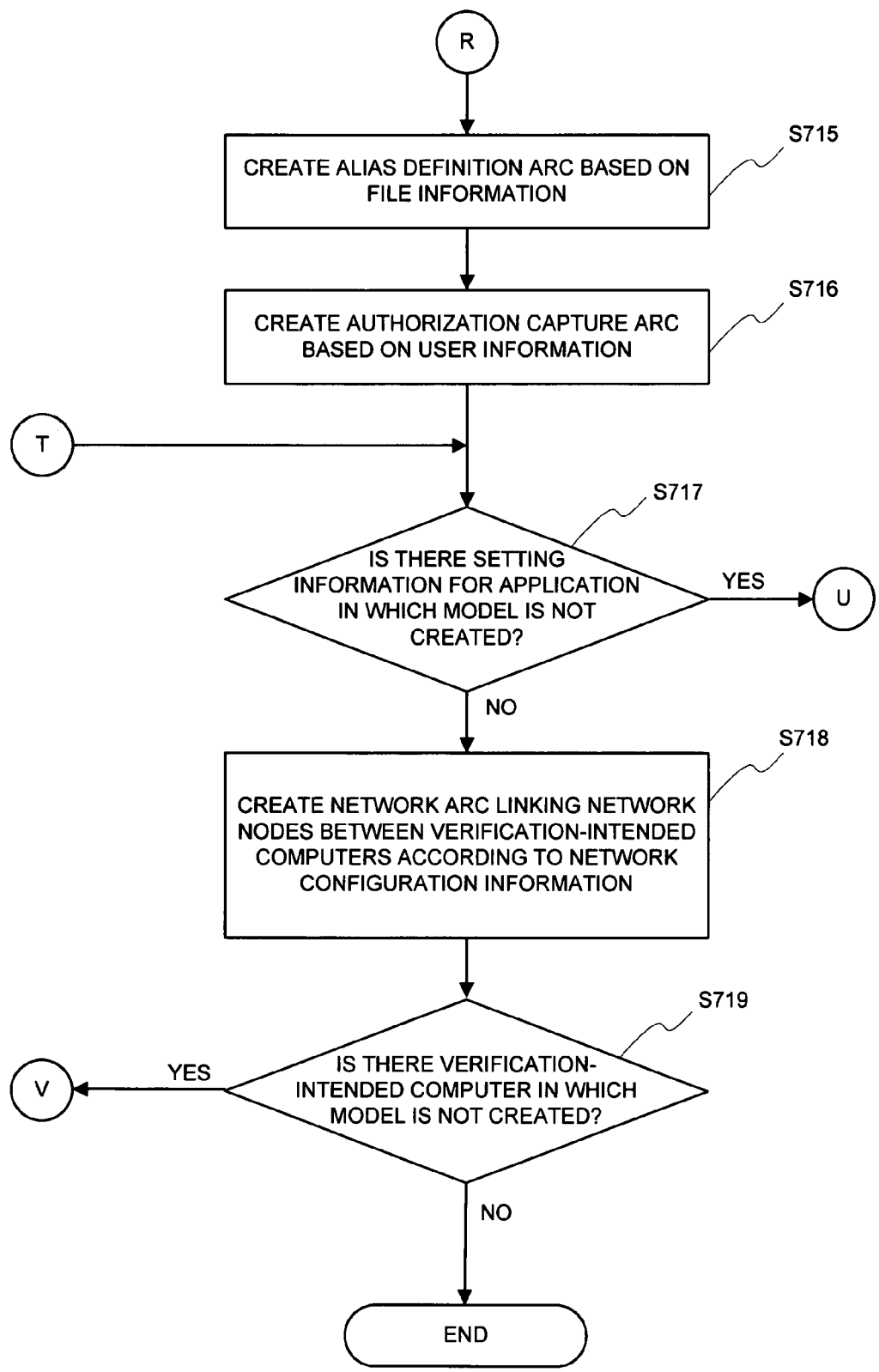
FIG. 9 is a flowchart showing a progress in an access route model creation process.

Next, an access route model creating process (refer to step S120 in FIG. 6) by the access route model creator 1030 will be explained in detail. FIGS. 7, 8 and 9 are flowcharts each illustrating an access route model creating process. The access route model creator 1030 receives network configuration information in the verification-intended system 1010, of setting information collected in the step S110 (step S701), and extracts, as a verification-intended computer, one of hosts included in the network configuration information (step S702).

Successively, the access route model creator 1030 reads the setting information of a verification-intended computer of sets of collected setting information (step S703) and reads the application setting information installed in the verification-intended computer (step S704). The access route model creator 1030 analyzes user information of read-in setting information and creates a user node (step S705). Moreover, the access route model creator 1030 analyzes the network information and creates a network node (step S706). Moreover, the access route model creator 1030 analyzes group information (user set information) in the read-in setting information and creates a group node (step S707).

After the step S707, the access route model creator 1030 analyzes the group information and the user information and creates an affiliation arc (refer to step S708 in FIG. 8). Moreover, the access route model creator 1030 analyzes file information in the read-in setting information and creates a file node (step S709). Successively, the access route model creator 1030 analyzes file information and access right information and creates an information transmission arc (step S710). Moreover, the access route model creator 1030 creates a network arc from the network information (step S711).

After the step S711, the access route model creator 1030 decides whether or not a node created based on the setting information of another application exists (step S712). If the relevant node does not exist, the flow goes to the step S717 (refer to FIG. 9). If the relevant node exists, the access route model creator 1030 creates an alias definition arc based on the file information (step S713) and creates an authorization capture arc based on the user information (step S714).

After the step S714, the access route model creator 1030 creates an alias definition arc based on the file information and creates an authorization capture arc based on the user information (step S716).

Successively, the access route model creator 1030 decides whether or not there is the setting information of an application to which a model is not created (step S717). If yes, the process after the step S704 is repeated. If no, a network arc linking a network node between verification-intended computers is created according to the network configuration information (step S718).

After the step S718, the access route model creator 1030 decides whether or not there is a verification-intended computer, which has not created a model, (step S719). If yes, the process after the step S702 is repeated. If no, the access route model creation process ends.

Next, the effect of the present embodiment will be explained here.

The configuration in the present embodiment collects the setting information of a verification-intended system, creates an access route model based on the setting information and analyzes whether or not an input analysis-intended access route exists in the access route model. Therefore, the file access route can be grasped and the possibility of information leakage can be checked. Moreover, by analyzing the setting information causing the creation of the access route, the setting information causing an information leakage is easily specified so that a leakage of information can be prevented previously.

Embodiment 4

Figure 10:
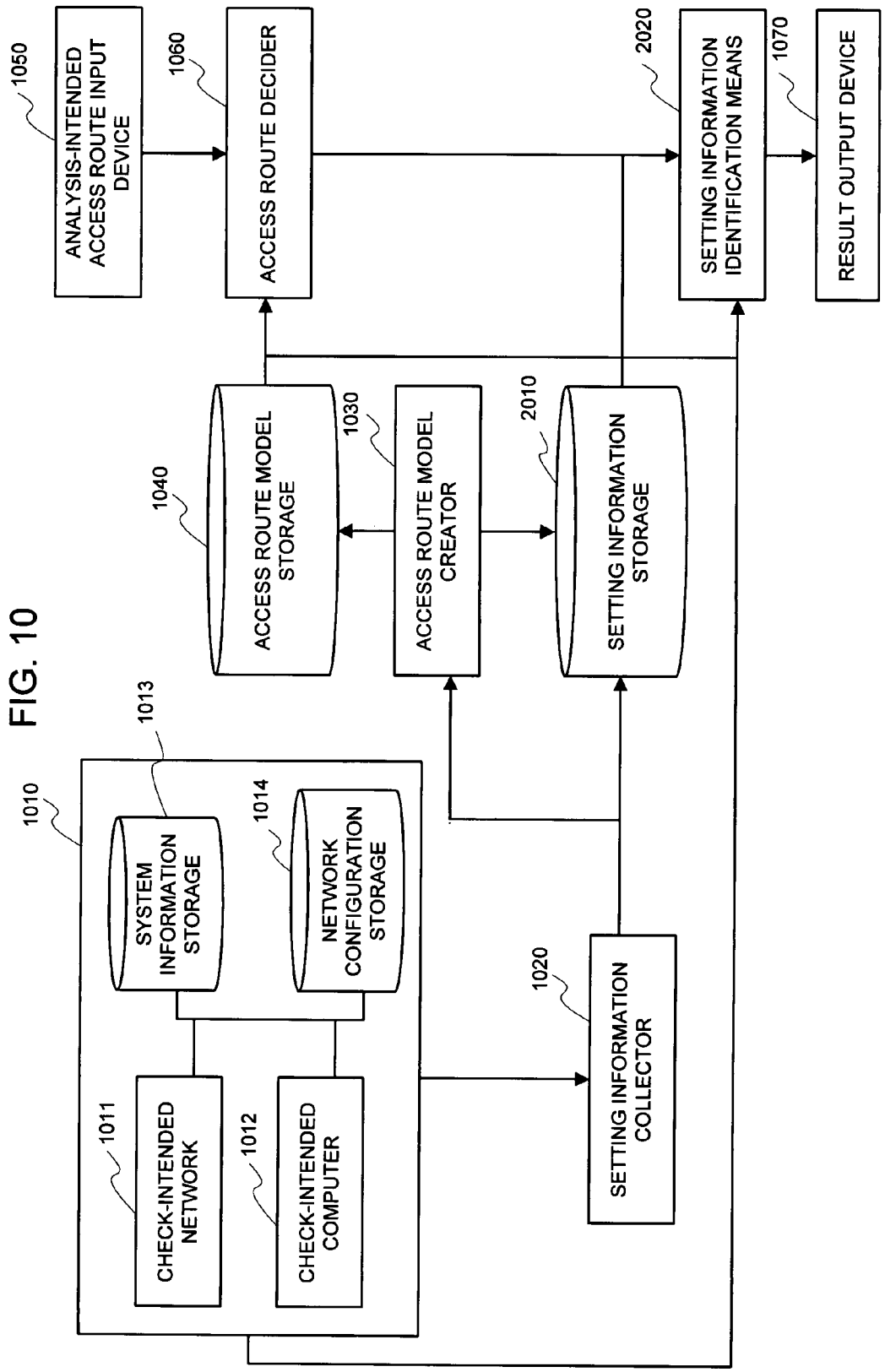
FIG. 10 is a block diagram illustrating a fourth embodiment of the present invention.

FIG. 10 is a block diagram illustrating a fourth embodiment. Like numerals are attached to the same constituent elements as those in the above-mentioned embodiments and hence duplicate explanation will be omitted.

According to the present embodiment, the information leakage analysis system includes a verification-intended system 1010, a setting information collector 1020, an access route model creator 1030, an access route model storage 1040, an analysis-intended access route input device 1050, an access route decider 1060, a setting information storage 2010, a setting information identification means 2020, and a result output device 2030. The verification-intended system 1010 includes a check-intended network 1011, a check-intended computer 1012, a system setting storage 1013 for storing the setting of the check-intended computer, and a network configuration storage 1014 for storing the setting of a network configuration.

The access route model creator 1030 creates an access route model based on the setting information collected by the setting information collector 1020 and stores (records) correspondence information between the setting information causing the creation of an access route model and an access route model, into the setting information storage 2010. In the present embodiment, the access route model creator 1030 creates the correspondence information.

Correspondence information is information representing the correspondence relationship between each factor and each setting information in an access route model. More specifically, correspondence information shows the correspondence relationships between configuration factors in an access route model and the type of setting information causing the creation of the configuration factor (or the original setting information defining the configuration factor) or a storage location of the setting information. Type of information represents system setting or network configuration. The storage location for setting information represents location information specifying setting information, such as a storage host name of setting information, a storage file name, and the location (row, column) in the storage file. Instead of storing information on the storage location of setting information in the verification-intended system 1010 into the setting information storage 2010, the access route model creator 1030 collects setting information previously and stores them into the setting information storage 2010. Moreover, the access route model creator 1030 may store information regarding storage locations for setting information in the setting information storage 2010, in the setting information storage 2010. Moreover, the access route model creator 1030 may store setting information itself, together with its original location, adapted to an access route model, into the setting information storage 2010.

The setting information identification means 2020 identifies the setting information causing the creation of an access route, based on an access route, which is decided as a route matched with an analysis-intended access route by the access route decider 1060, and based on the correspondence information stored in the setting information storage 2010.

The result output device 1070 manifests setting information specified by the setting information identification means 2020, together with an access route matched with an analysis-intended access route.

Figure 11:
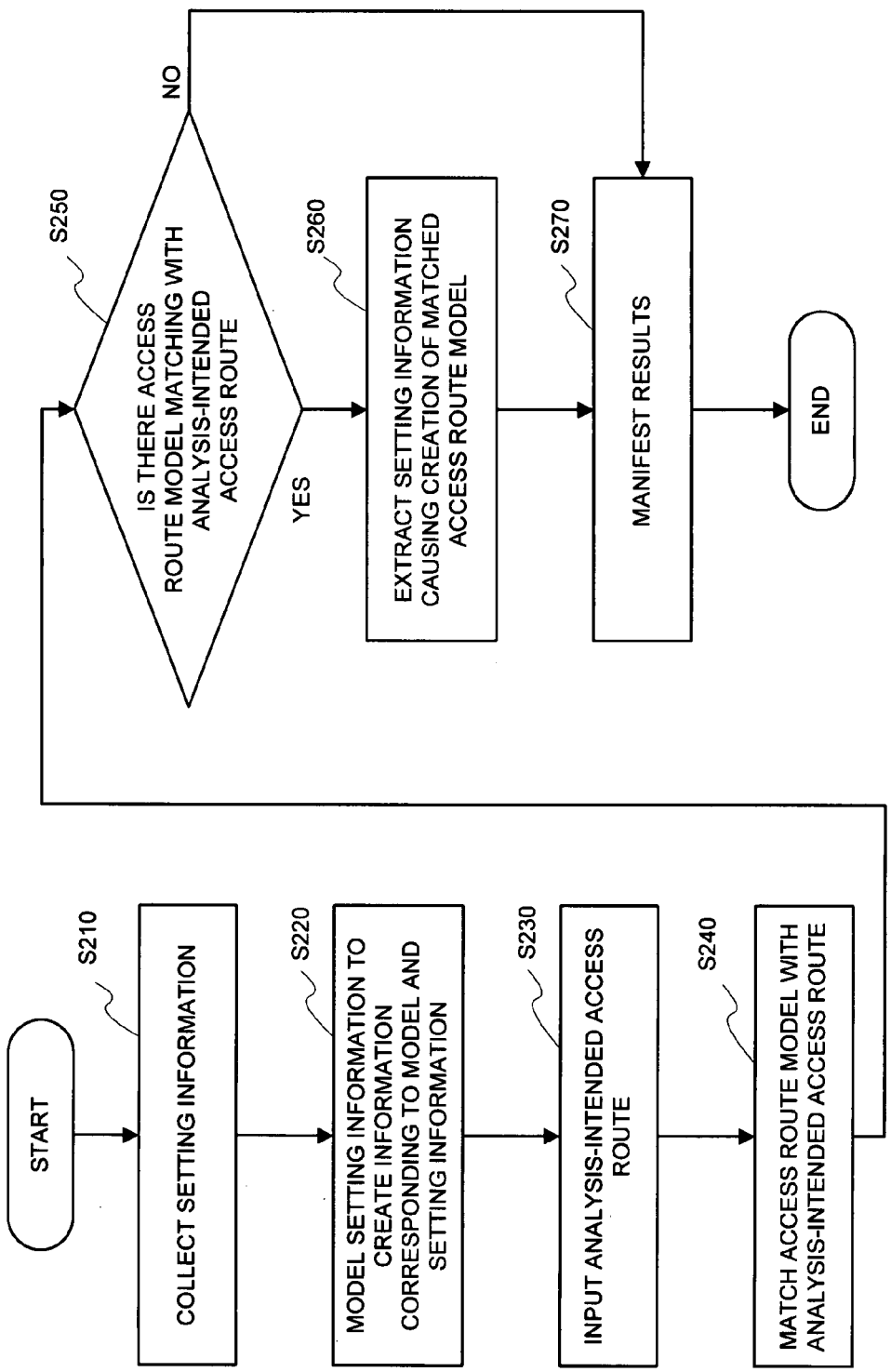
FIG. 11 is a flowchart showing an operation of an information leakage analysis system according to the fourth embodiment.

FIG. 11 is a flowchart illustrating an operation of the information leakage analysis system in the fourth embodiment. The setting information collector 1020 collects the setting information of the verification-intended system 1010 (step S210). The access route model creator 1030 models the verification-intended system 1010 based on the collected setting information to creates an access route model and stores it into the access route model storage 1040. The access route model creator 1030 stores correspondence information between the setting information causing the creation of an access route model and the access route model, into the setting information storage 2010 (step S220). Next, the analysis-intended access route input device 1050 receives an analysis-intended access route (step S230). Next, the access route decider 1060 extracts an access route model from the access route model storage 1040 and then matches it with the analysis-intended access route (step S240). The access route decider 1060 (or the setting information identification means 2020) decides whether or not there an access route matching with the analysis-intended access route has existed in the step S240 (step S250). If an access route matching with an analysis-intended access route exists (YES in step S250), the setting information identification device 2020 refers to information on a storage location included in the corresponding information stored in the setting information storage 2010 and extracts the setting information causing the creation of the matched access route (step S260). In succession, the result output device 1070 outputs (for example, displays) the matched access route and the setting information (step S270).

Next, the effect of the present invention will be explained here. In the present embodiment, the storage location of the setting information is stored together with an access route model and the setting information causing the creation of the access route is specified with the analysis-intended access route and the matched access route. Therefore, the setting having the possibility of an information leakage can be easily found so that the information leakage can be prevented previously.

Embodiment 5

Figure 12:
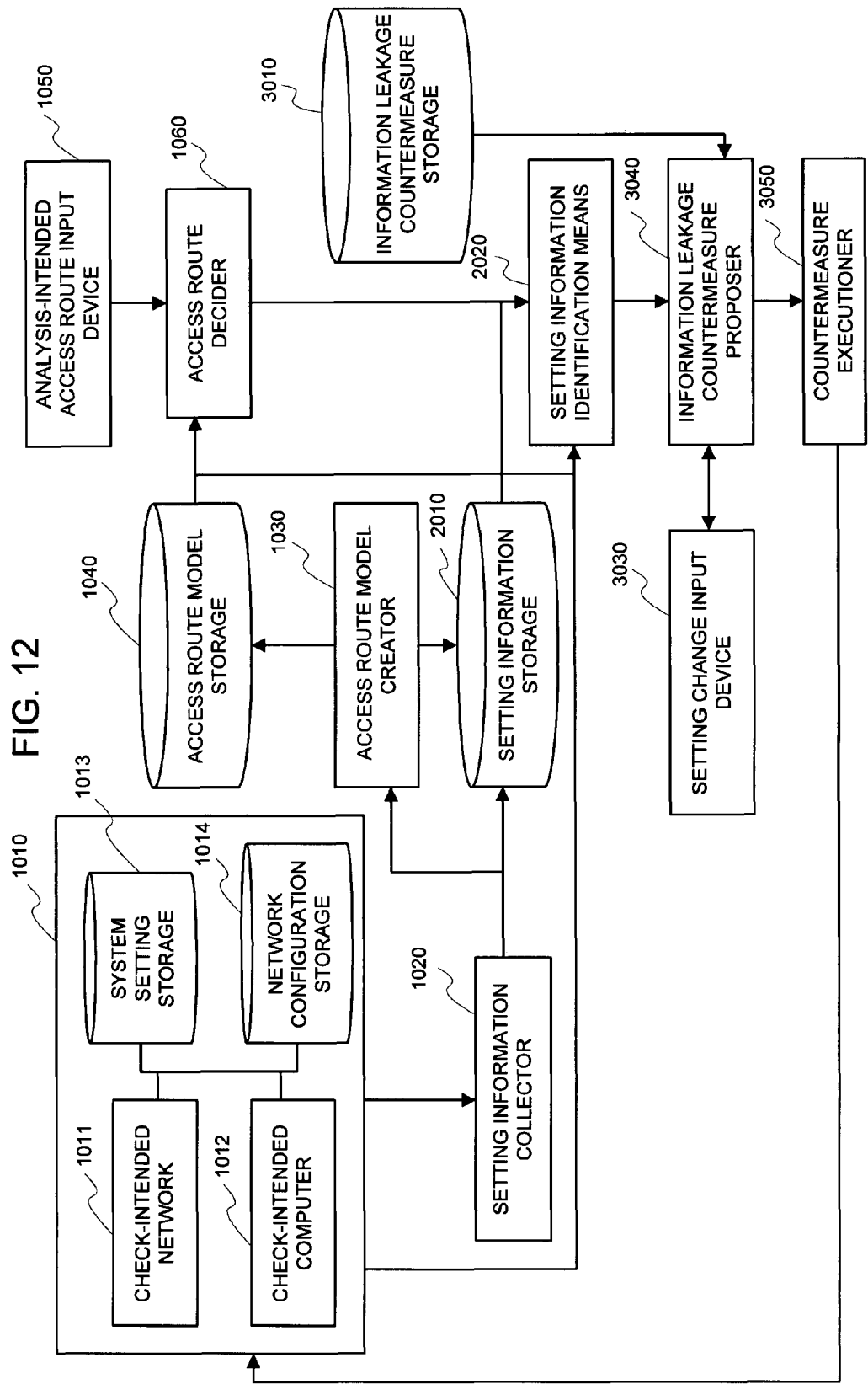
FIG. 12 is a block diagram illustrating a fifth embodiment of the present invention.

FIG. 12 is a block diagram illustrating a fifth embodiment of the present invention. Like numerals are attached to the same constituent elements as those in the above-mentioned embodiments and hence duplicate explanation will be omitted.

In the present embodiment, an information leakage analysis system comprises a verification-intended system 1010, a setting information collector 1020, an access route model creator 1030, an access route model storage 1040, an analysis-intended access route input device 1050, an access route decider 1060, a setting information storage 2010, setting information identification means 2020, an information leakage countermeasure storage 3010, an information leakage countermeasure proposer 3040, a setting change input device 3030, and a countermeasure executioner 3050. The verification-intended system 1010 includes a check-intended network 1011, a check-intended computer 1012, a system setting storage 1013 for storing the setting of the check-intended computer, and a network configuration storage 1014 for storing the setting of a network configuration.

Based on an access route decided as a route matched with an analysis-intended access route by the access route decider 1060 and based on the setting information specified by the setting information identification means 2020, the information leakage countermeasure proposer 3040 extracts and provides a typical setting example for cutting the matched access route from the information leakage countermeasure storage 3010. Moreover, instead of taking a countermeasure out of the information leakage countermeasure storage 3010, the setting change input device 3030 may receive the countermeasure. Part or all of countermeasures extracted from the information leakage countermeasure storage 3010 may be changed.

According to an operation of an operator, the setting change input device 3030 changes an information leakage countermeasure proposed by the information leakage countermeasure proposer 3040, inputs of a new information leakage countermeasure proposal, and selects an information leakage countermeasure proposal. The countermeasure executioner 3050 reflects the information leakage countermeasure selected by the setting change input device 3030 to the verification-intended system.

Figure 13:
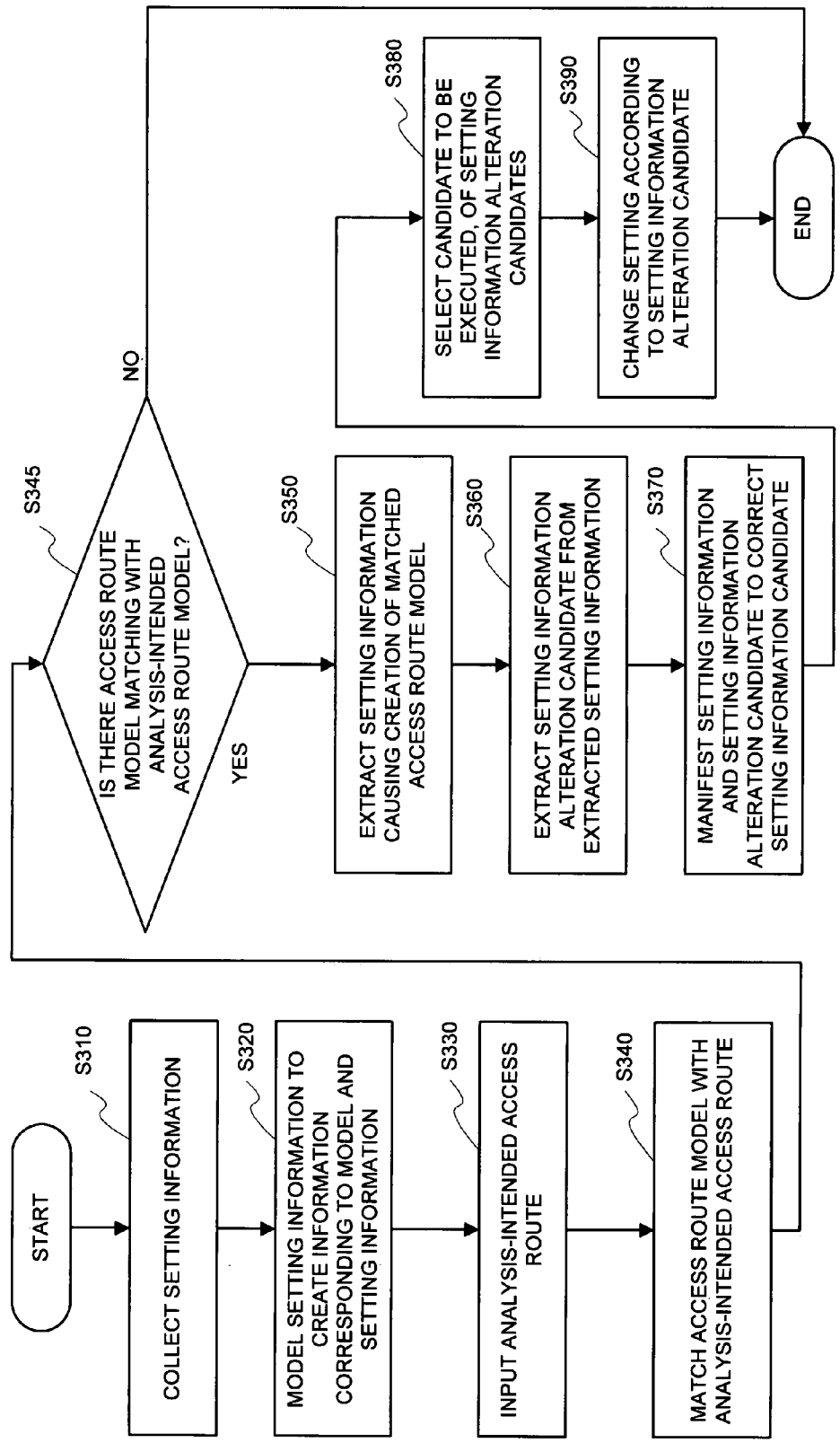
FIG. 13 is a flowchart showing an operation of an information leakage analysis system according to the fifth embodiment.

FIG. 13 is a flowchart illustrating the operation of an information leakage analysis system in the fifth embodiment. First, the setting information collector 1020 collects the setting information from the verification-intended system 1010 (step S310). The access route model creator 1030 performs modeling based on the collected setting information and stores the access route model into the access route model storage 1040. Moreover, the setting information storage 2010 stores corresponding information between the access route model and the setting information (step S320). Next, the analysis-intended access route input device 1050 receives an analysis-intended access route (step S330). The access route decider 1060 matches the access route model with the analysis-intended access route (step s340).

The access route decider 1060 (or the setting information identification means 2020) decides whether or not the access route matching with the analysis-intended access route exists as a result of the process in the step S240 (step S345). If the access route does not exist, the process ends. If the access route exists (YES in step S345), the setting information identification means 2020 refers to information on the storage location included in the correspondence information stored in the setting information storage 2010 and extracts the setting information causing the creation of the matched access route (step S350).

Next, the information leakage countermeasure proposer 3040 extracts an information leakage countermeasure stored in the information leakage countermeasure storage 3010 based on the extracted setting information (step S360). In succession, the information leakage countermeasure proposer 3040 manifests access route setting information and information leakage countermeasure setting information corresponding to the same and changes the information leakage countermeasure setting information (a setting information alteration candidate) according to an operator's operation (step S370). Next, the information leakage countermeasure proposer 3040 stimulates the operator to select an alteration candidate to be reflected to the verification-intended system 1010 among manifested change candidates and thus decides it according to the operation of the operator (step S380). The countermeasure executioner 3050 changes the setting of the verification-intended system 1010 according to the setting content shown by the decided alteration candidate (step S390).

Next, the effect of the present embodiment will be explained. In the present embodiment, the system information of the verification-intended system are collected and modeled and an analysis-intended route is provided. Thus, an access route having the possibility of information leakage is decided. The setting information causing the creation of the access route is specified to present a setting information alteration candidate. The setting of the verification-intended system is changed according to the alteration candidate specified by the operator. Hence, a possible information leakage access route can be easily specified. Moreover, such a configuration that can simply modify the setting information can prevent a leakage of information previously.

Like the second embodiment, the fifth embodiment may include the information leakage countermeasure priority order decider 210 to manifest an information leakage countermeasure according to the order determined by the information leakage countermeasure priority order decider 210. The operation of the information leakage countermeasure priority order decider 210 is similar to that in the second embodiment.

Embodiment 6

Figure 14:
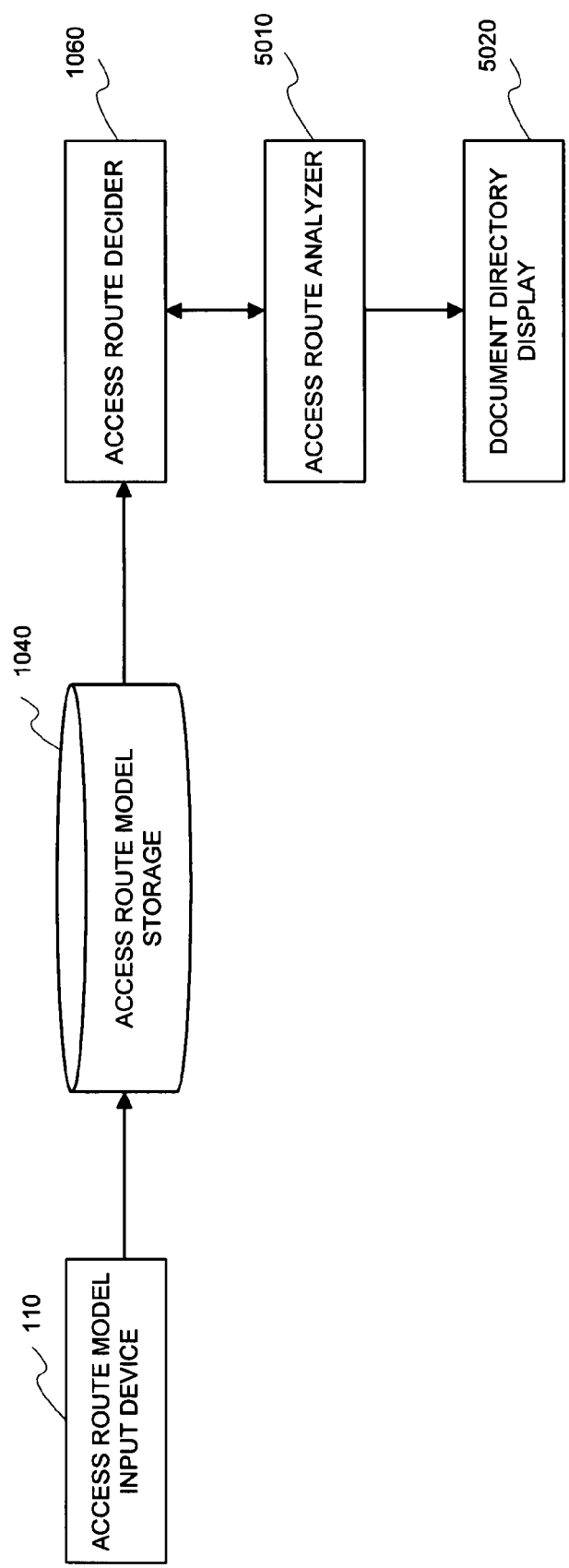
FIG. 14 is a block diagram illustrating a sixth embodiment of the present invention.

FIG. 14 is a block diagram illustrating the sixth embodiment. Like numerals are attached to same constituent elements as those in the above-mentioned embodiments and hence duplicate explanation will be omitted here. In the present embodiment, an information leakage analysis system includes an access route input device 110, an access route model storage 1040, an access route decider 1060, an access route analyzer 5010, and a document directory display 5020.

The access route analyzer 5010 creates an analysis-intended access route, with a file included as a distribution source in an access route model and with a user or file included as a distribution destination in the access route model. In the present embodiment, the distribution source and the distribution destination are specified in the analysis-intended access route but are not specified on the way of the access route. In the first to fifth embodiments, when a route ranging from a file matching with an analysis-intended access route in an access route model to a user or file exists, it is decided that there is the possibility of a leakage of information due to the route. In the sixth embodiment, an analysis-intended access route itself created by the access route analyzer 5010 does not imply a route having the possibility of a leakage of information.

Since the access route analyzer 5010 creates an analysis-intended access route, with a combination of arbitrary files or users, one or more analysis-intended access routes are created.

The access route decider 1060 decides whether or not an access route between the distribution source and the distribution destination in each analysis-intended access route exists in the access route model. The access route decider 1060 specifies a distribution destination and the access route therefor, for each file being a distribution source. That is, the access route decider 1060 decides the presence or absence of the access route in all combinations of distribution sources and distribution destinations. In the combination having an access route, a distribution destination and the access route therefor are specified for each distribution source.

The document directory display 5020 manifests a distribution destination analyzed by the access route analyzer 5010 and the access route thereof, for each file acting as a distribution source.

Figure 15:
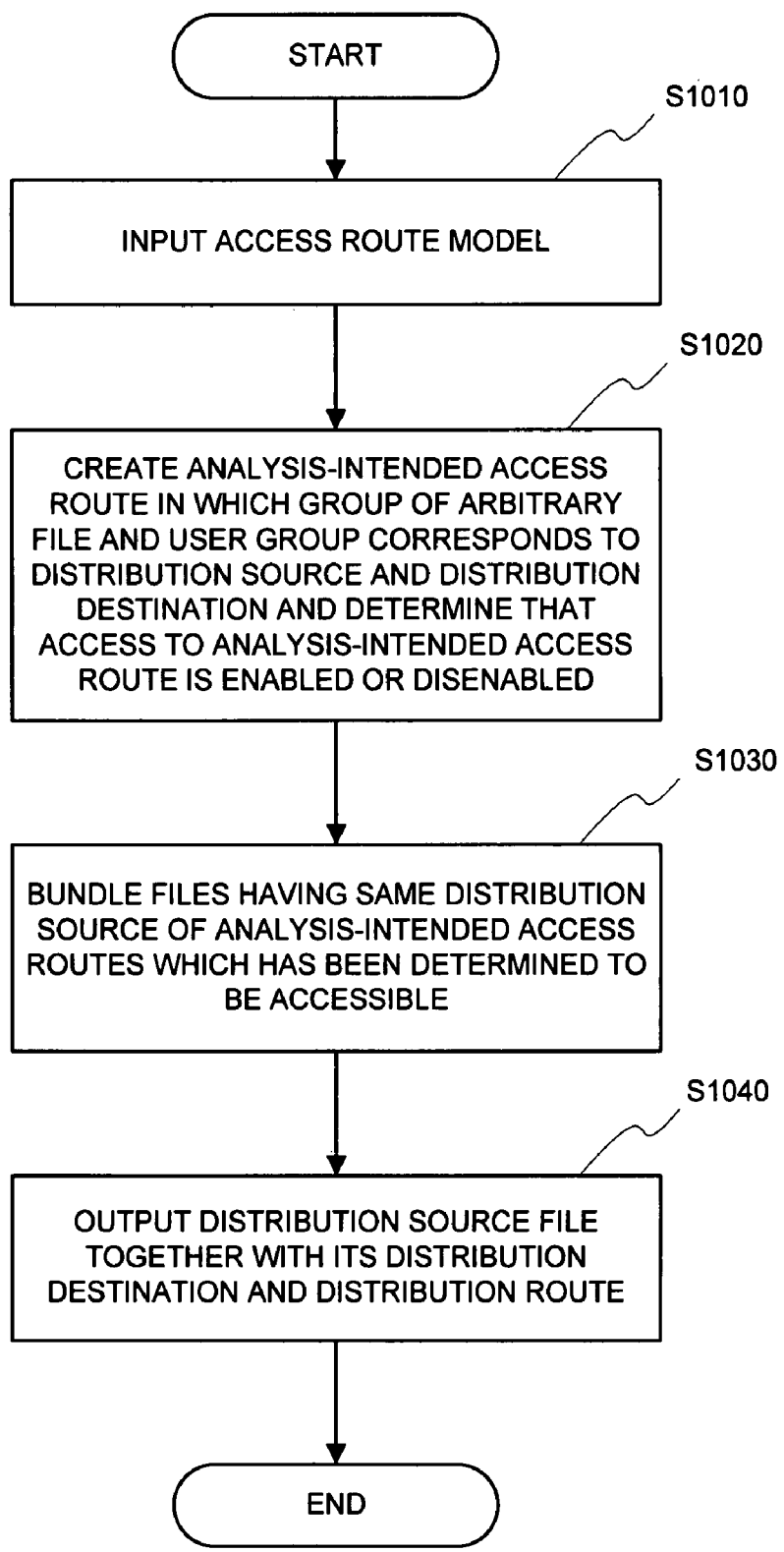
FIG. 15 is a flowchart showing an operation of an information leakage analysis system according to the sixth embodiment.

FIG. 15 is a flowchart illustrating an operation of the information leakage analysis system according to the sixth embodiment. First, the access route model input device 110 receives an access route model (step S1010). Next, the access route analyzer 5010 creates, as an analysis-intended access route, a combination of a distribution source and a distribution destination, using a file or user included in the input access route model. The access route decider 1060 decides whether or not an access route between the distribution source and the distribution destination in an analysis-intended access route exists in the access route model (step S1020). If the access route between the distribution source and the distribution destination in the analysis-intended access route exists in the access route model, accessing is possible between the distribution source and the distribution destination. After the step S1020, the access route decider 1060 collects access routes having the same files as a distribution source (step S1030). That is, a distribution destination and the access route thereof are specified for each file being a distribution source. Next, the document directory display 5020 manifests a file at a distribution source, together with a user at a distribution destination, a file, and an access route (step S1040). The operator ascertains the display result in the step S1040 and judges whether or not a route having the possibility of a leakage of information exists.

In the first to fifth embodiments, when there is a route leading from a file matching with an analysis-intended access route to a user or file, it is automatically decided that the route has the possibility of a leakage of information. In contrast, in the present embodiment, the analysis-intended access route itself does not imply a route having the possibility of a leakage of information but the decision of the route is entrusted to operator.

Next, the effect of the present embodiment will be explained here. In the present embodiment, an access route model is input and a combination of an arbitrary distribution source and a distribution destination is determined based on the access route model. When there is an access route between the distribution source and the distribution destination, a file or user, being a distribution destination of a distribution source file, is displayed for each distribution source file, together with the access route. Hence, the operator (verifier) can confirm at glance whether or not each file is suitably managed. Thus, a file, which is not properly managed and which has the possibility of a leakage of information, can be simply specified. Since a collection of access routes is displayed, the location where an information leakage occurs can be easily specified, without checking all sets of setting information, and the setting information is corrected. Thus, the information leakage can be prevented in the bud.

Embodiment 7

Figure 16:
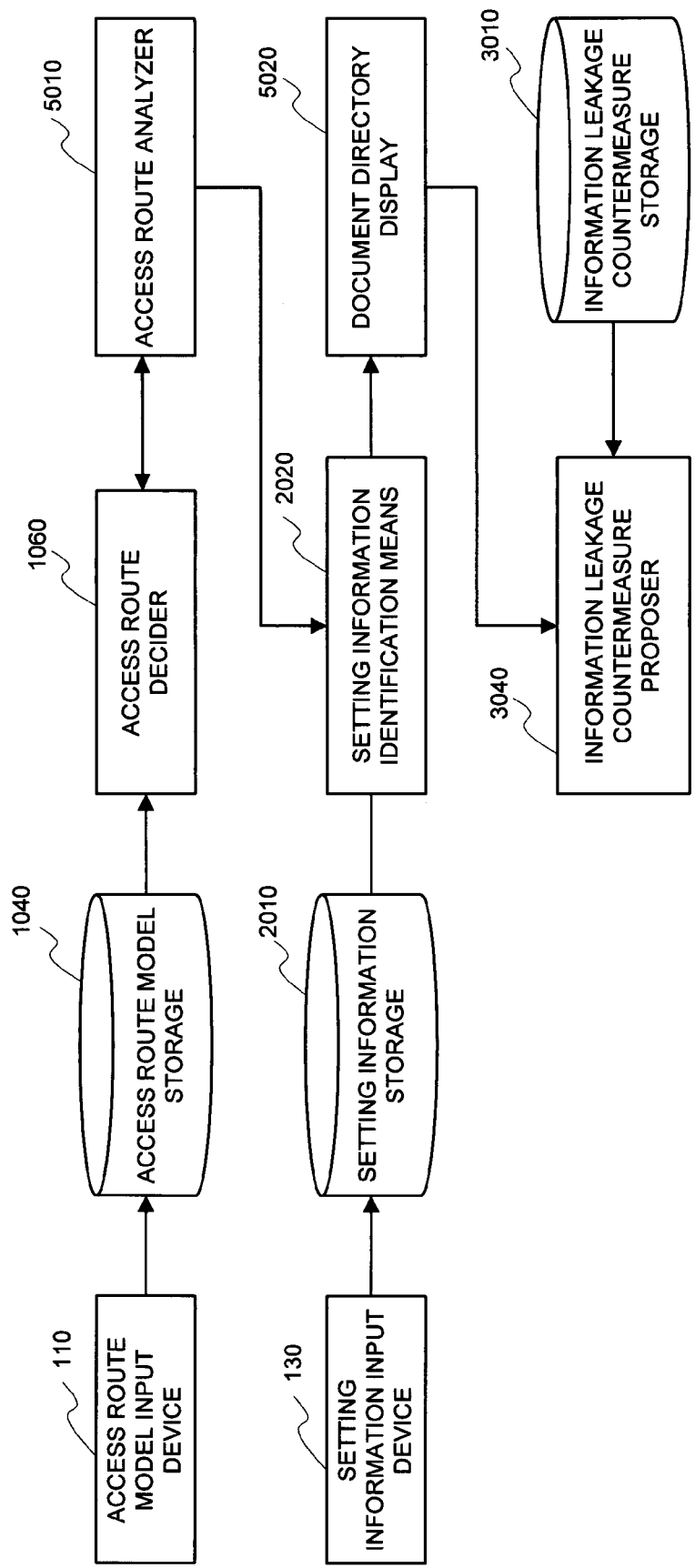
FIG. 16 is a block diagram illustrating a seventh embodiment of the present invention.

FIG. 16 is a block diagram showing a seventh embodiment of the present invention. Like numerals are attached to the same constituent elements as those in the foregoing embodiments and hence duplicate explanation will be omitted. In the present embodiment, an information leakage analysis system includes a setting information input device 130, a setting information storage 2010, a setting information identification means 2020, a document directory display 5020, an information leakage countermeasure proposer 3040, and an information leakage countermeasure storage 3010, in addition to constituent elements of the sixth embodiment.

Figure 17:
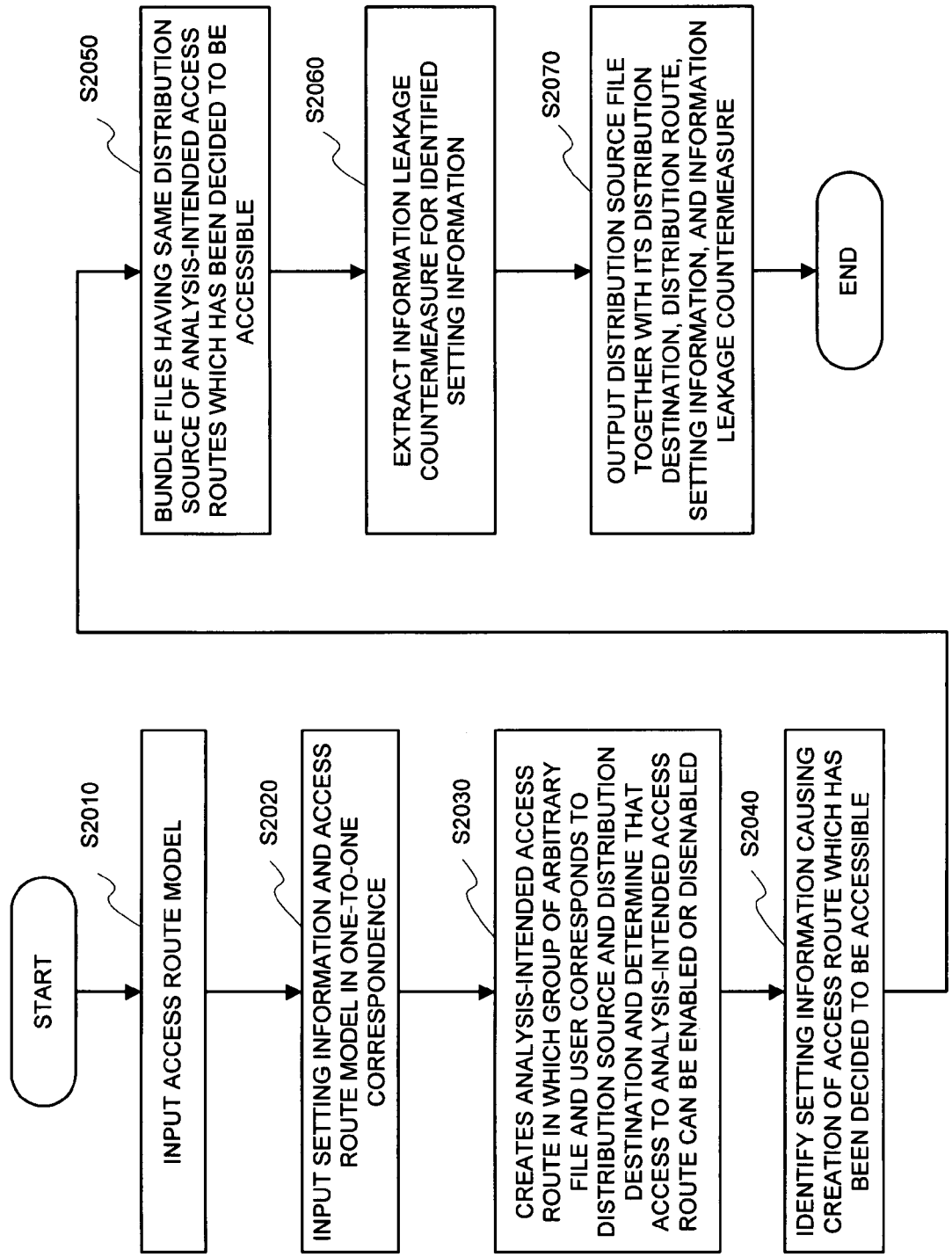
FIG. 17 is a flowchart showing an operation of an information leakage analysis system according to the seventh embodiment.

FIG. 17 is a flowchart illustrating an operation of an information leakage analysis system according to the seventh embodiment. The access route model input device 110 receives an access route model (step S1010). Next, the setting information input device 130 receives the setting information associated with access route models (step S2020). Next, the access route analyzer 5010 creates a group of a distribution source and a distribution destination as an analysis-intended access route, using an arbitrary file and a user, included in the input access route model. The access route decider 1060 decides whether or not an access route between the distribution source and the distribution destination in an analysis-intended access route exists in the access route model (step S2030).

After the step S2030, the setting information identification means 2020 specifies the setting information causing the creation of a route decided as an access route (step S2040). Next, the access route analyzer 5010 collects access routes having the same file as a distribution source (step S2050). Moreover, the information leakage countermeasure proposer 3040 extracts an information leakage countermeasure for the setting information specified in the step S2040 (step S2060). The document directory display 5020 shows a distribution source file, together with a user and file at a distribution destination, an access route, and an information leakage countermeasure (step S2070).

Next, the effect of the present embodiment will be explained here. In the present embodiment, an access route model is received and a combination of a distribution source and a distribution destination is decided based on the access route model. When there is an access route between the distribution source and the distribution destination, the setting information causing the creation of the access route, as well as an information leakage countermeasure, are specified. A file or user, being the distribution destination of a distribution source file, the access route thereof, and an information leakage countermeasure are shown for each distribution source file. Hence, whether or not each file is suitably managed can be confirmed at glance. A file, which is not properly managed and which has the possibility of a leakage of information, can be simply specified. Moreover, searching a specific setting location from a setting file is not needed and a file having the possibility of a leakage of information can be easily prevented from being distributed.

Embodiment 8

Figure 18:
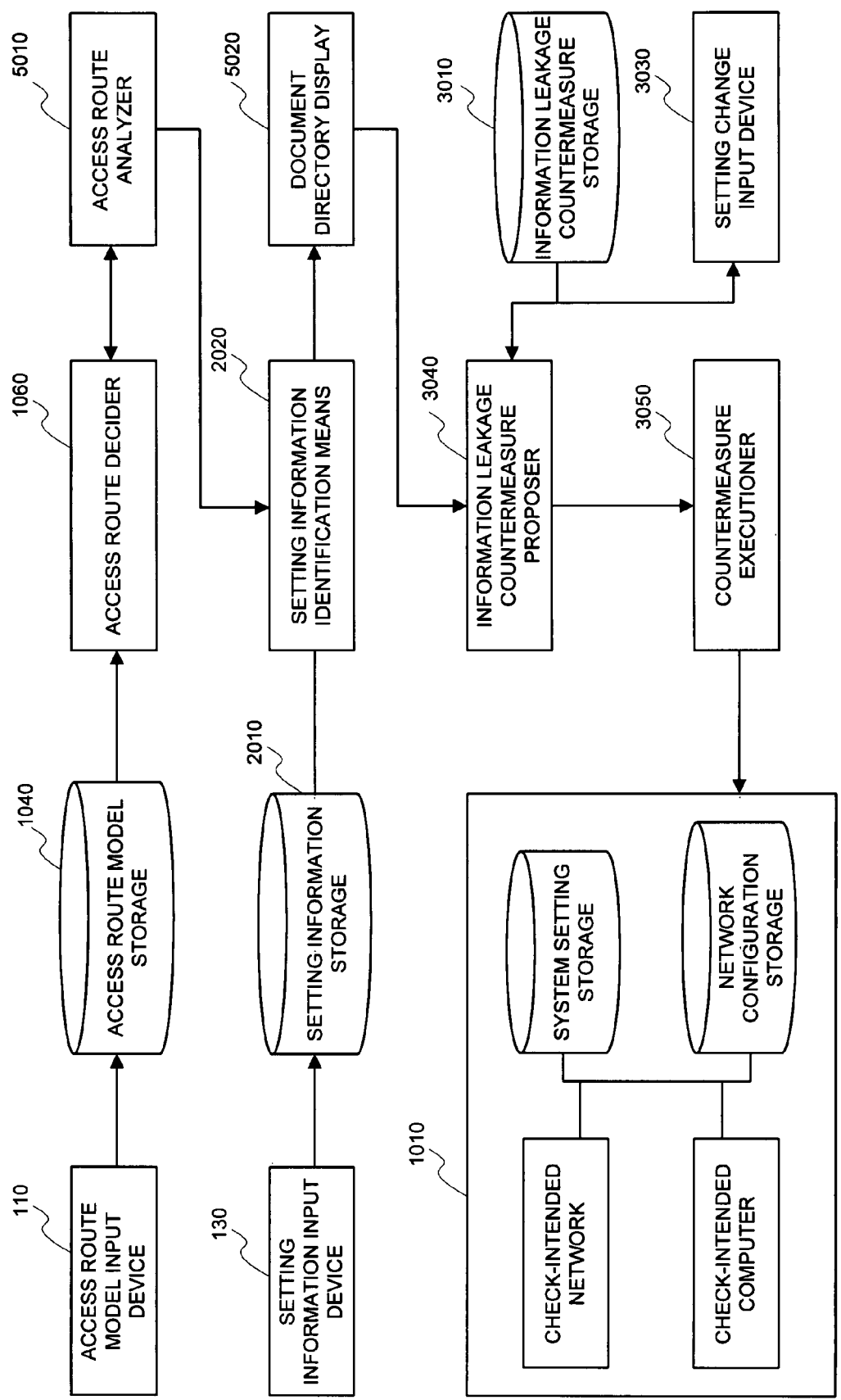
FIG. 18 is a block diagram illustrating a eighth embodiment of the present invention.

FIG. 18 is a block diagram illustrating an eighth embodiment of the present invention. Like numerals are attached to the same constituent elements as those in the foregoing embodiments and duplicate explanation will be omitted here.

In the preset embodiment, the information leakage analysis system includes a setting change input device 3030 and a countermeasure executioner 3050, in addition to the configuration of the seventh embodiment.

Figure 19:
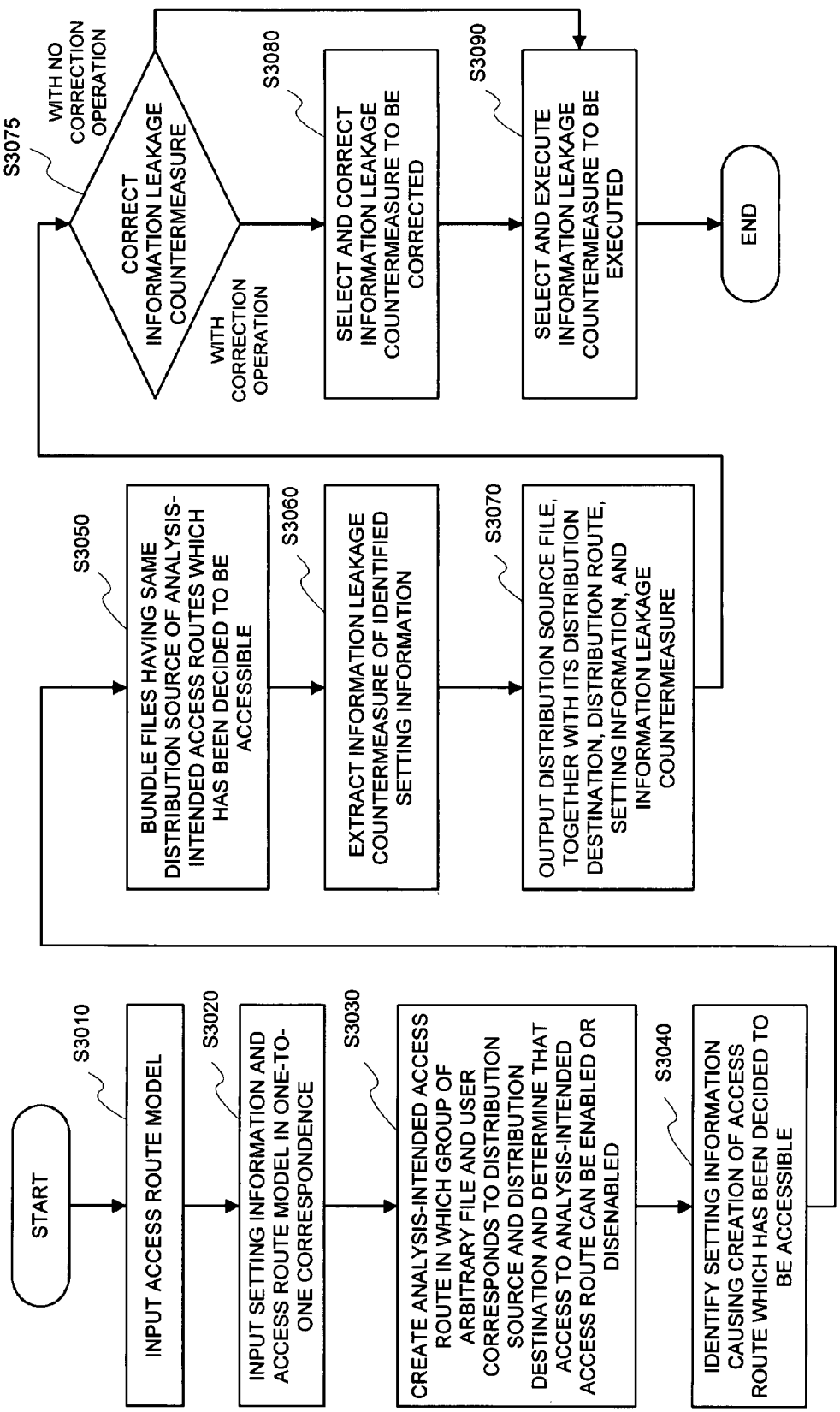
FIG. 19 is a flowchart showing an operation of an information leakage analysis system according to the eighth embodiment.

FIG. 19 is a flowchart illustrating an operation of an information leakage analysis system in the eighth embodiment. The operations in steps S3010 to S3070 shown in FIG. 19 resemble the operations in the steps S2010 to S2070 in the seventh embodiment. After the step S3070, the information leakage countermeasure proposer 3040 checks the presence or absence of the operation of an operator, which corrects an information leakage countermeasure (a setting information alteration candidate) with the setting change input device 3030 (step S3075). In the case of the absence of the correcting operation, the flow goes to the step S3070. When the correcting operation is performed, the setting change input device 3030 selects an information leakage countermeasure specified by the operator and corrects it according to the operator's operation (step S3080). Next, the information leakage countermeasure proposer 3040 selects the information leakage countermeasure specified by the operator and the countermeasure executioner 3050 executes the selected information leakage countermeasure, thus changing the setting of the verification-intended system 1010 (step S3090).

Next, the effect of the present embodiment will be explained here. In the present embodiment, the information leakage countermeasure can be easily executed after correction, without knowing the detail of the information leakage countermeasure executioner. As a result, information can be easily prevented previously from being leaked.

Embodiment 9

Figure 20:
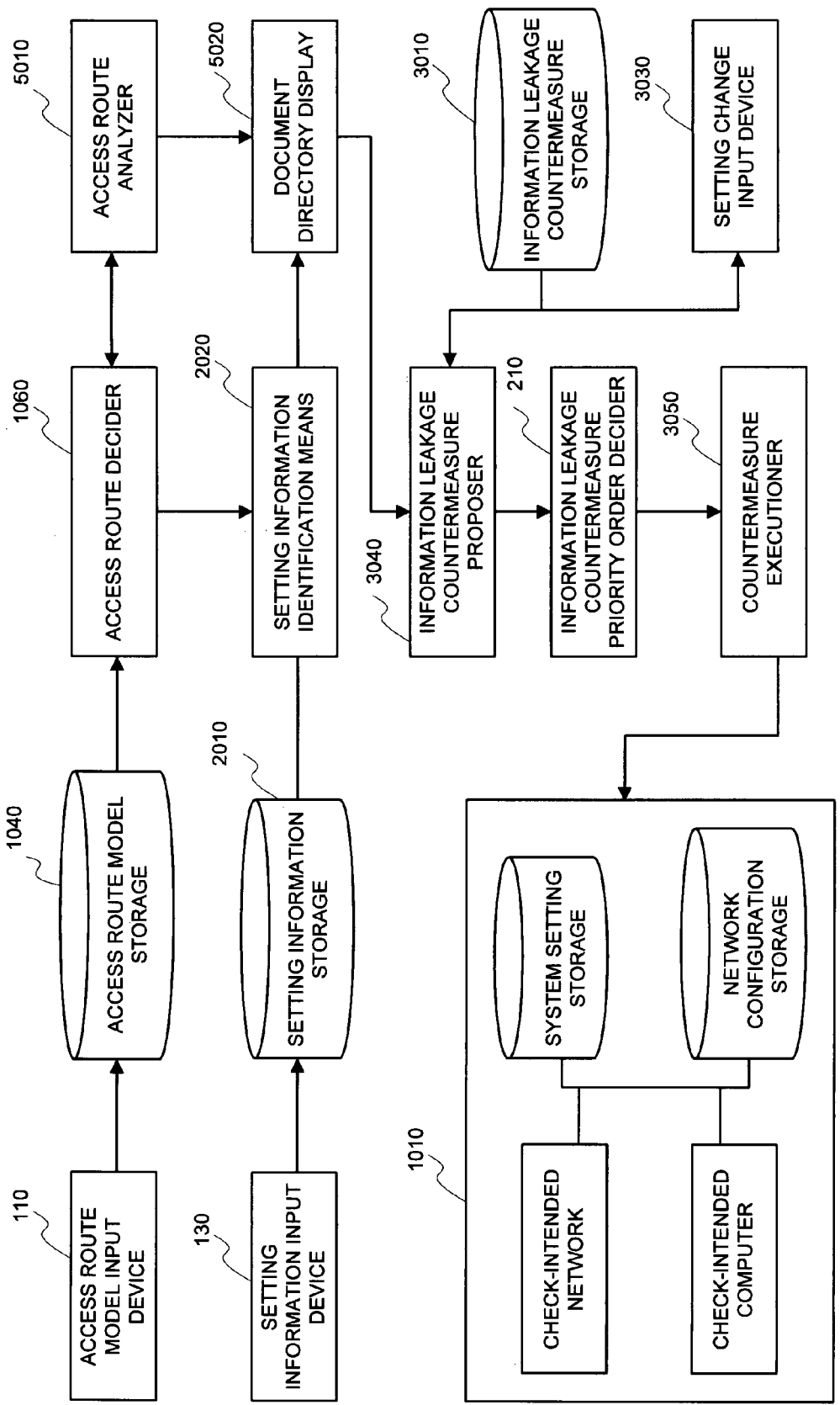
FIG. 20 is a block diagram illustrating a ninth embodiment of the present invention.

FIG. 20 is a block diagram illustrating a ninth embodiment of the present invention. Like numerals are attached to the same constituent elements as those in the above-mentioned embodiments and hence further detailed explanation will be omitted here. In the present embodiment, the information leakage analysis system includes an information leakage countermeasure priority order decider 210, in addition to constituent elements in the eighth embodiment.

Figure 21:
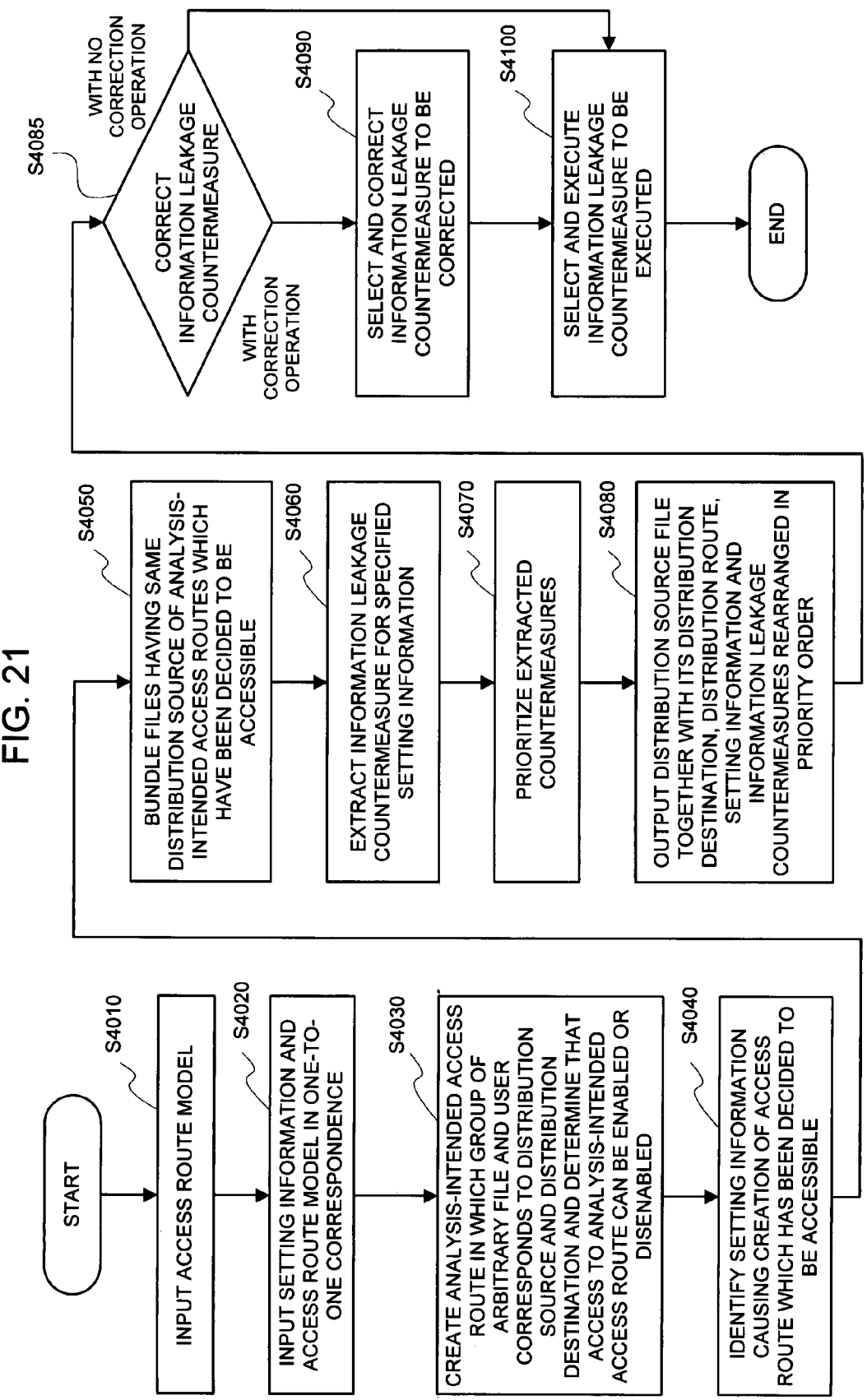
FIG. 21 is a flowchart showing an operation of an information leakage analysis system according to the ninth embodiment.

FIG. 21 is a flowchart illustrating an operation of the information leakage analysis system in the ninth embodiment. The operations in the steps S4010 to S4060 shown in FIG. 21 correspond to the operations in the steps S2010 to S2060 in the seventh embodiment. After the step S2060, the information leakage countermeasure priority order decider 210 prioritizes information leakage countermeasures extracted in the step S4060 (step S4070). This process is similar to that in the step S21 in the second embodiment. Next, the document directory display 5020 manifests a distribution source file, together with a distribution destination user and file, an access route, and an information leakage countermeasure (step S4080). At this time, the document directory display 5020 displays a group of distribution source, distribution destination, access route, and information leakage countermeasure, according to the priority order of information leakage countermeasures. Then, the operations in the steps S4085 to S4100 are performed. The operations in the steps S4085 to S4100 in FIG. 19 resemble the operations in the steps S3075 to S3090 in the eighth embodiment. The countermeasure executioner 3050 may automatically execute an information leakage countermeasure with high priority order (for example, with a highest priority order), according to the order determined by the information leakage countermeasure priority order decider 120.

Next, the effect of the present embodiment will be explained here. In the present embodiment, since information leakage countermeasures with priority orders are displayed and executed, an information leakage countermeasure having little effect on the verification-intended system 1010 due to a setting change can be easily applied. The configuration that automatically executes the information leakage countermeasure with a highest priority order can easily prevent a leakage of information even if the knowledge of the system configuration or of the influence of the setting lacks.

In the seventh and eighth embodiments, the information leakage countermeasure proposer 3040 corresponds to a result output device that outputs the setting information specified by the setting information identification means.

Embodiment 10

Figure 22:
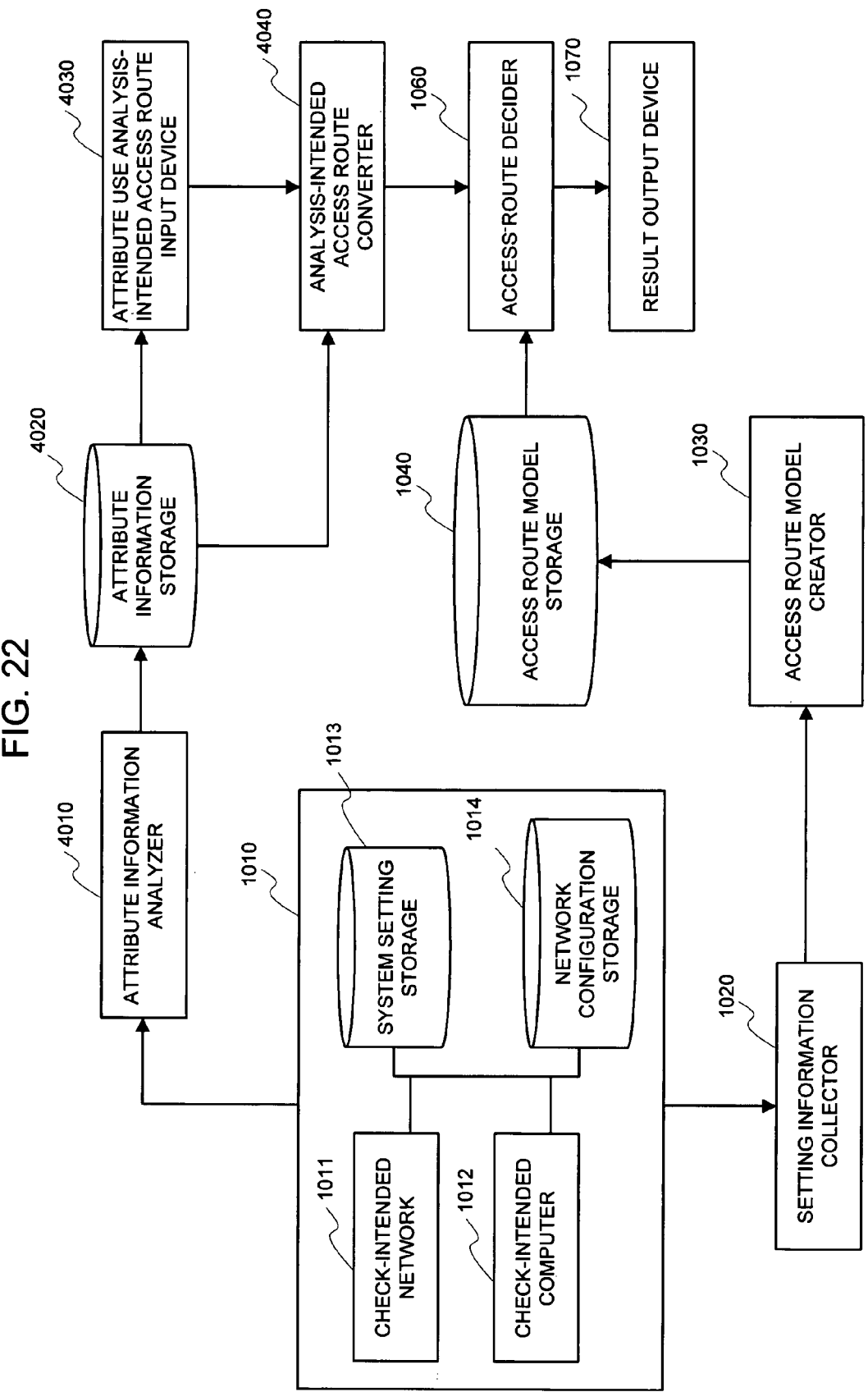
FIG. 22 is a block diagram illustrating a tenth embodiment of the present invention.

FIG. 22 is a block diagram illustrating a tenth embodiment of the present invention. Like numerals are attached to the same constituent elements as those in the above-mentioned embodiments and hence duplicate explanation will be omitted here. In the present embodiment, in place of the analysis-intended access route input device 1050 in the third embodiment, the information leakage analysis system includes an attribute information analyzer 4010, an attribute information storage 4020, an attribute use analysis-intended access route input device 4030, and an analysis-intended access route converter 4040.

The attribute information analyzer 4010 analyzes the attribute of setting information included in the verification-intended system 1010 and correlates the content of the setting information with the attribute thereof. The attribute of setting information represents the attribute of a content indicated by setting information. For example, when the setting information represents a user, host, or file, the location (for example, a segment name) on a network disposing them can be attribute information on a user, host or file. Moreover, when setting information represents, for example, a user, the role (for example, a job title such as department manager or section manager) of the user can be user attribute information. Moreover, when the setting information represents, for example, a file, the secrecy degree of the file (for example, a category representing a secrecy degree such as inside documents or outside documents) or the role of the file (for example, address lists or networks) can become file attribute information. The types of route such as an unencrypted route, for example, are cited as access route attribute information.

The attribute information analyzer 4010 receives, for example, the setting information from the verification-intended system. The attribute information analyzer 4010 specifies the attribute of a file and the attribute of a user, respectively, based on the file information and the user information, described in the setting information, and correlates the file information with the file attribute or correlates the user information with the user attribute. Similarly, the attribute information analyzer 4010 specifies the attribute of a route indicated by the information, based on the port number, IP address, and the host name, described in the setting information, and correlates the port number with the route attribute. The attribute information analyzer 4010 stores into the attribute information storage 4020, corresponding information, which are obtained by correlating user information, file information, and route information, included in the setting information of the verification-intended system, with a user attribute, a file attribute, and a route attribute.

In order to specify a file attribute, the attribute information analyzer 4010 performs, for example, the following analysis.

First, by referring to a file name, which represents file information, and the storage location thereof, the corresponding file is read in. The file is divided into partial areas such as header, body text, and footer. When there is a description in each partial area, the phrase (hereinafter referred to as a feature factor) indicating the possibility that the file has a specific attribute is detected. For example, when the feature factor saying "outside secret" is described on the header, the file may have the attribute of "outside secret document". By predetermining such a feature factor for each partial area, the attribute information analyzer 4010 detects it and specifies a candidate for a file attribute based on the phrase thereof. Whether or not an attribute candidate is suitable as a file attribute is decided based on the arrangement status in the partial areas of a detected feature factor. For example, the phrases in the partial area are referred to, which are arranged from the first appearing feature factor to the last appearing feature factor, among detected feature factors. If the ratio (often referred to as density) of the number of feature factors to the number of phases included in the arrangement is less than a predetermined threshold value, the attribute information analyzer 4010 takes an attribute selected with the detection of the feature factor, off candidates. Moreover, when an arrangement of phrases defined by a feature factor leading an attribute candidate is overlapped with an arrangement of phrases defined by a feature candidate leading other attribute candidate, a candidate with a lower density is removed. The ratio of the overlapped portion to the arrangement of phrases defined by a feature factor leading the remaining attribute candidate is calculated and the result is subtracted from 1 (the subtraction result is described as a degree of purity). When the purity is less than a predetermined threshold value, the corresponding candidate is removed. The ratio (referred to as a degree of occupation) of the number of phrases included in the arrangement of phrases defined by the feature factor leading an attribute candidate to the number of phrases included in the partial area (or the arrangement of phrases ranging from the first appearing feature factor to the last appearing feature factor, of detected feature factors) is less than a predetermined threshold value, the corresponding candidate is removed. In such a procedure, candidates, not removed, are defined as file attributes. This process is carried out for each partial area. Here, the case where a file attribute is analyzed using density, purity, and occupation degree has been shown. However, a similar analysis may be performed using one or two of density, purity, and occupation degree. Each threshold value may be previously defined experimentally to remove unsuitable candidates.

As a result of such an analysis, the file attribute can be specified suitably. For example, when only the feature factor representing "outside secret" is described in the header area of a file, each of density, purity and occupation degree becomes 1. The attribute information analyzer 4010 can specify the file attribute as "outside secret document". The attribute information analyzer 4010 stores the corresponding information between file information of the file and the attribute "outside secret" into the attribute information storage 4020. For example, it is now assumed that "explanation regarding our outside secret document" is described as the title of a document in the header of a file and that the header includes the phrase "outside secret" but the file itself is not handled as outside secret and does not have the attribute of an outside secret document. In such a case, the occupation degree is low or less than a threshold value. Hence, the attribute information analyzer 4010 does not specify the file attribute as "outside secret".

The above attribute analysis is an example and another analyzing method may specify the attribute.

When the user attribute is specified, the attribute information analyzer 4010 performs the following process. The attribute information analyzer 4010 previously stores various types of attribute information such as job titles for each user. When the setting information is input from the verification-intended system, the attribute information analyzer 4010 refers to user information included in the setting information and extracts the attribute corresponding to the user information from among information previously stored. The attribute information analyzer 4010 specifies the attribute as the attribute of user information included in the setting information. The attribute information analyzer 4010 stores the user information and the corresponding information associated with the specified attribute into the attribute information storage 4020. Similarly, the attribute information analyzer 4010 performs the following process to specify the attribute of a route. The attribute information analyzer 4010 previously stores the attribute of a route represented by the information (for example, "unencrypted route"), together with information, such as port number, IP address, and host name. When the setting information is input from the verification-intended system, the attribute information analyzer 4010 refers to information, such as port number, IP address and host name, included in the setting information. The attribute information analyzer 4010 extracts the attribute according to the referred port number from among preciously stored information. The attribute information analyzer 4010 specifies the attribute as a route attribute and stores the corresponding information, which correlates the port number included in the setting information with the specified attribute, into the attribute information storage 4020.

The attribute information analyzer 4010 may stimulate the operator to input the attribute. In other words, by displaying the setting information on the verification-intended system, the attribute information analyzer 4010 may stimulate the operator to input the attribute information of the content representing the setting information. By inputting the attribute information by the operator, the attribute information analyzer 4010 can collect attribute information corresponding to the setting information.

The attribute information storage 4020 stores the correspondence information between the setting information and the attribute information analyzed by the attribute information analyzer 4010.

The attribute use analysis-intended access route input device 4030 receives an attribute use analysis-intended access route. The attribute use analysis-intended access route represents a distribution source, a distribution destination or a midway route, using attribute information, instead of the name of a user or file for an analysis-intended access route (for example, identification information such as a user ID or file name). In the attribute use analysis-intended access route, a distribution source, for example, is indicated with an attribute such as "private information", instead of a file name. Similarly, a distribution destination is indicated with a segment name belonging to a user or file or with the type of file such as "outside secret document", instead of a file name or a user ID. Moreover, a midway route is represented with an attribute such as "unencrypted route".

The analysis-intended access route converter 4040 converts an attribute use analysis-intended access route in the form where the access route decider 1060 can match with an access route model. When the access route decider 1060 can match an attribute use analysis-intended access route indicated using attribute information with an access route model, the analysis-intended access route converter 4040 is not required.

Figure 23:
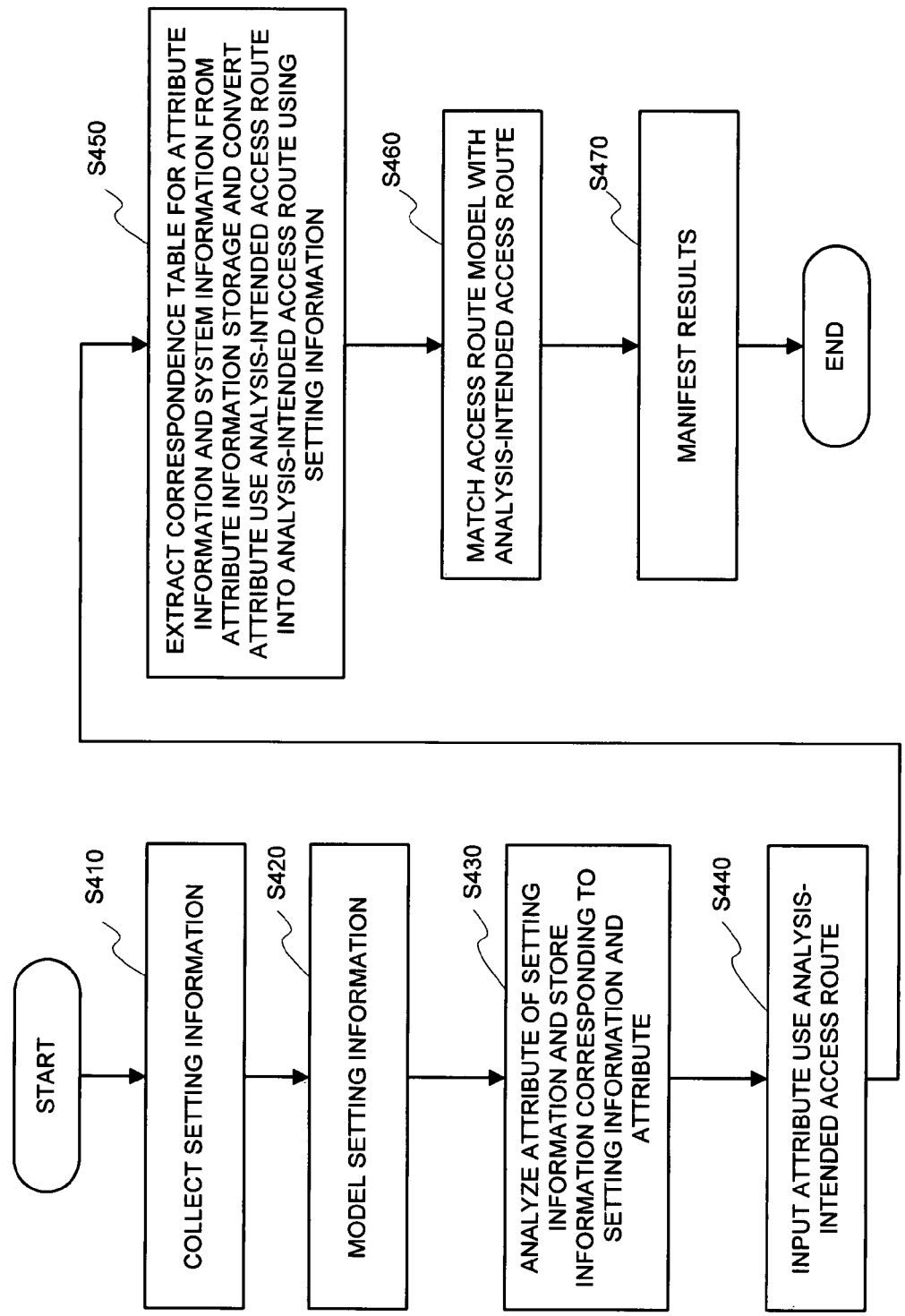
FIG. 23 is a flowchart showing an operation of an information leakage analysis system according to the ninth embodiment.

FIG. 23 is a flowchart illustrating an operation of the information leakage analysis system according to the ninth embodiment. First, the setting information collector 1020 collects the setting information from the verification-intended system 1010 (step S410). The access route model creator 1030 performs modeling based on the collected setting information and stores the created access route model into the access route model storage 1040 (step S420). Next, the attribute information analyzer 4010 collects the setting information of the verification-intended system 1010 and analyzes the attribute corresponding to the content described in the setting information. The attribute information analyzer 4010 stores the corresponding information representing the corresponding relationship between the content of the setting information and the attribute information specified through the analysis, into the attribute information storage 4020 (step S430).

Next, by using the attribute information saved in the attribute information storage 4020, the attribute use analysis-intended access route input device 4030 receives an attribute use analysis-intended access route (step S440). In the present embodiment, the analysis-intended access route represents a route having the possibility of a leakage of information, like the first embodiment. Hence, the attribute use analysis-intended access route input device 4030 receives an attribute use analysis-intended access route as data, in which a possible information leakage route is represented with the attribute information.

Next, by using the correspondence information between the setting information and the attribute information stored in the attribute information storage 4020, the analysis-intended access route converter 4040 converts an attribute use analysis-intended access route into an analysis-intended access route using the setting information (step S450). Thereafter, the access route decider 1060 matches an access route model with the analysis-intended access route (step S460) and the result output device 2030 outputs the result (step S470). The operations in the steps S460 and S470 resemble the steps S140 and S150 in the third embodiment.

Figure 24:
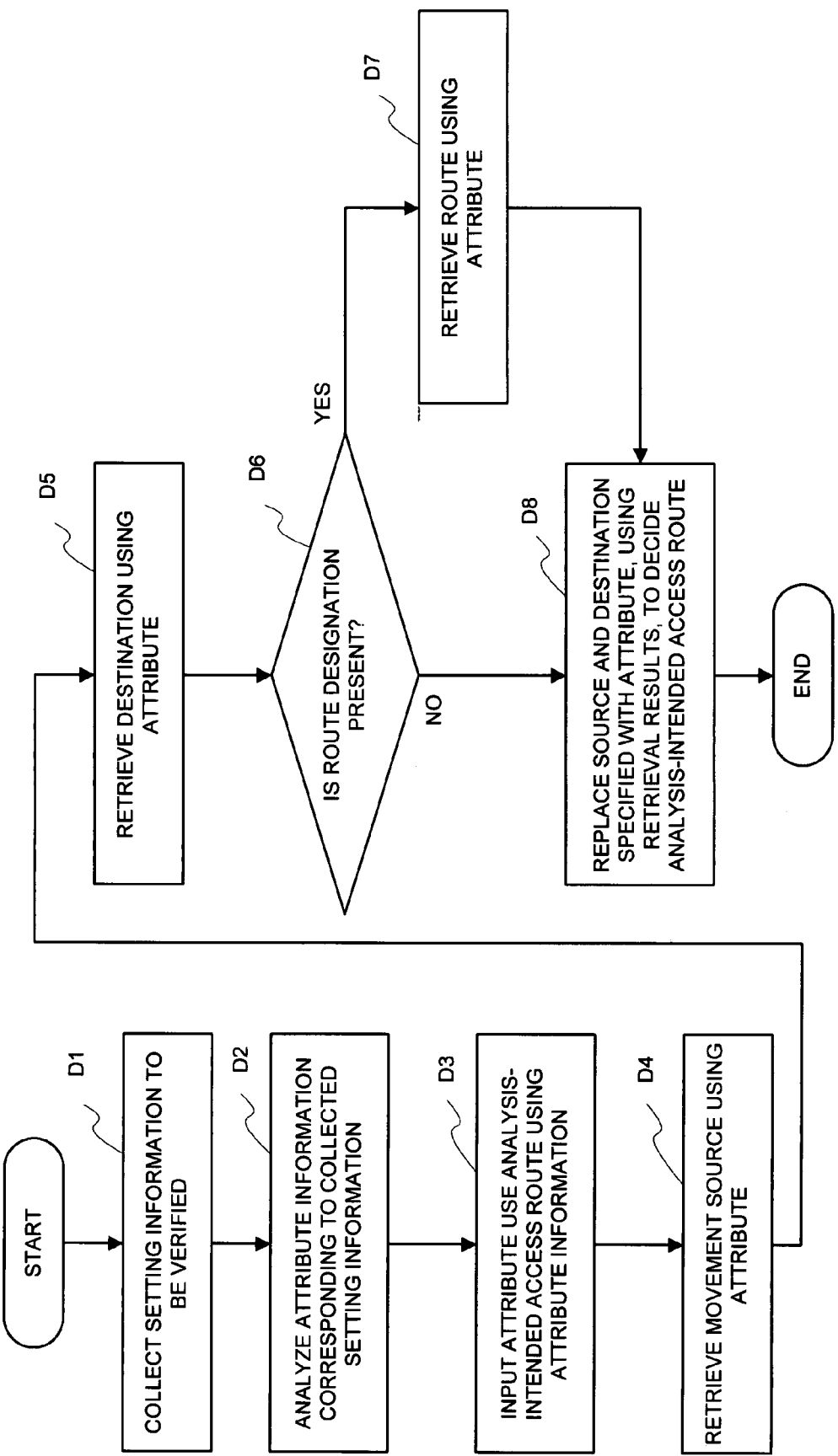
FIG. 24 is a flowchart showing a process for inputting an attribute use analysis-intended access route and thus converting it into an analysis-intended access route.

FIG. 24 is a flowchart illustrating a process of receiving an attribute use analysis-intended access route and converting it into an analysis-intended access route. The process, shown in FIG. 24, shows in detail the steps S430 to S450 shown in FIG. 23.

First, the attribute information analyzer 4010 collects the setting information of the verification-intended system 1010 (step D1). Next, the attribute information analyzer 4010 analyzes the attribute corresponding to the content described in the setting information and stores the correspondence information representing the relationship corresponding to the content of setting information and the attribute information specified through the analysis into the attribute information storage 4020 (step D2). In the step D2, as described above, a feature factor is detected from a file and the file attribute is analytically specified based on the location status of the feature factor. The attribute of a user or route may be specified through the already explained process. The step D1, D2 corresponds to the step S430 shown in FIG. 23.

Next, the attribute use analysis-intended access route input device 4030 uses the attribute information saved in the attribute information storage 4020 and receives an attribute use analysis-intended access route (step D3). For example, the attribute use analysis-intended access route input device 4030 reads file attributes, as distribution source candidates, out of the attribute information storage 4020, displays them as a list and stimulates the operator to select a file attribute. The attribute use analysis-intended access route input device 4030 describes a distribution source of an attribute use analysis-intended access route with the selected file attribute. Similarly, the attribute use analysis-intended access route input device 4030 reads file or user attributes, as distribution source candidates, out of the attribute information storage 4020, displays them as a list, and stimulates the operator to select a file or user attribute. The attribute use analysis-intended access route input device 4030 describes a distribution destination of an attribute use analysis-intended access route with the selected file or user attribute. Similarly, the attribute use analysis-intended access route input device 4030 reads attributes of candidate routes for an intermediate route out of the attribute information storage 4020, displays them as a list, and stimulates the operator to select the attribute. The attribute use analysis-intended access route input device 4030 describes a route on the way of an attribute use analysis-intended access route with the selected attribute. It is not needed to describe an intermediate route in the attribute use analysis-intended access route. The process of the step D3 corresponds to the step S440 shown in FIG. 23.

Next, the analysis-intended access route converter 4040 retrieves the content of the setting information corresponding to the attribute described as a distribution source in an attribute use analysis-intended access route based on the corresponding information stored in the attribute information storage 4020 (the corresponding information between the setting information and the attribute information) (step D4).

Similarly, the analysis-intended access route converter 4040 retrieves the content of the setting information corresponding to the attribute described as a distribution destination in an attribute use analysis-intended access route based on the corresponding information stored in the attribute information storage 4020 (step D5).

Next, the analysis-intended access route converter 4040 decides whether or not an intermediate route is described in an attribute use analysis-intended access route (step D6). If the intermediate route is not described, the flow goes to the step D8. When the intermediate route is described, the analysis-intended access route converter 4040 retrieves the content of the setting information corresponding to the attribute described as an intermediate route in the attribute use analysis-intended access route, based on the corresponding information stored in the attribute information storage 4020 (step D7). After the step D7, the flow goes to the step D8.

In the step D8, the analysis-intended access route converter 4040 replaces the distribution source and the distribution destination of the attribute use analysis-intended access route described by the attribute, with the retrieval result in the step D4 and the retrieval result in the step D5, respectively. In the step D7, the intermediate route of an attribute use analysis-intended access route described based on the attribute is replaced with the retrieval result in the step D7. As a result, the attribute use analysis-intended access route is replaced with an analysis-intended access route. The process in the steps D4 to D8 corresponds to the step S450, shown in FIG. 23.

The tenth embodiment can provide the same effect as that in the third embodiment. For operators, specifying an analysis-intended access route, specifying the attribute of file name or user ID is easier than specifying each file name or user ID. In the present embodiment, an attribute use analysis-intended access route is received using an attribute and is converted into an analysis-intended access route. This feature enhances the convenience for operators. As a result, an information leakage can be prevented more easily.

In the first to fifth embodiments, instead of using the analysis-intended access route input device 1050, the configuration may include the attribute information analyzer 4010, the attribute information storage 4020, the attribute use analysis-intended access route input device 4030, and the analysis-intended access route converter 4040.

In each embodiment, each of the access route model input device 110, the setting information input device 130, and the analysis-intended access route input device 1050 is realized with an input device such as a keyboard and a CPU that operates according to programs. Each of the information leakage countermeasure proposer 3040, the result output device 1070, and the document directory display 5020 is realized with, for example, a display, an input device, and a CPU that operates according to programs. Each of the setting change input device 3030 and the attribute use analysis-intended access route input device 4030 is realized with, for example, a display, an input device and a CPU that operates according to programs. Each of the access route model storage 1040, the setting information storage 2010, the information leakage countermeasure storage 3010, and the attribute information storage 4020 is realized, for example, a memory device. Each of the access route decider 1060, the setting information identification means 2020, the information leakage countermeasure priority order decider 210, and the access route analyzer 5010 is realized with a CPU that operates according to programs. Each of the countermeasure executioner 3050 and the setting information collector 1020 is realized with an interface for communications to the verification-intended system 1010 and a CPU that operates according to programs. The attribute information analyzer 4010 is realized with, for example, an interface for communications to the verification-intended system 1010 and a CPU that operates according to programs.

In each embodiment, the CPU that operates according to programs may be shared to realize respective elements.

In the first to fifth embodiments and the tenth embodiment, a verification-intended access route means a route having the possibility of a leakage of information. However, a certain embodiment may include the steps of inputting an access route to be established as a verification-intended access route and ascertaining whether or not the access route is represented in an access route model.

In each embodiment, the access route information storage, defined in Claims, is realized by means of an access route model storage. Similarly, the route decider is realized by means of an access route decider. The access route information creator is realized by mean of an access route model creator. The route information creator is represented by means of an access route analyzer. The display is realized by means of a document directory display. The attribute use information leakage route information input device is realized by means of an attribute use analysis-intended access route input device. The information leakage route information corresponds to an analysis-intended access route. The attribute use information leakage route information corresponds to an attribute use analysis-intended access route.

Embodiment 1

Next, an embodiment of the present invention will be explained by illustrating a concrete verification-intended system. FIG. 25 is an explanatory diagram illustrating a verification-intended system and shows with an access route model created based on network configuration information. As shown in FIG. 25, the verification-intended system is a network configuration, which includes a client computer RD-C and a department server RD-W and a fire wall FW linking between them. A web client (not shown in FIG. 25) is introduced in the client computer RD-C. Apache (not shown in FIG. 25) is introduced, as a web server, in the department server RD-W.

The setting information collector 1020 collects and models the setting information of a verification-intended system. First, the setting information collector 1020 collects the network configuration information. FIG. 26 shows an example of the network configuration information, which is collected from the verification-intended system. The access route model created based on the network configuration information, shown in FIG. 26, corresponds to the model shown in FIG. 25. In this case, the access route model creator 1030 refers to the information (FIG. 26) representing a network interface in the network configuration information and decides that there are three host elements, representing FW, RD-C, and RD-W, respectively. Moreover, the access route model creator 1030 decides that the host element representing FW includes two nic elements and that each of other two host elements includes one nic element. The access route model creator 1030 creates a network node based on the information. Next, the access route model creator 1030 refers to information (FIG. 26) representing connection information on a network interface. The nic element in the information representing a network interface includes an IP address and id number thereof. The information representing network interface connection information includes a group of id numbers of nic to be connected. The access route model creator 1030 recognizes network nodes connected together based on the information representing network interface connection information and creates an arc for connecting a network node.

Figure 28:
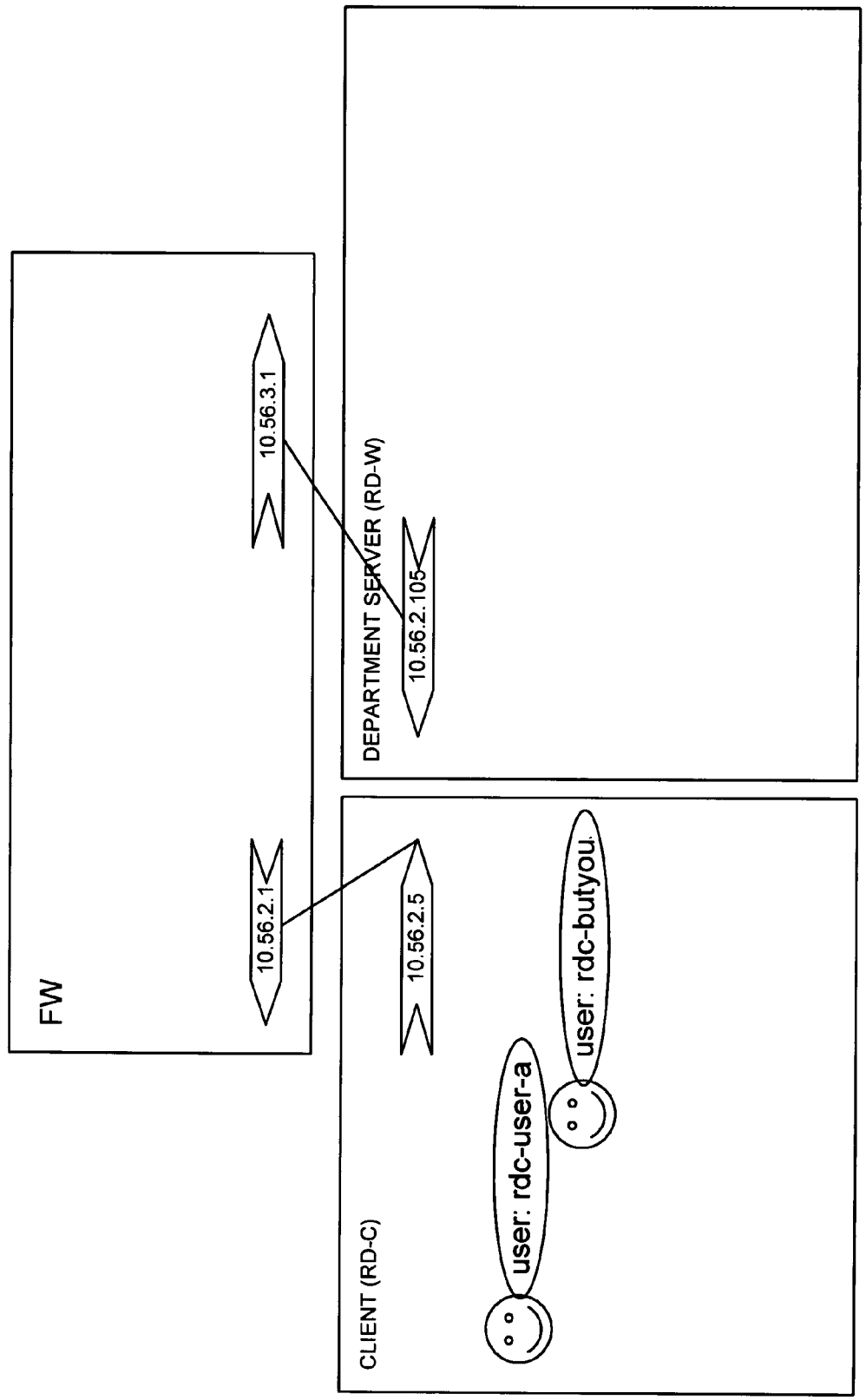
FIG. 28 is an explanatory diagram showing an access route model reflecting user information.

FIG. 27 shows an example of user information collected through the client computer RD-C. The user information shown in FIG. 27 is the setting information for OS. The access route model creator 1030 recognizes that there are two user IDs including "rdc-user-a" and "rdc-butyou", based on the user information, and reflects the user information of RD-C to the access route model. As a result, the access route model becomes the example shown in FIG. 28. The access route model is schematically depicted as shown in FIGS. 25 and 28. However, the information leakage analysis system holds an access route model as the information described in, for example, XML.

Figure 29:
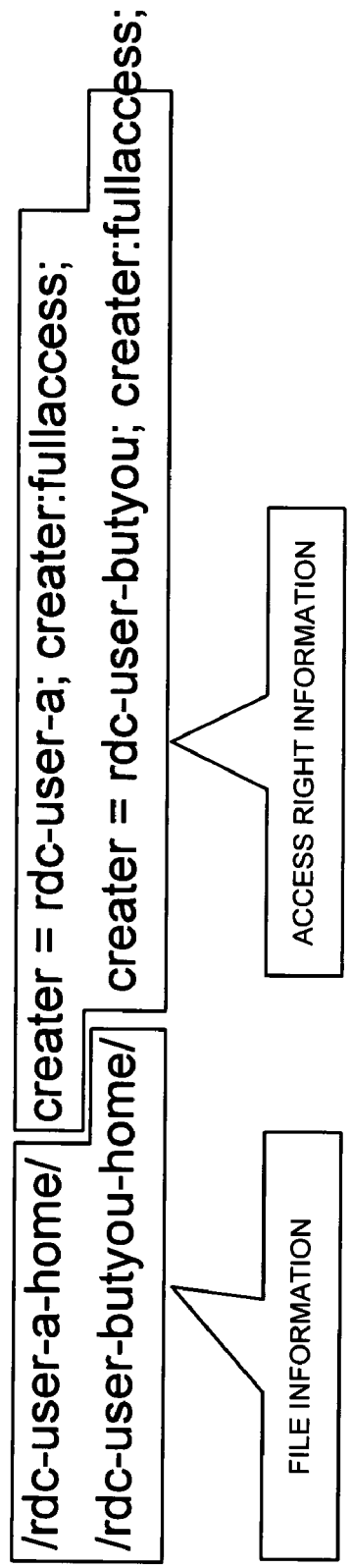
FIG. 29 is an explanatory diagram illustrating file information and access right information.
Figure 30:
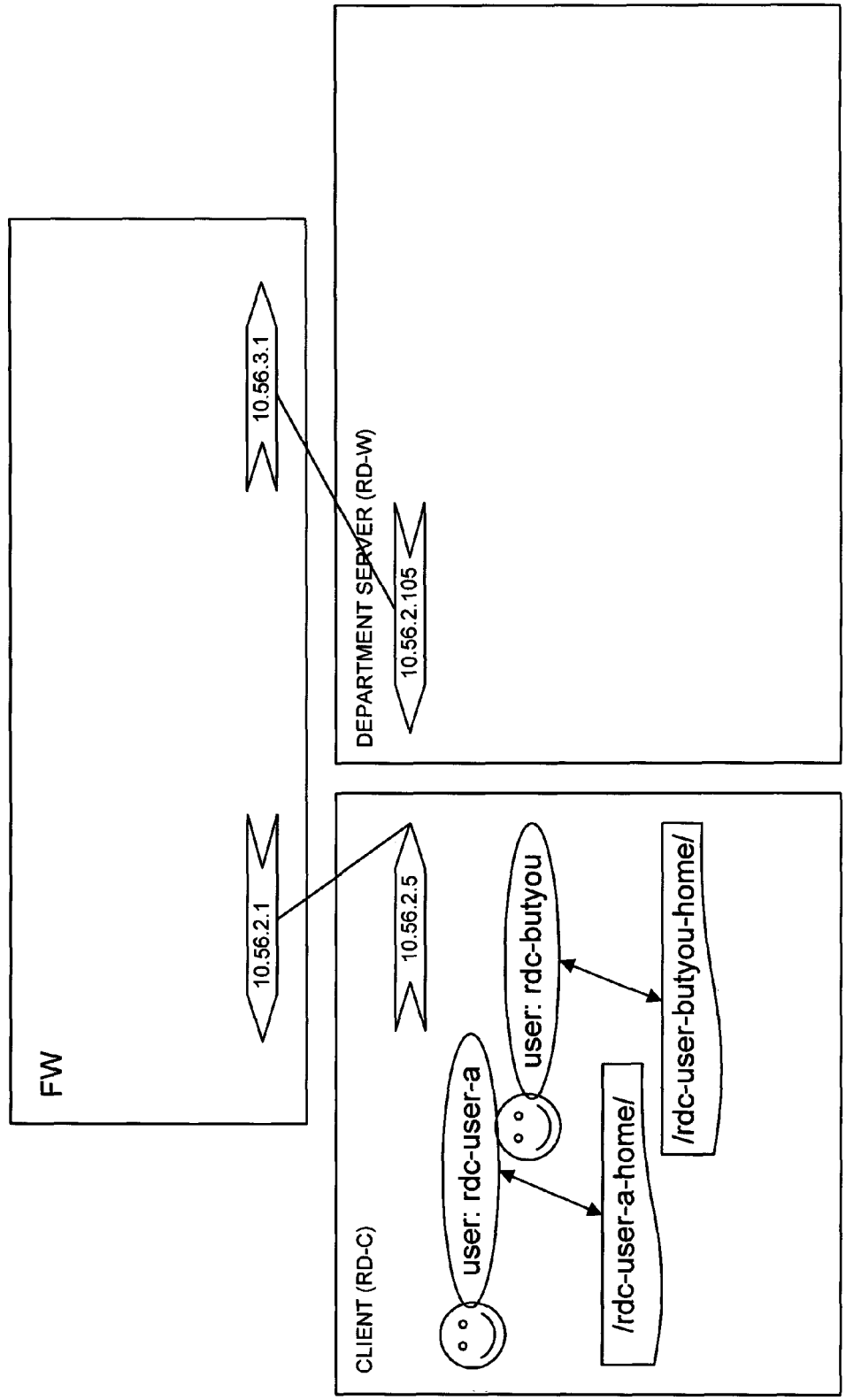
FIG. 30 is an explanatory diagram showing an access route model, reflecting file information and access right information.

FIG. 29 shows examples of file information and access right information, collected from RD-C. These information correspond to the OS setting information. The access route model creator 1030 recognizes a file of /rdc-user-a-home/ and a file of /rdc-user-butyou-home/, based on the file information. Moreover, the access route model creator 1030 recognizes that the right (for writing and reading) to access fully the file /rdc-user-a-home/ is given to a user rdc-user-a, or the composer thereof, based on access right information. Similarly, the access route model creator 1030 recognizes the right (for writing and reading) to access fully a file of /rdc-user-butyou-home/ to a user user-butyou. Each of the file information and the access right information are reflected to an access route model. FIG. 30 shows an example of an access route model reflecting the file information and the access right information. Referring to FIG. 30, an arrow directing from a user to a file represents a writing right and an arrow directing from a file to a user represents a reading right.

Figure 31:
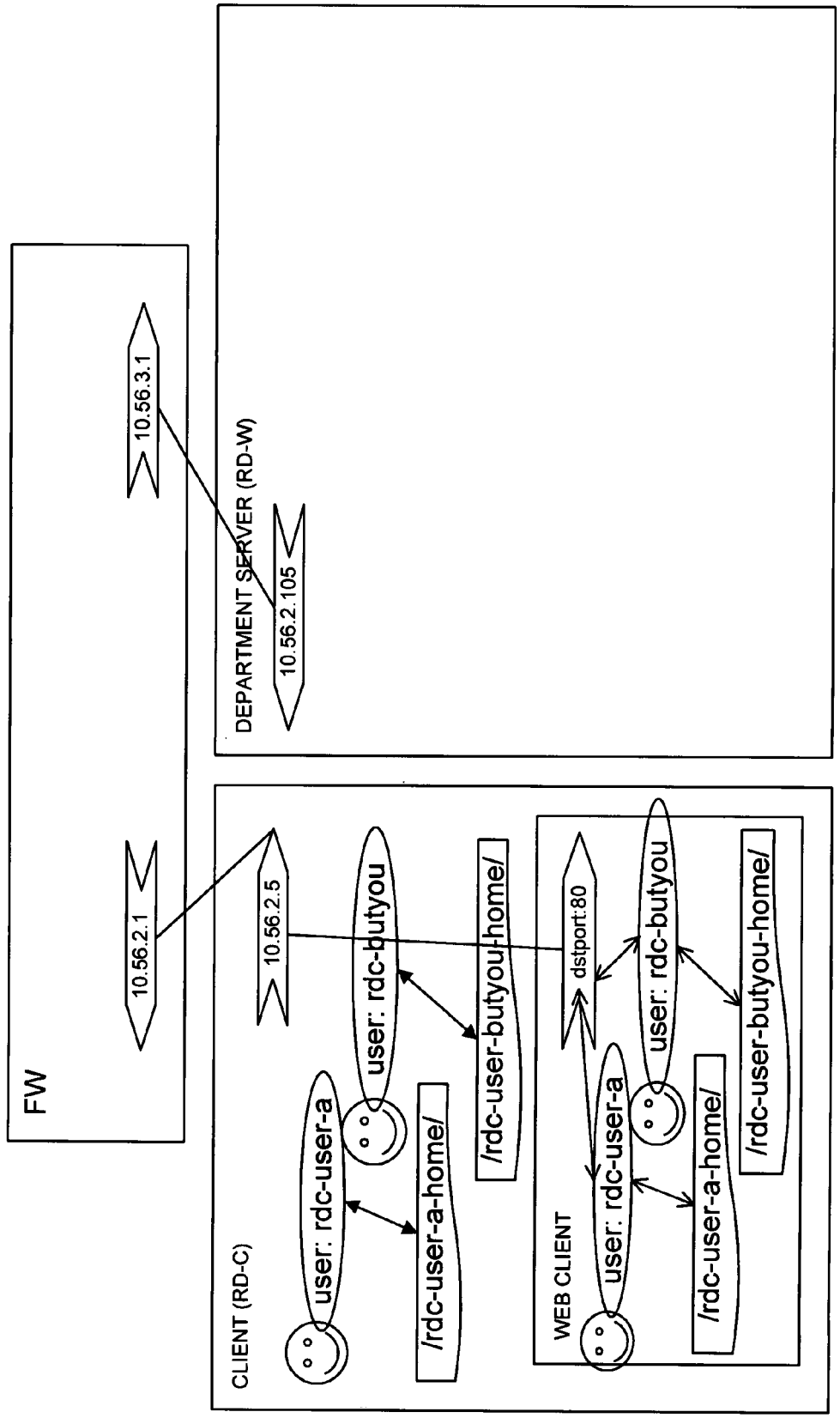
FIG. 31 is an explanatory diagram showing an access route model reflecting web client setting information.

Next, the access route model creator 1030 creates an access route model, based on the web client setting information. Since the web client information can generally access to the No. 80 port of the web server, it can create the access route model shown in FIG. 31.

Figures 32, 33:
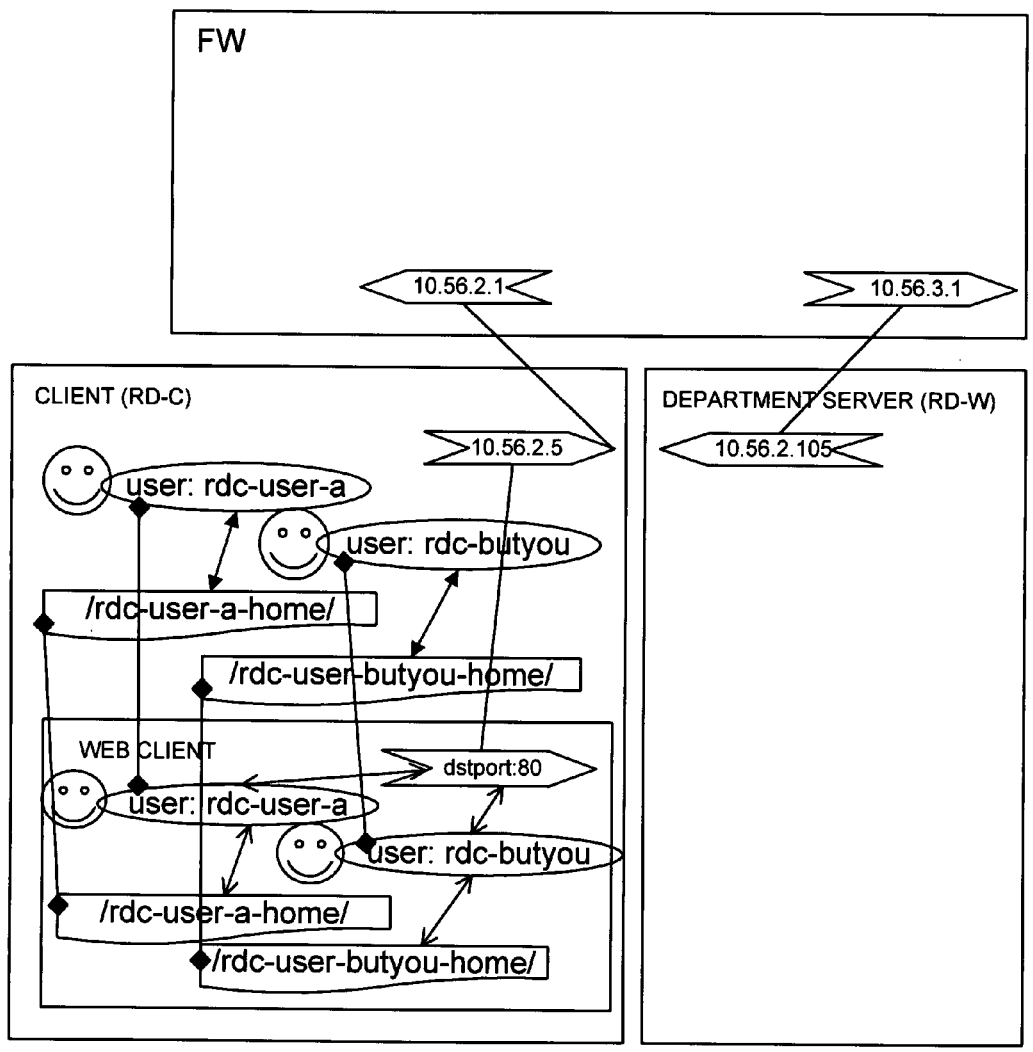
FIG. 32 is an explanatory diagram showing an access route model reflecting alias definition.
FIG. 33 is an explanatory diagram showing an example of user information.

Moreover, the access route model creator 1030 connects corresponding portions in the access route model created based on the web client setting information or the access route model created based on the OS setting information. Thus, the access route model becomes one shown in FIG. 32. Referring to FIG. 32, each solid line with both ends shown in diamond forms represents an alias definition.

Figure 34:
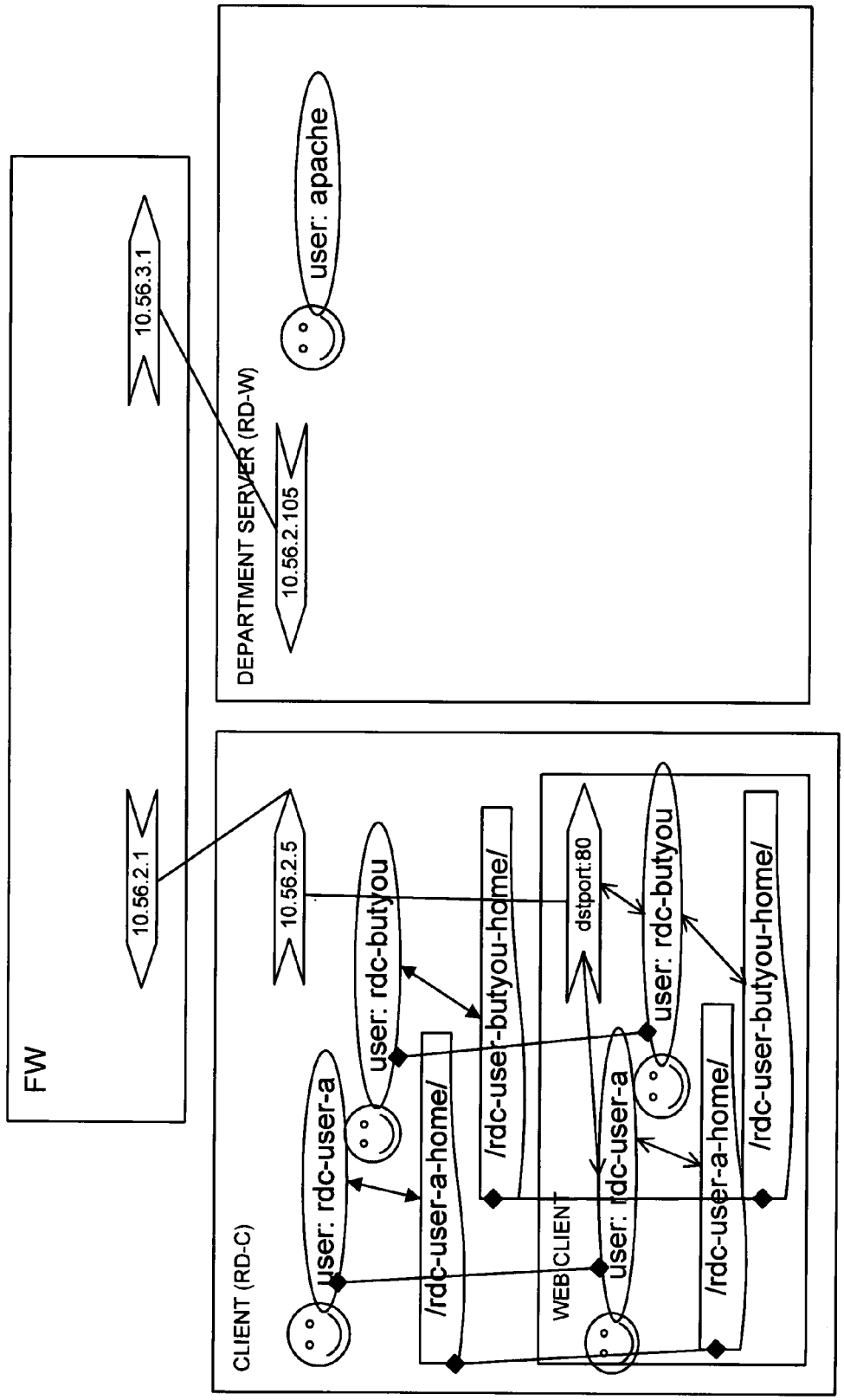
FIG. 34 is an explanatory diagram showing an access route model reflecting user information.

FIG. 33 shows an example of user information which is OS setting information for the department server RD-W. The access route model creator 1030 recognizes a user apache as a user for RD-W, based on the user information. The access route model creator 1030 models the user information and adds it to the access route model. Thus the access route model becomes the model shown in FIG. 34.

Figure 36:
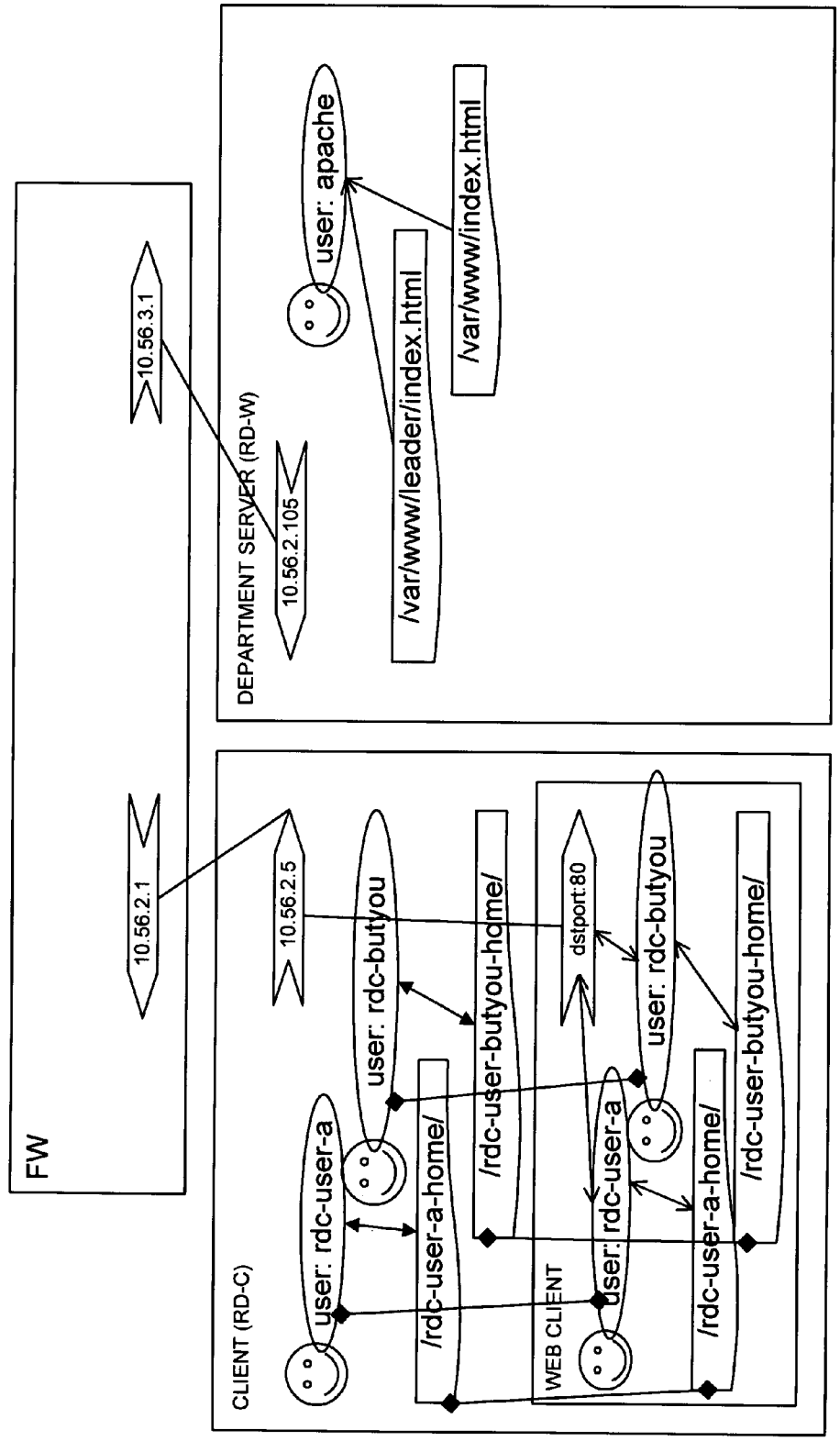
FIG. 36 is an explanatory diagram showing an access route model, reflecting file information and access right information.

FIG. 35 shows an example of RD-W file information and access right information. The information show in FIG. 35 corresponds to OS setting information. The access route model creator 1030 reflects the file information and the access right information to the access route model. Such an access route model is shown as an example in FIG. 36. However, FIG. 36 shows part of the file shown in FIG. 35, for sake of simplicity.

Figure 38:
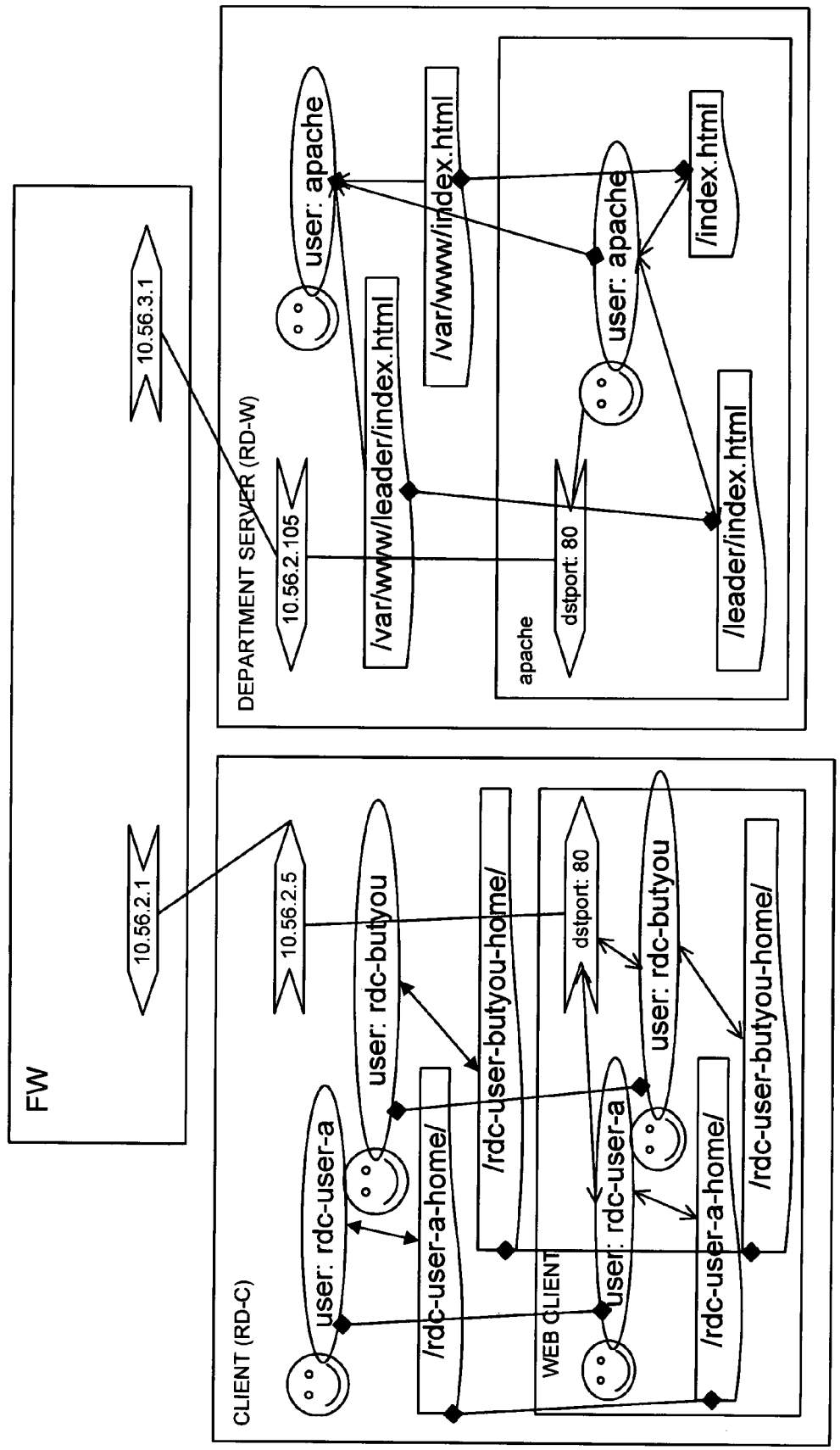
FIG. 38 is an explanatory diagram showing an access route model reflecting apache setting information.

FIG. 37 shows an example of apache setting information. As shown in FIG. 37, the apache setting information includes network information, user information, file information and access right information. The access route model creator 1030 models apache setting information and adds it to the access route model. At this time, the access route model creator 1030 creates an apache network node "dstport:80" based on the network information shown in FIG. 37. Moreover, the access route model creator 1030 creates "user:apache" of apache, based on the user information shown in FIG. 37, and creates an arc between it and "user:apache" created based on OS setting information. Moreover, the access route model creator 1030 creates an apache file node based on the file information shown in FIG. 37 and creates an arc between the apache file node and the file node created based on OS setting information. Moreover, the access route model creator 1030 creates an arc between an apache user and a file based on the access right information shown in FIG. 37. The result is shown in FIG. 38. Referring to FIG. 38 files "/index.html/" and "/leader/index.html" are included in the apache access route model. "/index.html" is derived based on the file information of the line No. 10 in FIG. 37 and based on the file information in the third line in FIG. 35. Similarly, "/leader/index.html" is derived based on the file information of the line No. 40 in FIG. 37 and based on the file information in the fourth and fifth lines in FIG. 35.

Figure 40:
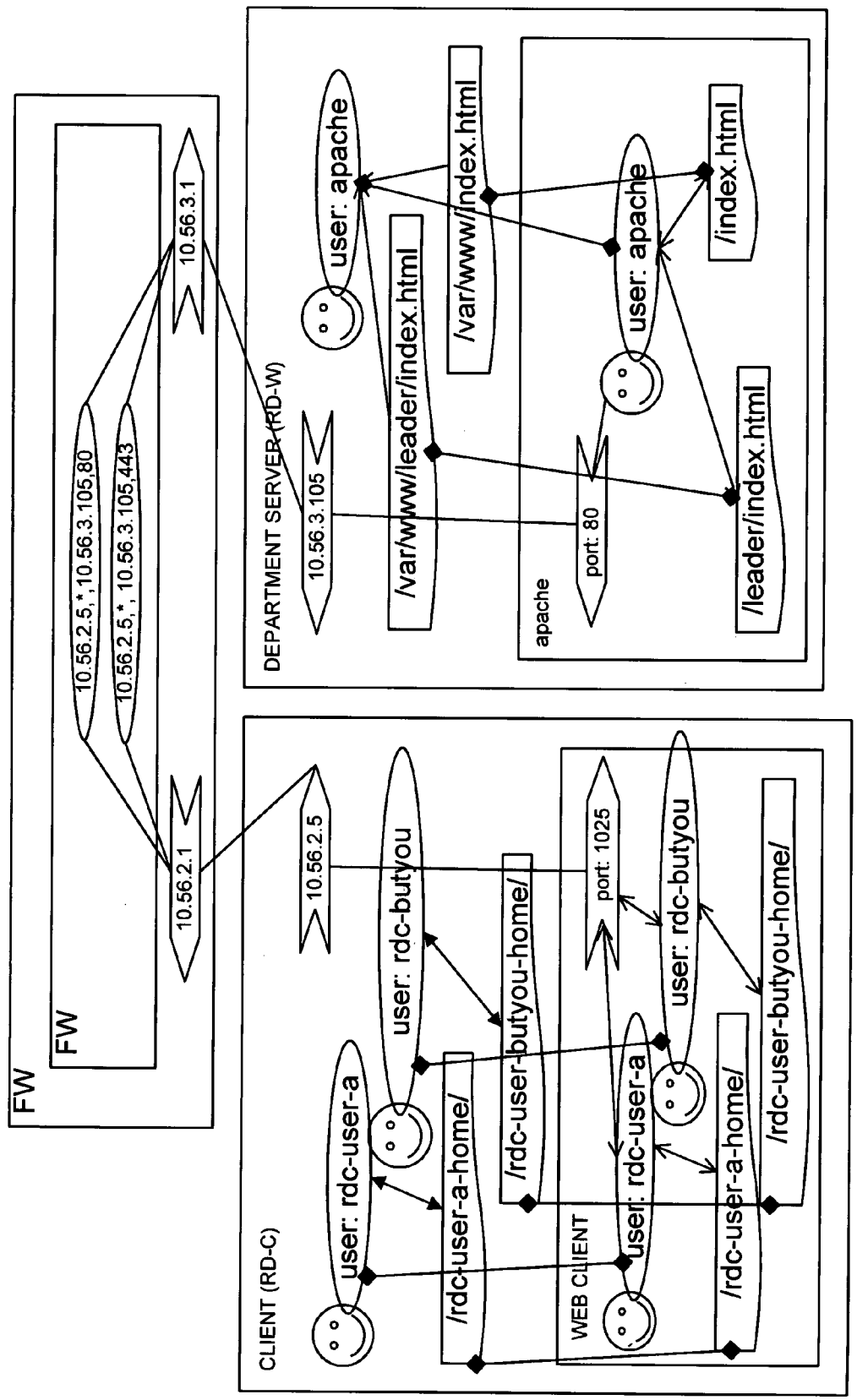
FIG. 40 is an explanatory diagram showing an access route model reflecting filtering settings.

FIG. 39 shows an example of access right information for a firewall. The access right information shown in FIG. 39, represents that access to No. 80 port leading from the IP address "10.56.2.5" to the IP address "10.56.1.105" is allowed. An example of access route model reflecting the filtering setting is shown in FIG. 40.

Figure 42:
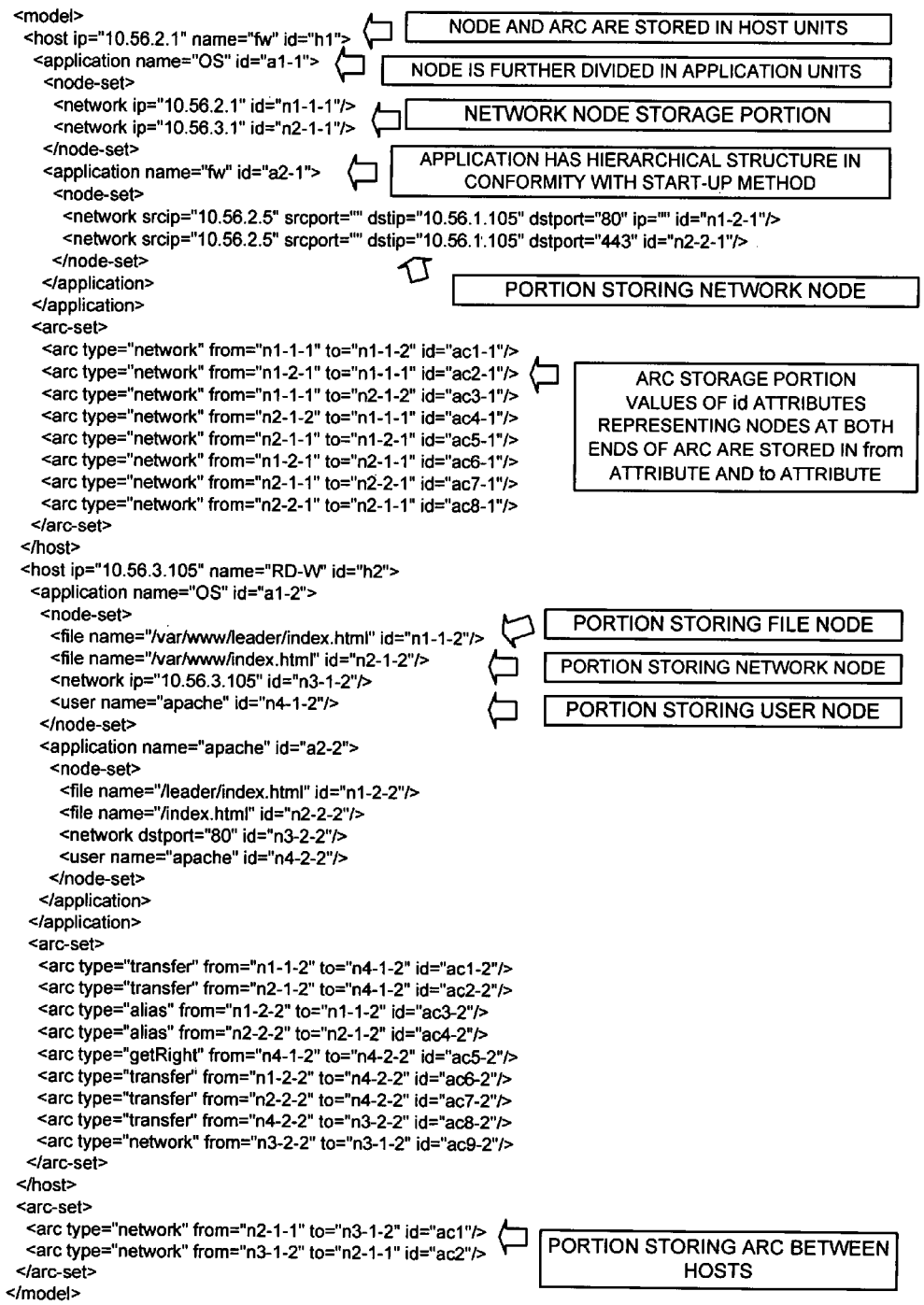
FIG. 42 is an explanatory diagram showing a descriptive example of the whole of access model.

The access route model creator 1030 stores the modeled access route model into the access route model storage 1030. As described above, the access route model is held as information described in XML in the information leakage analysis system. FIG. 41 shows an example of an access route model stored in the access route model storage 1030. FIG. 41 shows an excerpted part of the model described in XML format representing the whole access route model. As shown in FIG. 41, the node includes an ip attribute storing an IP address and an id attribute storing ID identifying each node. The description of the access route model shown in FIG. 41 represents that a model created by the setting of FW includes two network nodes (ip="10.56.2.1" and ip="10.56.3.1"). The model created based on the application setting information shows an arc representing two network nodes and the relationships thereof. Arc includes a type attribute and a from attribute, and a to attribute. The "type attribute" represents a type of arc. The "from attribute" represents the ID of a node acting as the starting point of arc. The "to attribute" represents the ID of a node acting as an end point of arc. FIG. 41 shows a description of part of an access route model. However, the whole description of an access model, for example, is shown in FIG. 42.

FIG. 43 is an explanatory diagram illustrating an analysis-intended access route input by the analysis-intended access route input device 1050. The analysis-intended access route in FIG. 43 represents that it is barred that the user "rdc-user-a" of the host "10.56.2.5" reads the file "10.56.3.105/var/www/leader/index.html" using the NO. 80 port.

Figure 44:
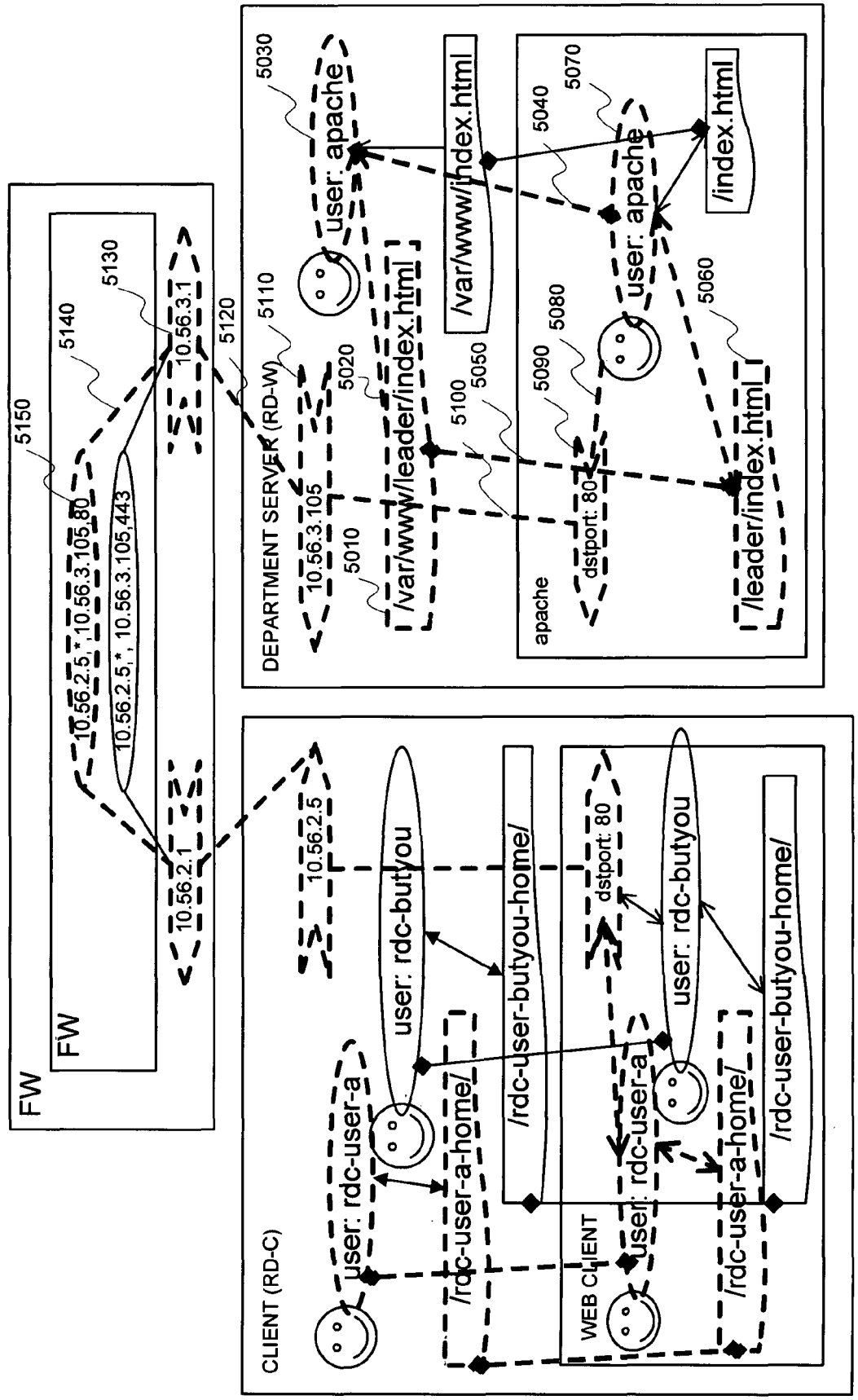
FIG. 44 is an explanatory diagram showing an example of decision results determined as a possible information leakage route.
Figure 53:
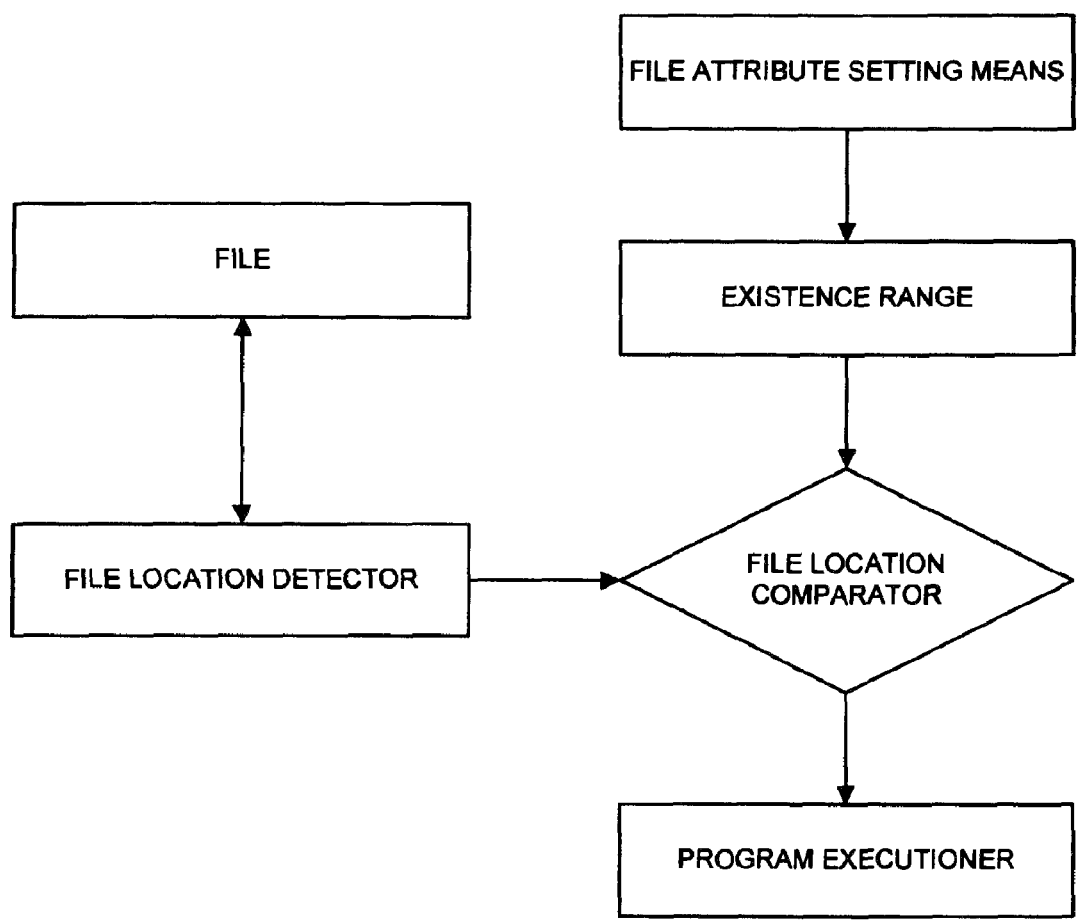
FIG. 53 is a block diagram showing an example of a prior art.

FIG. 44 shows the decision result that the access route decider 1060 decides a route as a route having the possibility of a leakage of information, based on an analysis-intended access route and based on an access route model. Referring to FIG. 44, a route having the possibility of a leakage of information is shown in broken lines. The route shown in broken line represents that the user "rdc-user-a" of the host "10.56.2.5" can read the file "/var/www/leader/index.html" of the host "10.56.3.105", using No. 80 port, that is, that there is the possibility of an information leakage. In other words, the broken line represents that the file "/var/www/leader/index.html" of the host "10.56.3.105" has the possibility of an information leakage.

The result output device 1070 manifests the access route model shown in FIG. 44 to the operator (verifier). The verifier can view the access route model shown in FIG. 44 to specify a file on a route matching with an analysis-intended access route (that is, on a route having the possibility of a leakage of information). Since the result output device 1070 displays the route having the possibility of a leakage of information, the verifier can change a suitable setting among the settings related to the route. As a result, the setting for nipping an information leakage in the bud can be changed quickly.

Embodiment 2

The second embodiment is shown using the verification-intended system in the first embodiment. The access route creation model created based on the setting information collected in the verification-intended system also is similar to that in the first embodiment. In the present embodiment, the case will be explained where setting information is stored together with a created access route model and an information leakage countermeasure is manifested.

Each of FIGS. 45 and 46 shows an example of information to which the setting information is added to an access route model modeled based on the setting information collected by the setting information collector 1020. The access route model creator 1030 stores the information, illustrated in FIGS. 45 and 46, into the setting information storage 2010. The setting information shown in FIGS. 45 and 46 (or the setting information added to an access route model) includes information on a location (host name or file name) at which the setting information is stored or on a position in a file.

The setting information identification means 2020 specifies the setting information decided as information having the possibility of information leakage. That is, the setting information identification means 2020 specifies the setting information associated with an access route model for a route having the possibility of information leakage and extracts it from the setting information storage 2010. For example, the setting information identification means 2020 extracts the setting information associated with an access route model for a route shown with the broken lines in FIG. 44 from the setting information storage 2010. Specifically, the access route model shown with the broken lines in FIG. 44 includes an arc between the file "/leader/index.html" and the user apache. This arc is created based on the access right information of apache shown in FIG. 46. The setting information identification means 2020 extracts the setting information shown in FIG. 46 as the setting information corresponding to the arc. Similarly, in the case of the access routes shown with broken lines in FIG. 44, the setting information corresponding to each model route is extracted as to the user "rdc-user-a" and the file "rdc-user-a-home/" in the client RD-C, and the arc (file access right) between the files, a factor in the web client, a filtering rule "10.56.2.5,*,10.56.3.105,*" in the firewall FW, the apache network 80 and file /leader/index.html in the department server RD-D.

The information leakage countermeasure proposer 3040 extracts and manifests an information leakage countermeasure (an alteration candidate for setting information) from the information leakage countermeasure storage 3010. FIG. 47 shows an example of a user interface (hereinafter referred to as UI) for manifesting information leakage countermeasures. In UI illustrated in FIG. 47, each setting information deciding that a leakage of information will occur is manifested as "current setting". According to each setting information, a "correction" button, a "alteration candidate", and "execution" button are displayed. In an initial display state, an alteration candidate may be not displayed in the "alteration candidate" column. Particularly, an alteration candidate possibly having many items to be decided by a user may not be displayed in the initial display status. Whether or not each alteration candidate is displayed in the initial display status may be previously determined. In the present embodiment, it is assumed that the operator cannot edit alteration candidates on the UI shown in FIG. 47. When the "correction" button is selected (for example, is clicked with a mouse), the setting change input device 3030 displays an edit screen for alteration candidates corresponding to the button. When the UI in FIG. 47 does not display an alteration candidate, the setting change input device 3030 extracts an alteration candidate corresponding to "current setting" related to a selected "change" button out of the information leakage countermeasure storage 3010 to display it on the edit screen.

FIG. 48 shows an example of the display screen when the lowest "correction" button in FIG. 47 is selected. The setting change input device 3030 extracts an information leakage countermeasure corresponding to "current setting" and displays it in the display column for "alteration candidate" (refer to FIG. 48). The setting change input device 3030 is realized, for example, by a display for displaying the screen, an input device such as a keyboard, and a CPU. When a displayed alteration candidate is modified, the setting change input device 3030 updates the display of the alteration candidate according to its operation. That is, the operator can edit the displayed alteration candidate using the keyboard. When the "cancel" button is selected on the screen shown in FIG. 48, the information leakage countermeasure proposer 3040 again displays the previous screen (refer to FIG. 47). When the "decision" button is selected on the screen in FIG. 48, the information leakage countermeasure proposer 3040 reflects the content indicated as "alteration candidate" in FIG. 48 to display again the UI. FIG. 49 shows the screen of the UI. In the UI shown in FIG. 47, nothing is displayed in the lowest display column for "alteration candidate". However, an alteration candidate is displayed through the selection of the "correction" button (refer to FIG. 48). When the decision button in FIG. 48 is selected, an alteration candidate is displayed in the lowest "alteration candidate" column as shown in FIG. 49. Moreover, when the operator edits the alteration candidate on the screen shown in FIG. 48, the edit result is displayed on the UI shown in FIG. 49.

When the "execution" button corresponding to an alteration candidate displayed on the UI shown in FIGS. 47 and 49 is selected, the countermeasure executor 3050 administers the verification object system to execute the setting indicated as an alteration candidate, according to the execution method stored in the information leakage countermeasure storage 3010. For example, it is assumed that the lowest "execution" button is selected in the display status, shown in FIG. 49. In this case, the countermeasure executioner 3050 partially rewrites the apache setting file, using "alteration candidate" displayed together with the lowest "execution" button, and thus reboots the server. FIG. 50 shows an example of an apache setting file partially rewritten, using the alteration candidate displayed on the lowest portion of FIG. 49. Referring to FIG. 50, the line numbered portions 51 to 60 correspond to written portions.

As described above, by inputting an analysis-intended access route, a verifier can easily find a file having the possibility that a leakage of information occurs. Moreover, since the information leakage countermeasure proposer 3040 can display plural information leakage preventing methods, effective countermeasures can be easily taken quickly. This feature allows a leakage of information from being prevented before it happens.

Embodiment 3

The third embodiment will be explained here by referring to the verification-intended system, similar to that in the second embodiment. It is assumed that the aspect of storing the setting information together with an access route model is similar to that in the second embodiment. The third embodiment shows the case where the information leakage countermeasure priority order decider 210 prioritizes information leakage countermeasures.

As to the route (shown with broken lines in FIG. 44) having the possibility of a leakage of information shown in FIG. 44, the information leakage countermeasure priority order decider 210 prioritizes, for example, in the order of the information leakage file 5010 (/var/www/leader/index.html) having the possibility of a leakage of information, the arc 5020 having an access right to the information leakage file 5010, the user 5030 (user:apache) having an access right to an information leakage file, user:apache 5040 for setting an execution user of apache, and the setting 5050 for setting an access right of apache. The information leakage countermeasure proposer 3040 displays as "current setting" the setting information corresponding to respective ranked models according to priority to indicate an alteration candidate corresponding to each setting. Like the second embodiment, there may be alteration candidates, which are not displayed in the initial display status. FIG. 51 shows an example of a screen on which alteration candidates are displayed in the order determined by the information leakage countermeasure priority order decider 210. However, FIG. 51 shows the case where respective alteration candidates are in a display state by selecting the "correction" button and editing. The operation when the "execution" button is selected after that state is similar to that in the second embodiment.

The present embodiment can obtain the effect similar to that in the second embodiment. Particularly, a possible most effective countermeasure can be easily executed quickly.

Embodiment 4

The fourth embodiment shows an example of the operation of the ninth implementation. In the present embodiment, it is assumed that an access route model, similar to that in the first to third embodiments, is stored in the access route model storage 1040. The access route analyzer 5010 creates an analysis-intended access route, including the file /var/www/leader/index.html (refer to FIG. 44) as a distribution source or an intermediate node and all user files as a distribution source or a distribution destination. Next, the access route decider 1060 decides whether or not each route exits. Next, the information leakage countermeasure priority order decider 210 counts the number of routes decided by the access route decider 1060. FIG. 44 shows 14 route models. Similarly, routes for all factors in the information leakage route are counted. The setting change proposals are ranked in an increasing number of such counted routes. The procedure following after that step is similar that in the second embodiment.

The second and third embodiments have been explained using the UI illustrated in FIG. 47. A setting file name describing the setting information may be displayed on the UI, which displays alteration candidates. The UI, shown in FIG. 52, displays a group of "execution" buttons, setting file names, current settings, alteration candidates, and "correction" buttons.

The present invention can check the possibility of a leakage of information according to the setting state of a file storing system and can prevent previously a file from being leaked. The present invention can specify the location of a file having the possibility of a leakage of information or the setting causing a leakage of the file.

INDUSTRIAL APPLICABILITY

The present invention can be applied to verify the possibility of file leakage.

The invention claimed is:

1. An information leakage analysis system comprising:
   an access route information storage that stores a file stored in a file storage system, and access route information representing an access route to a file stored in said system from a user or another file, wherein said user can access said file and said another file and can copy the content in said file;
   a setting information storage that stores setting information, said setting information including information regarding a network configuration in said system, a file name and a storage location of a file stored in said system, and a user using an operation system or application installed in said system;
   a route decider that collates information leakage route information representing a possible information leakage route with said access route information and decides whether or not a route represented by said information leakage route information is represented in said access route information;
   a setting information identifier that identifies setting information associated with said route when said route decider has decided that a route represented by said information leakage route information is represented in said access route information and then reads said setting information from said setting information storage;
   a result output device that outputs said setting information;
   an information leakage countermeasure storage that stores a setting proposal for cutting a possible information leakage route, associated with a descriptive content of said setting information; and
   an information leakage countermeasure proposer that reads and outputs a setting proposal associated with the content of setting information identified by said setting information identifier from said information leakage countermeasure storage.

2. The system defined in claim 1, wherein said information leakage countermeasure proposer includes a countermeasure executioner that changes the setting of a file storing system according to a setting proposal read out from said information leakage countermeasure storage.

3. The system defined in claim 1, wherein said information leakage countermeasure proposer includes a setting change input device that displays a setting proposal read from said information leakage countermeasure storage, displays a user interface stimulating an editing operation to said setting proposal, and updates said setting proposal according to said editing operation when said user interface edits said setting proposal.

4. The system defined in claim 1, wherein said information leakage countermeasure proposer includes an information leakage countermeasure priority order decider that ranks setting proposals read from said information leakage countermeasure storage in the order having less effect on said system when system setting is changed according to each setting proposal; and wherein said information leakage countermeasure proposer displays said setting proposal in the order decided by said information leakage countermeasure priority order decider.

5. The system defined in claim 1, further comprising information leakage route information input device that inputs information leakage route information.

6. The system defined in claim 1, further comprising:
   an attribute use information leakage route information input device that inputs attribute use information leakage route information representing a distribution source and a distribution destination of a possible information leakage route by a file or user attribute;
   an attribute information storage that stores a correspondence relationship between a file or user attribute and file or user information having said attribute; and
   a converter that converts attribute use information leakage route information into information leakage route information by referring to said corresponding relationship and by replacing the attribute included in said attribute use information leakage route information with file or user information.

7. An information leakage analysis system comprising:
   an access route information storage that stores a file stored in a file storage system, and access route information representing an access route to a file stored in said system from a user or another file, wherein said user can access said file and said another file and can copy the content in said file;
   a setting information storage that stores setting information, said setting information including information regarding a network configuration in said system, a file name and a storage location of a file stored in said system, and a user using an operation system or application installed in said system;
   a route decider that collates information leakage route information representing a possible information leakage route with said access route information and decides whether or not a route represented by said information leakage route information is represented in said access route information;

a setting information identifier that identifies setting information associated with said route when said route decider has decided that a route represented by said information leakage route information is represented in said access route information and then reads said setting information from said setting information storage;

a result output device that outputs said setting information;

an attribute use information leakage route information input device that inputs attribute use information leakage route information representing a distribution source and a distribution destination of a possible information leakage route by a file or user attribute;

an attribute information storage that stores a correspondence relationship between a file or user attribute and file or user information having said attribute;

a converter that converts attribute use information leakage route information into information leakage route information by referring to said corresponding relationship and by replacing the attribute included in said attribute use information leakage route information with file or user information; and an attribute information analyzer that collects setting information from a file storage system, analyzes the attribute of a content described in said setting information, and stores a corresponding relationship between the content described in said setting information and said analytically identified attribute in said attribute information storage.

8. An information leakage analysis system comprising:

a setting information collector that collects setting information from said system, said setting information including a network configuration in a file storage system, the file name of a file stored in said system and a storage place, and information regarding users using an operating system or application installed in said system;

an access route information creator that creates, based on said setting information, a file stored in said system, and access route information representing an access route to a file stored in said system from a user or another file, wherein said user can access said file and said another file and can copy the content in said file;

a route decider that verifies information leakage route information representing a possible information leakage route with said access route information and decides whether or not a route represented by said information leakage route information is represented in said access route information;

a result output device that outputs said route information when a route represented by said information leakage route information is represented in said access route information;

an information leakage countermeasure storage that stores setting proposals for cutting a possible information leakage route associated with a descriptive content of setting information; and an information leakage countermeasure proposer that reads and outputs a setting proposal associated with the content of setting information collected by said setting information collector, out of said information leakage countermeasure storage, wherein said access route information creator comprises:

a setting information storage that stores setting information used when an access route information creator creates access route information, together with information representing a corresponding relationship with said access route information; and a setting information identifier that identifies setting information associated with said route when said route decider has decided that a route represented by information leakage route information is represented in said access route information, and reads said setting information out from said setting information storage;

wherein said result output device outputs setting information identified by said setting information identifier.

9. The system defined in claim 8, wherein said information leakage countermeasure proposer includes:

a countermeasure executioner that changes the setting of a file storage system, according to a setting proposal read out from said information leakage countermeasure storage.

10. The system defined in claim 8, wherein said information leakage countermeasure proposer includes:

setting change input device that displays a setting proposal read out from said information leakage countermeasure storage, displaying a user interface stimulating an editing operation of said setting proposal, and updates said setting proposal according to said editing operation when said setting proposal has been edited with said user interface.

11. The system defined in claim 8, wherein said information leakage countermeasure proposer includes:

an information leakage countermeasure priority order decider that ranks setting proposals read from said information leakage countermeasure storage in the order of having little effect on the system when the setting of the system is changed according to each setting proposal; and wherein said information leakage countermeasure proposer displays said setting proposals according to the order decided by the information leakage countermeasure priority order decider.

12. The system defined in claim 8, further comprising an information leakage route information input device that inputs information leakage route information.

13. The system defined in claim 8, further comprising:

an attribute use information leakage route information input device that receives attribute use information leakage route information representing a distribution source and a distribution destination in a possible information leakage route by a file or user attribute;

an attribute information storage that stores a corresponding relationship between a file or user attribute and file or user information having said attribute; and a converter that converts attribute use information leakage route information into information leakage route information by referring to said corresponding relationship and by replacing the attribute included in said attribute use information leakage route information with file or user information.

14. The system defined in claim 13, further comprising:

a collecting, analyzing and storing unit that collects setting information from a file storage system, analyzes an attribute of the content described in said setting information, and stores a corresponding relationship between the content described in said setting information and the attribute identified by analysis, in said attribute information storage.

15. An information leakage analysis method comprising the steps of:

storing, by a computer, access route information in an access route information storage, said access route information representing a file stored in a file storage system, and an access route to a file stored in said system from a user or another file, wherein said user can access said file and said another file and can copy the content in said file;

storing, by said computer, setting information in a setting information storage, said setting information including a network configuration in said system, a file name and a storage location of a file stored in said system, and information on a user using an operating system or application installed in said system;

verifying, by said computer, information leakage route information representing a possible information leakage route with said access route information, by way of a route decider, and deciding whether or not a route represented by said information leakage route information is represented in said access route information;

identifying, by said computer, setting information associated with said route, by means of setting information identification means, when the verifying step has decided that a route represented by said information leakage route information is represented in said access route information;

reading, by said computer, said setting information from said setting information storage;

outputting, by said computer, said setting information by way of a result output device;

storing, by said computer, a setting proposal for cutting a possible information leakage route, associated with a descriptive content of said setting information; and reading and outputting, by said computer, a setting proposal associated with the content of setting information identified by said identifying step.

16. A computer readable medium storing an information analysis program installed in a computer, said computer comprising:

an access route information storage that stores access route information, said access route information representing a file stored in a file storage system, and access route from a user or another file to said file stored in said system, wherein said user can access said file and said another file and can copy the content in said file; and a setting information storage that stores setting information, said setting information including a network configuration in said system, a file name and a storage location of a file stored in said system, and information regarding a user using an operating system or application installed in said system;

said program instructing said computer to execute:

a route decision process that verifies information leakage route information representing a possible information leakage route with said access route information and decides whether or not said route represented by said information leakage route information is represented in said access route information;

a setting information identification process that specifies setting information associated with said route when said route decision process has decided that said route represented by said information leakage route information is represented in said access route information and reads said setting information out from said setting information storage; and a result output process that outputs said setting information;

an information leaking countermeasure storage process that stores a setting proposal for cutting a possible information leakage route, associated with a descriptive content of said setting information; and an information leakage countermeasure proposer processor that reads and outputs a setting proposal associated with the content of setting information identified by said setting information identifier from said information leakage countermeasure storage process.

17. A computer readable medium storing an information leakage analysis program instructing a computer to execute:

a setting information collection process that collects setting information from said system, said setting information including a network configuration in a file storage system, a file name and a storage location of a file stored in said system, and information regarding a user using an operating system or application installed in said system;

an access route information creation process that creates access route information based on said setting information, said access route information representing a file stored in said system, and an access route to a file stored from said user or said other file to said file stored in said system, wherein a user of said system can access said file and can copy the content in said file;

a route decision process that verifies information leakage route information representing a possible information leakage route with said access route information and decides whether or not said route represented by said information leakage route information is represented in said access route information; and a result output process that outputs information on said route when it is decided that said route represented by said information leakage route information is represented in said access route information;

an information leakage countermeasure storage process for setting proposals for cutting a possible information leakage route associated with a descriptive content of setting information; and an information leakage countermeasure proposer process that reads and outputs a setting proposal associated with the content of setting information identified by said setting information collection process, out of said information leakage countermeasure storage process, wherein said access route information creation process comprises:

a setting information storage process that sets information used when an access route information creator creates access route information, together with information representing a corresponding relationship with said access route information; and a setting information identification process that identifies setting information associated with said route when said route decider has decided that a route represented by information leakage route information is represented in said access route information, and reads said setting information out from said setting information storage process;

wherein said result output process outputs setting information identified by said setting information identification means.

18. An information leakage analysis system comprising:

an access route information storage that stores a file stored in a file storage system, and access route information representing an access route to a file stored in said system from a user or another file, wherein said user can access said file and said another file and can copy the content in said file;

a setting information storage that stores setting information, said setting information including information regarding a network configuration in said system, a file name and a storage location of a file stored in said system, and a user using an operation system or application installed in said system;

a route decider that collates information leakage route information representing a possible information leakage route with said access route information and decides whether or not a route represented by said information leakage route information is represented in said access route information;

a setting information identifier that identifies setting information associated with said route when said route decider has decided that a route represented by said information leakage route information is represented in said access route information and then reads said setting information from said setting information storage; and a result output device that outputs said setting information, wherein said information leakage route information is created based on setting information stored in said setting information storage.

* * * * *